(12) United States Patent
Sato et al.

(10) Patent No.: US 11,498,107 B2
(45) Date of Patent: Nov. 15, 2022

(54) TORSION BEAM MANUFACTURING METHOD AND TORSION BEAM MANUFACTURING APPARATUS

(71) Applicant: NIPPON STEEL CORPORATION, Tokyo (JP)

(72) Inventors: Masahiko Sato, Tokyo (JP); Masaaki Mizumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 127 days.

(21) Appl. No.: 16/636,861

(22) PCT Filed: Sep. 10, 2018

(86) PCT No.: PCT/JP2018/033407
§ 371 (c)(1),
(2) Date: Feb. 5, 2020

(87) PCT Pub. No.: WO2019/069631
PCT Pub. Date: Apr. 11, 2019

(65) Prior Publication Data
US 2020/0171560 A1 Jun. 4, 2020

(30) Foreign Application Priority Data

Oct. 4, 2017 (JP) ............................. JP2017-194394
Mar. 23, 2018 (JP) ............................. JP2018-056868

(51) Int. Cl.
*B21D 22/02* (2006.01)
*B21D 53/88* (2006.01)
(Continued)

(52) U.S. Cl.
CPC ............ *B21D 22/02* (2013.01); *B21D 53/88* (2013.01); *B21D 22/26* (2013.01); *B21D 37/10* (2013.01);
(Continued)

(58) Field of Classification Search
CPC ........ B21D 22/02; B21D 22/26; B21D 53/88; B21D 37/10; B21D 7/03; B21D 7/06;
(Continued)

(56) References Cited

U.S. PATENT DOCUMENTS

2001/0022099 A1* 9/2001 Ueno ................... B21D 22/105
72/57
2009/0071220 A1* 3/2009 Gillet ................... B21D 22/025
72/372
(Continued)

FOREIGN PATENT DOCUMENTS

EP 3363664 A1 8/2018
JP 37-22758 Y 8/1962
(Continued)

OTHER PUBLICATIONS

International Search Report for PCT/JP2018/033407 dated Nov. 20, 2018.
(Continued)

*Primary Examiner* — Adam J Eiseman
*Assistant Examiner* — Fred C Hammers
(74) *Attorney, Agent, or Firm* — Birch, Stewart, Kolasch & Birch, LLP

(57) ABSTRACT

This torsion beam manufacturing method is for manufacturing a torsion beam including a central portion of which a cross-section orthogonal to a longitudinal direction is a closed cross-section having a substantial V-shape or a substantial U-shape at any position in the longitudinal direction, and a shape changing portion which has a connection region leading to the central portion and including a closed cross-section having a shape different from the shape of the closed cross-section of the central portion.
This torsion beam manufacturing method has a compression step of thickening at least the connection region through
(Continued)

application of a compression force in the longitudinal direction to at least the connection region of a torsion beam material to obtain the torsion beam, the torsion beam material being formed with the central portion and the shape changing portion.

10 Claims, 28 Drawing Sheets

(51) Int. Cl.
    *B21D 22/26*     (2006.01)
    *B21D 37/10*     (2006.01)
    *B60G 9/04*     (2006.01)

(52) U.S. Cl.
    CPC .......... *B60G 9/04* (2013.01); *B60G 2206/012* (2013.01); *B60G 2206/20* (2013.01); *B60G 2206/8103* (2013.01)

(58) Field of Classification Search
    CPC ...... B21D 22/20; B21D 51/14; B21D 37/155; B21D 37/156; B21D 37/16; B21D 41/00; B21D 41/02; B21D 47/01
    USPC .......................................................... 72/350
    See application file for complete search history.

(56) References Cited

U.S. PATENT DOCUMENTS

| | | | | |
|---|---|---|---|---|
| 2010/0187788 A1* | 7/2010 | Choi | .................... | B60G 21/051 280/124.106 |
| 2012/0104717 A1* | 5/2012 | Hashimoto | ............ | B21D 53/88 280/124.166 |
| 2013/0276276 A1 | 10/2013 | Ogawa et al. | | |
| 2016/0325330 A1 | 11/2016 | Nitta et al. | | |
| 2019/0001774 A1* | 1/2019 | Iguchi | .................... | B21D 22/06 |
| 2019/0126714 A1* | 5/2019 | Wada | ..................... | B21D 53/88 |

FOREIGN PATENT DOCUMENTS

| | | | |
|---|---|---|---|
| JP | 60-127036 A | | 7/1985 |
| JP | 6-18678 B2 | | 3/1994 |
| JP | 10-329503 A | | 12/1998 |
| JP | 2001-123227 A | | 5/2001 |
| JP | 2001-321846 A | | 11/2001 |
| JP | 2005-34900 A | | 2/2005 |
| JP | 2008-63656 A | | 3/2008 |
| JP | 2009-509774 A | | 3/2009 |
| JP | 2011-635 A | | 1/2011 |
| JP | 2013-91433 A | | 5/2013 |
| JP | 5383382 B2 | | 1/2014 |
| JP | 2014025773 | * | 2/2014 |
| JP | 6213705 B1 | | 10/2017 |
| JP | 6296211 B2 | | 3/2018 |
| JP | 2018-61993 A | | 4/2018 |
| KR | 10-2013-0076185 A | | 7/2013 |
| WO | WO 94/06581 A2 | | 3/1994 |
| WO | WO 2009/014396 A1 | | 1/2009 |
| WO | WO 2010/114173 A1 | | 10/2010 |
| WO | WO 2012/081454 A1 | | 6/2012 |
| WO | WO 2015/133464 A1 | | 9/2015 |
| WO | WO 2017/098104 A1 | | 6/2017 |
| WO | WO 2017/155056 A1 | | 9/2017 |
| WO | WO 2017/169733 A1 | | 10/2017 |

OTHER PUBLICATIONS

Notice of Allowance for JP 2018-566324 dated Apr. 23, 2019.
Office Action for JP 2018-566324 dated Feb. 5, 2019.
Written Opinion of the International Searching Authority for PCT/JP2018/033407 (PCT/ISA/237) dated Nov. 20, 2018.

\* cited by examiner

TORSION BEAM MANUFACTURING METHOD AND TORSION BEAM MANUFACTURING APPARATUS

TECHNICAL FIELD OF THE INVENTION

The present invention relates to a torsion beam manufacturing method and a torsion beam manufacturing apparatus for manufacturing a torsion beam which is applied to a torsion beam-type suspension apparatus for automobiles and in which metal fatigue is prevented.

Priority is claimed on Japanese Patent Application No. 2017-194394 filed on Oct. 4, 2017, and Japanese Patent Application No. 2018-056868 filed on Mar. 23, 2018, the contents of which are incorporated herein by reference.

RELATED ART

As is generally known, as a form of an automobile suspension system, torsion beam-type suspension apparatuses have come into wide use. A torsion beam-type suspension apparatus includes: a torsion beam assembly in which a pair of right and left trailing arms freely rotatably supporting right and left wheels is coupled to a torsion beam and a pair of right and left spring receiving portions is joined to the vicinities of right and left ends of the torsion beam; and a spring and an absorber through which the torsion beam and a vehicle body are coupled to each other. The torsion beam is oscillatably connected to the vehicle body via pivot axes extending from the right and left toward a center of the vehicle body.

For example, a torsion beam is formed by performing deformation processing of a metal pipe through press forming or hydro-form forming, and a cross-section of the torsion beam orthogonal to a longitudinal direction thereof is formed into a closed cross-section having a substantial V-shape or a substantial U-shape (for example, refer to Patent Document 1).

The torsion beam includes the uniformly shaped closed cross-sectional portion which has a substantially constant closed cross-section having a substantial V-shape or a substantial U-shape, the attachment portions which are connected to the right and left trailing arms, and shape changing portions (gradual change portions) which are positioned between the uniformly shaped closed cross-sectional portion and the attachment portions. In a case where a vehicle body receives an external force from a road surface, rolling rigidity of the vehicle body is ensured mainly by torsional rigidity of the torsion beam.

On the other hand, even when the torsion beam has sufficient rolling rigidity, since the torsion beam receives various external forces from a road surface via the wheels or the trailing arms, a complicated stress distribution is generated due to such external forces and metal fatigue is likely to progress. For example, this metal fatigue is significantly likely to occur in the vicinity of a connection portion between the shape changing portion and the uniformly shaped closed cross-sectional portion.

Therefore, even in a case where various external forces are received from a road surface, metal fatigue needs to be prevented from progressing, and various technologies have been developed to prevent such metal fatigue (for example, refer to Patent Documents 2 to 6).

According to a technology disclosed in Patent Document 2, a press-formed torsion beam is subjected to quenching, tempering, and shot-peening, and an outer surface of the torsion beam is hardened, so that fatigue durability of the torsion beam is improved.

According to a technology disclosed in Patent Document 3, surface hardness of a torsion beam is improved by using a steel pipe of which surface hardness increases after heat treatment, so that fatigue durability of the torsion beam is improved.

According to a technology disclosed in Patent Document 4, tensile stress is applied by applying a pressure outward from the inside of a steel pipe through hydro-forming. As a result, residual stress of a torsion beam is reduced, so that fatigue durability is improved.

According to a technology disclosed in Patent Document 5, by deforming a portion having a high residual stress out of a plane, the tensile residual stress is reduced and the fatigue durability is improved. As an out-of-plane deformation unit, hydro-forming working is used.

According to a technology disclosed in Patent Document 6, a tensile force along the longitudinal direction is applied to a torsion beam material, and thus the residual stress of the torsion beam is reduced to improve the fatigue durability.

PRIOR ART DOCUMENT

Patent Document

[Patent Document 1] Japanese Unexamined Patent Application, First Publication No. 2011-635
[Patent Document 2] Japanese Unexamined Patent Application, First Publication No. 2001-123227
[Patent Document 3] Japanese Unexamined Patent Application, First Publication No. 2008-063656
[Patent Document 4] Japanese Unexamined Patent Application, First Publication No. 2013-091433
[Patent Document 5] PCT International Publication No. WO 2017/155056
[Patent Document 6] PCT International Publication No. WO 2017/169733

DISCLOSURE OF THE INVENTION

Problems to be Solved by the Invention

However, it is not always easy to improve the fatigue durability of the torsion beam by applying the technologies described in Patent Documents 2 to 5, and there is a problem that initial costs such as capital investment and manufacturing running costs increase. In particular, this problem is remarkable in the hydro-forming working disclosed in Patent Document 5.

According to a technology disclosed in Patent Document 6, these problems can be solved. However, in order to reduce the residual stress as calculated by applying a tensile force, the process to firmly secure the holding of both ends of the product is necessary.

Therefore, further improvement in productivity is required without this process. Thus, a torsion beam manufacturing technology capable of more efficiently manufacturing a torsion beam having excellent fatigue durability is desired.

The present invention has been made in consideration of the foregoing circumstances. An object thereof is to provide a torsion beam manufacturing method and a torsion beam manufacturing apparatus capable of more efficiently manufacturing a torsion beam having excellent fatigue durability.

Means for Solving the Problem

In order to solve the problem above, this invention proposes a method and an apparatus as follows.

(1) One aspect of the present invention is a torsion beam manufacturing method for manufacturing a torsion beam including a central portion of which a cross-section orthogonal to a longitudinal direction is a closed cross-section having a substantial V-shape or a substantial U-shape at any position in the longitudinal direction, and a shape changing portion which has a connection region leading to the central portion and including a closed cross-section having a shape different from the shape of the closed cross-section of the central portion, the method comprising: a compression step of thickening at least the connection region through application of a compression force in the longitudinal direction to at least the connection region of a torsion beam material to obtain the torsion beam, the torsion beam material being formed with the central portion and the shape changing portion.

According to the torsion beam manufacturing method of the above aspect, since a compression force is applied to at least the connection region in the compression step, the remaining residual stress can be reduced or removed and the torsion beam material can be reinforced by thickening at the same time.

As a result, a torsion beam having excellent fatigue durability can be manufactured. In addition, post-treatment such as heat treatment is not required, and the apparatus configuration and the manufacturing step are simpler in a case where axial direction compression is applied than in a case where axial direction tension is applied. Thereby, the torsion beam can be manufactured efficiently.

(2) In the torsion beam manufacturing method according to the above (1), in the compression step, in a state where an inner side of an outer portion in the longitudinal direction from the connection region is supported by an inner side support member and an outer side of the outer portion is pinched by an outer pinching member, the compression force may be applied by moving the inner side support member and the outer pinching member in a direction approaching the central portion.

In this case, in the compression step, since a compression force is applied in a state where the inner side of the outer portion of the torsion beam material is supported by the inner side support member and the outer side of the outer portion is pinched by the outer pinching member, the compression force can be easily applied while suppressing the out-of-plane deformation of the outer portion.

(3) In the torsion beam manufacturing method according to the above (2), in the compression step, the outer side of the connection region may be supported by an outer support member, and the outer support member may be moved synchronously with movement of the inner side support member and the outer pinching member in the same direction.

In this case, since the outer support member moves in synchronization with the movement of the inner side support member and the outer pinching member, the deformation of the torsion beam material along the longitudinal direction accompanying compression is not hindered. Therefore, since a compression force can be reliably applied to the torsion beam material, the residual stress can be reliably reduced or removed.

(4) In the torsion beam manufacturing method according to the above (1), in the compression step, the compression force may be applied over an entire length of the torsion beam material by causing both ends of the torsion beam material to approach each other along the longitudinal direction.

In this case, since the torsion beam material is compressed inward in the longitudinal direction over the entire length thereof, residual stress can be reduced or removed without omission.

(5) In the torsion beam manufacturing method according to any one of the above (1) to (4), in the compression step, a strain amount equal to or greater than 0.5% and equal to or smaller than 2.0% may be applied to at least the connection region of the torsion beam material in the longitudinal direction.

In this case, it is possible to apply a compression force sufficient to remove or reduce the residual stress of the torsion beam material without causing buckling.

(6) The torsion beam manufacturing method according to any one of the above (1) to (5) may further include a pressing step of obtaining the torsion beam material by pressing a raw pipe, before the compression step.

In this case, although residual stress is remaining in the torsion beam material at the point of time after the pressing step, the residual stress can be reduced or removed in the successive compression step.

(7) The torsion beam manufacturing method according to the above (1) may further include, a preparation step of preparing the torsion beam material having a warpage along the longitudinal direction in at least a part thereof in the longitudinal direction before the compression step, and in the compression step, in a state where an elongation between both end edges of the torsion beam material is regulated, a pressing force for reducing the warpage may be applied to the torsion beam material.

In this case, it is possible to apply a compression force to the torsion beam material with a simpler apparatus configuration.

(8) In the torsion beam manufacturing method according to the above (7), in the preparation step, the torsion beam material having both end edges inclined with respect to the longitudinal direction may be prepared.

In this case, depending on the inclination direction and the inclination angle of both end edges, a compression ratio of each part in the cross-section intersecting the longitudinal direction of the torsion beam material can be changed.

(9) In the torsion beam manufacturing method according to the above (7) or (8), in the compression step, a strain amount equal to or greater than 0.5% and equal to or smaller than 2.0% may be applied to at least the connection region of the torsion beam material in the longitudinal direction.

In this case, it is possible to apply a compression force sufficient to remove or reduce the residual stress of the torsion beam material without causing buckling.

(10) In the torsion beam manufacturing method according to any one of the above (1) to (9), when the compression force is applied in the compression step, at least the outer surface of the connection region may be supported.

In this case, in the compression step, since a compression force is applied while supporting at least the outer surface of the connection region, even when an object to be processed is a thin torsion beam material, buckling can be prevented.

(11) One aspect of the present invention is a torsion beam manufacturing apparatus for manufacturing a torsion beam including a central portion of which a cross-section orthogonal to a longitudinal direction is a closed cross-section having a substantial V-shape or a substantial U-shape at any position in the longitudinal direction, and a shape changing portion which has a connection region leading to the central portion and including a closed cross-section having a shape different from the shape of the closed cross-section of the central portion, the apparatus including: a pair of holding mechanisms that holds, in a view where a torsion beam material in which the central portion and the shape changing portion are formed is seen along the longitudinal direction, a part of the torsion beam material on one side of the connection region and a part of the torsion beam material on the other side of the connection region; and a first driving mechanism that causes the holding mechanisms to approach each other.

According to the torsion beam manufacturing apparatus of the above aspect, by applying a compression force in the longitudinal direction to at least connection region in the torsion beam material by the pair of holding mechanisms and the first driving mechanism, the residual stress remaining in the torsion beam material can be reduced or removed and the torsion beam material can be reinforced at the same time.

As a result, a torsion beam having excellent fatigue durability can be manufactured. In addition, since post-treatment such as heat treatment is not required, it is possible to manufacture a torsion beam efficiently.

(12) In the torsion beam manufacturing apparatus according to the above (11), the holding mechanisms may hold both ends of the torsion beam material respectively.

In this case, since both ends of the torsion beam material are held and compressed by the pair of holding mechanisms, a compression force can be applied over the entire length of the torsion beam material. Accordingly, the residual stress can be reduced or removed without leakage over the entire length of the torsion beam material.

(13) The torsion beam manufacturing apparatus according to the above (12) may further include: a movable die that has a shape corresponding to the central portion and the shape changing portion; and a second driving mechanism that pressurizes the movable die with respect to a raw pipe before the central portion and the shape changing portion are applied in the torsion beam material.

In this case, since the second driving mechanism presses the movable die against the raw pipe, a torsion beam material having the central portion and the shape changing portion can be obtained.

(14) In the torsion beam manufacturing apparatus according to the above (11), at least one of the holding mechanisms may include an inner side support member which is inserted into an inner side of the shape changing portion, and an outer pinching member which pinches an outer side of the shape changing portion.

In this case, since the inner side of the shape changing portion of the torsion beam material is supported by the inner side support member and then while the outer side of the shape changing portion is pinched by the outer pinching member, a compression force can be applied, it is possible to easily apply a compression force while suppressing the out-of-plane deformation of the shape changing portion.

(15) The torsion beam manufacturing apparatus according to the above (14) may further include: a movable die that has a shape corresponding to the central portion and the shape changing portion; and a second driving mechanism that presses the movable die against a raw pipe before the central portion and the shape changing portion are formed in the torsion beam material.

In this case, since the second driving mechanism pressurizes the movable die against the raw pipe, a torsion beam material having the central portion and the shape changing portion can be obtained.

(16) The torsion beam manufacturing apparatus according to the above (15) may employ the following configuration in which the movable die includes a movable die main body portion which has a shape corresponding to at least the central portion, a movable die end portion which has a shape corresponding to at least the shape changing portion and is provided to be movable with respect to the movable die main body portion, and a third driving mechanism which moves the movable die end portion with respect to the movable die main body portion, in which the movable die end portion also serves as the outer pinching member.

In this case, the shape corresponding to at least the central portion is given to the raw pipe pressed by the movable die main body portion and the shape corresponding to at least the shape changing portion is given by the movable die end portion. A compression force is applied to the torsion beam material in a state where the inner side support member is inserted into the shape changing portion of the torsion beam material and the outer side of the shape changing portion is pinched by the movable die end portion. According to this configuration, since the movable die end portion also serves as the outer pinching member, without transferring the torsion beam material obtained by performing press working on the raw pipe to another apparatus, a compression force can be continuously applied along the longitudinal direction as it is.

(17) The torsion beam manufacturing apparatus according to any one of the above (11) to (16) may employ the following configuration in which: the apparatus further includes a support die that supports the torsion beam material, wherein the support die includes a support die main body portion which supports the torsion beam material in a part including the central portion, and a support die end portion which is provided to be movable with respect to the support die main body portion and supports at least the shape changing portion.

In this case, since the support die end portion is freely movable with respect to the support die main body portion when a compression force is applied to the torsion beam material, deformation of the torsion beam material due to compression along the longitudinal direction is not inhibited. Therefore, since a compression force can be reliably applied to the torsion beam material, the residual stress can be reliably reduced or removed.

(18) The torsion beam manufacturing apparatus according to any one of the above (11) to (17) may employ the following configuration in which: the apparatus further includes a control unit that controls the first driving mechanism, wherein the control unit operates the first driving mechanism to apply a strain amount equal to or greater than 0.5% and equal to or smaller than 2.0% to at least the connection region of the torsion beam material in the longitudinal direction.

In this case, it is possible to apply a compression force sufficient to remove or reduce the residual stress of the torsion beam material without causing buckling.

(19) The torsion beam manufacturing apparatus according to any one of the above (11) to (18) may further include: a support portion which supports at least an outer surface of the connection region in the torsion beam material held by the pair of holding mechanisms.

In this case, when a compression force in the longitudinal direction is applied to at least connection region in the torsion beam material, a compression force is applied while supporting at least the outer surface of the connection region by the support portion. Thus, even when an object to be worked is a thin torsion beam material, buckling can be prevented.

(20) Another aspect of the present invention is a torsion beam manufacturing apparatus for manufacturing a torsion beam including a central portion of which a cross-section orthogonal to a longitudinal direction is a closed cross-section having a substantial V-shape or a substantial U-shape at any position in the longitudinal direction, and a shape changing portion which has a connection region leading to the central portion and including a closed cross-section having a shape different from the shape of the closed cross-section of the central portion, the apparatus including: a first die which has a recess to receive a torsion beam material having the central portion and the shape changing portion and has a warpage along the longitudinal direction in at least a part thereof in the longitudinal direction; a second die which approaches the torsion beam material disposed in the recess along a direction in which the warpage is reduced; and a fourth driving mechanism which causes the first die and the second die to approach each other, in which the recess has a pair of elongation regulating surfaces facing both end edges of the torsion beam material, and a distance between the pair of elongation regulating surfaces is shorter than an entire length along the warpage of the torsion beam material.

According to the torsion beam manufacturing apparatus of the above aspect, the torsion beam material is disposed in the recess of the first die, and then the second die approaches the second die by a driving force of the fourth driving mechanism. The torsion beam material is pressed from the second die to reduce warpage. At that time, since the elongation between both end edges is regulated by the pair of elongation regulating surfaces, a compression force in the longitudinal direction is applied to at least the shape changing portion of the torsion beam material. By the compression force, the residual stress remaining in the torsion beam material can be reduced or removed and the torsion beam material can be reinforced by thickening at the same time. As a result, a torsion beam having excellent fatigue durability can be manufactured. In addition, post-treatment such as heat treatment is not required, and it is possible to manufacture a torsion beam efficiently with a simple apparatus configuration.

In addition to the aspects described above, the present invention may employ the following aspects.

(a) As an alternative aspect of the present invention, there is provided a torsion beam manufacturing method for manufacturing a torsion beam being used in a torsion beam-type suspension apparatus, having a pair of right and left arms coupled to both end portions in a longitudinal direction, and including a central portion and an attachment closed cross-sectional portion of which a cross-section orthogonal to the longitudinal direction has a substantially constant closed cross-sectional shape of a substantial V-shape or a substantial U-shape in which a part between a front end and a rear end in a forward/rearward direction of a vehicle body protrudes upward or downward, and a shape changing portion which is positioned between the central portion and the attachment closed cross-sectional portion, the torsion beam manufacturing method including: a press working step of forming a torsion beam material which is obtained by pressing a metal material pipe and has the central portion and the shape changing portion, and a compression treatment step of compressing at least a connection portion connecting the central portion and the shape changing portion to each other in the torsion beam material in the longitudinal direction.

In the torsion beam manufacturing method of the above aspect, since the torsion beam manufacturing method includes the press working step of forming a torsion beam material which is obtained by pressing a metal material pipe and has the central portion and the shape changing portion, and the compression treatment step of compressing at least the connection portion connecting the central portion and the shape changing portion to each other in the torsion beam material in the longitudinal direction, tensile residual stress can be reduced or removed from the connection portion.

As a result, a torsion beam having excellent fatigue durability can be efficiently manufactured.

In this specification, the central portion refers to a part in which a substantially constant closed cross-sectional shape of a substantial V-shape or a substantial U-shape (for example, a valley portion (bottom portion) of a wall portion constituting a recessed side of a substantial V-shape or a substantial U-shape) is formed continuously along the longitudinal direction. In addition, until the valley portion (bottom portion) of the wall portion constituting the recessed side of the substantial V-shape or the substantial U-shape reaches the shape changing portion that gradually becomes shallower, even when unevenness is partially formed, the valley portion is included in the central portion.

Further, the central portion may be configured such that from the left and right ends to the center along the longitudinal direction of the torsion beam, while the substantial V-shape or the substantial U-shape is maintained, the area of the closed cross-section is gradually changed. The torsion beam or the torsion beam material having such a shape can be obtained by pressing a metal material pipe whose diameter gradually changes from the left and right ends to the center along the longitudinal direction.

Further, in this specification, the shape changing portion is a part in which a shape in which the valley portion (bottom portion) of the wall portion constituting the recessed side of the substantial V-shape or the substantial U-shape becomes gradually shallower is continuously formed. In addition, a part in which the valley part (bottom portion) becomes partially shallower may be formed in the middle of the shape changing portion.

In addition, in this specification, the attachment closed cross-sectional portion denotes a part which is positioned outward in the longitudinal direction of the shape changing portion (outward in a vehicle width direction) and in which a recessed part having a substantial V-shape or a substantial U-shape is not formed.

Further, in this specification, the connection portion that connects the central portion and the shape changing portion refers to a portion including the boundary between the central portion and the shape changing portion, and the valley portion (bottom portion) of the wall portion constituting the recessed side of the substantial V-shape or the substantial U-shape formed in the central portion along the longitudinal direction is a part including a portion that is transferred to a shape which gradually becomes shallower in the shape changing portion and is inclined with respect to the longitudinal direction. In addition, the range of the connection portion can be randomly set based on distribution of tensile residual stress or the like.

(b) In the torsion beam manufacturing method according to the above (a), in the compression treatment step, an inner side support member is inserted into the shape changing portion of the torsion beam material and the shape changing portion is pinched by a shape changing portion support member to compress the connection portion in the longitudinal direction.

According to the torsion beam manufacturing method, in the compression treatment step, since the inner side support member is inserted into the shape changing portion of the torsion beam material and the shape changing portion is pinched by the shape changing portion support member to compress the connection portion in the longitudinal direction, the deformation of the shape changing portion can be reliably suppressed while easily compressing the connection portion of the torsion beam material inward in the longitudinal direction.

As a result, a torsion beam having excellent fatigue durability can be efficiently manufactured.

(c) In the torsion beam manufacturing method according to the above (a), in the compression treatment step, the connection portion is compressed in the longitudinal direction by holding the attachment closed cross-sectional portion of the torsion beam material.

According to the torsion beam manufacturing method, in the compression treatment step, since the connection portion is compressed in the longitudinal direction by holding the attachment closed cross-sectional portion of the torsion beam material, the torsion beam material can be compressed inward in the longitudinal direction over the entire length.

As a result, a torsion beam having excellent fatigue durability can be efficiently manufactured.

(d) As another alternative aspect of the present invention, there is provided a torsion beam manufacturing apparatus for manufacturing a torsion beam being used in a torsion beam-type suspension apparatus, having a pair of right and left arms coupled to both end portions in a longitudinal direction, and including a central portion and an attachment closed cross-sectional portion of which a cross-section orthogonal to the longitudinal direction has a substantial V-shape or a substantial U-shape in which a part between a front end and a rear end in a forward/rearward direction of a vehicle body protrudes upward or downward, and a shape changing portion which is positioned between the central portion and the attachment closed cross-sectional portion, the torsion beam manufacturing apparatus including: a shape changing portion outside holding member that has an exterior shape holding shape portion formed complementarily to the shape changing portion; a shape changing portion support member that is provided in the forming die, pinches the shape changing portion from an inner side in the longitudinal direction, and supports the shape changing portion; a driving unit that moves an attachment closed cross-sectional portion holding member forward and rearward in the longitudinal direction of a torsion beam material; and a control unit, in which the control unit is configured to move the shape changing portion support member inward in the longitudinal direction of the torsion beam material in a state where the shape changing portion is held by the shape changing portion outside holding member and the shape changing portion support member after the torsion beam material is formed.

According to the torsion beam apparatus, the connection portion is compressed in the longitudinal direction by moving the shape changing portion support member inward in the longitudinal direction of the torsion beam material in a state where the shape changing portion is held by the shape changing portion outside holding member which has the exterior shape holding shape portion formed complementarily to the shape changing portion, and the shape changing portion support member which is provided in the forming die, pinches the shape changing portion from the inner side in the longitudinal direction, and supports the shape changing portion. Therefore, stable compression treatment can be performed by preventing the shape changing portion from being deformed.

As a result, a torsion beam having excellent fatigue durability can be efficiently manufactured.

(e) As further another alternative aspect of the present invention, there is provided a torsion beam manufacturing apparatus for manufacturing a torsion beam being used in a torsion beam-type suspension apparatus, having a pair of right and left arms coupled to both end portions in a longitudinal direction, and including a central portion and an attachment closed cross-sectional portion of which a cross-section orthogonal to the longitudinal direction has a substantial V-shape or a substantial U-shape in which a part between a front end and a rear end in a forward/rearward direction of a vehicle body protrudes upward or downward, and a shape changing portion which is positioned between the central portion and the attachment closed cross-sectional portion, the torsion beam manufacturing apparatus including: an attachment closed cross-sectional portion holding member that holds the attachment closed cross-sectional portion; a driving unit that moves the attachment closed cross-sectional portion holding member forward and rearward in the longitudinal direction of a torsion beam material, and a control unit, in which the control unit is configured to compress the torsion beam material in the longitudinal direction in a state where the attachment closed cross-sectional portion holding member holds the attachment closed cross-sectional portion.

According to the torsion beam apparatus, since the connection portion is compressed in the longitudinal direction by holding the attachment closed cross-sectional portion of the torsion beam material, the torsion beam material can be compressed inward in the longitudinal direction over the entire length.

As a result, a torsion beam having excellent fatigue durability can be efficiently manufactured.

(f) As still another alternative aspect of the present invention, there is provided a torsion beam manufacturing apparatus for manufacturing a torsion beam being used in a torsion beam-type suspension apparatus, having a pair of right and left arms coupled to both end portions in a longitudinal direction, and including a central portion and an attachment closed cross-sectional portion of which a cross-section orthogonal to the longitudinal direction has a substantial V-shape or a substantial U-shape in which a part between a front end and a rear end in a forward/rearward direction of a vehicle body protrudes upward or downward, and a shape changing portion which is positioned between the central portion and the attachment closed cross-sectional portion, the torsion beam manufacturing apparatus including: a forming die that presses a metal material pipe and forms a torsion beam material having the central portion and the shape changing portion; a shape changing portion support member that is provided in the forming die, pinches the shape changing portion from an inner side in the longitudinal direction, and supports the shape changing portion; a shape changing portion support member driving unit that is provided in the forming die and moves the shape changing portion support member forward and rearward in the longitudinal direction; an inner side support member that is able to be inserted into the shape changing portion and holds the shape changing portion in cooperation with the shape changing portion support member; and a control unit, in which the control unit is configured to move the shape changing portion support member inward in the longitudinal direction of the torsion beam material in a state where the shape changing portion is held by the shape changing portion support member and the inner side support member after the torsion beam material is formed.

According to the torsion beam manufacturing apparatus, the control unit causes the driving unit to compress the torsion beam material inward in the longitudinal direction in a state where the shape changing portion support member and the inner side support member hold the shape changing portion in cooperation with each other after the metal material pipe is pressed and the torsion beam material is formed. Therefore, tensile residual stress can be reduced or removed from a connection portion.

As a result, a torsion beam having excellent fatigue durability can be efficiently manufactured.

(g) There is provided a torsion beam manufacturing apparatus for manufacturing a torsion beam being used in a torsion beam-type suspension apparatus, having a pair of right and left arms coupled to both end portions in a longitudinal direction, and including a central portion and an attachment closed cross-sectional portion of which a cross-section orthogonal to the longitudinal direction has a substantial V-shape or a substantial U-shape in which a part between a front end and a rear end in a forward/rearward direction of a vehicle body protrudes upward or downward, and a shape changing portion which is positioned between the central portion and the attachment closed cross-sectional portion, the torsion beam manufacturing apparatus including: a forming die that presses a metal material pipe and forms a torsion beam material having the central portion and the shape changing portion; a shape changing portion support member that is provided in the forming die, pinches the shape changing portion from an inner side in the longitudinal direction, and supports the shape changing portion; a shape changing portion support member driving unit that is provided in the forming die and moves the shape changing portion support member forward and rearward in the longitudinal direction; and an inner side support member that is able to be inserted into the shape changing portion and holds the shape changing portion in cooperation with the shape changing portion support member, in which the driving unit is constituted of a cam mechanism which operates in accordance with strokes when the forming die forms the torsion beam material.

According to the torsion beam manufacturing apparatus, the driving unit compresses the torsion beam material inward in the longitudinal direction in a state where the shape changing portion support member and the inner side support member hold the shape changing portion in cooperation with each other as the cam mechanism operates in accordance with strokes when the torsion beam material is formed after the metal material pipe is pressed and the torsion beam material is formed. Therefore, tensile residual stress can be reduced or removed from a connection portion.

As a result, a torsion beam having excellent fatigue durability can be efficiently manufactured.

(h) The torsion beam manufacturing apparatus according to any one of the above (d) to (g) further includes a shape change absorption unit that is changed in shape in the longitudinal direction and is displaced when the torsion beam material is compressed in the longitudinal direction.

According to the torsion beam manufacturing apparatus, since the torsion beam manufacturing apparatus includes the shape change absorption unit that is changed in shape in the longitudinal direction and is displaced when the torsion beam material is compressed in the longitudinal direction, even in a case where a torsion beam has a shape with a significant central side in the longitudinal direction, compression treatment can be easily performed.

In addition, it is possible to prevent damage to the torsion beam material when performing the compression treatment and to efficiently reduce residual stress.

Effects of the Invention

According to the torsion beam manufacturing method and the torsion beam manufacturing apparatus in the aspects described above, a torsion beam having excellent fatigue durability can be more efficiently manufactured.

EMBODIMENTS OF THE INVENTION

First Embodiment

Hereinafter, with reference to FIGS. 1 to 9, a first embodiment of the present invention will be described.

Figure 1:
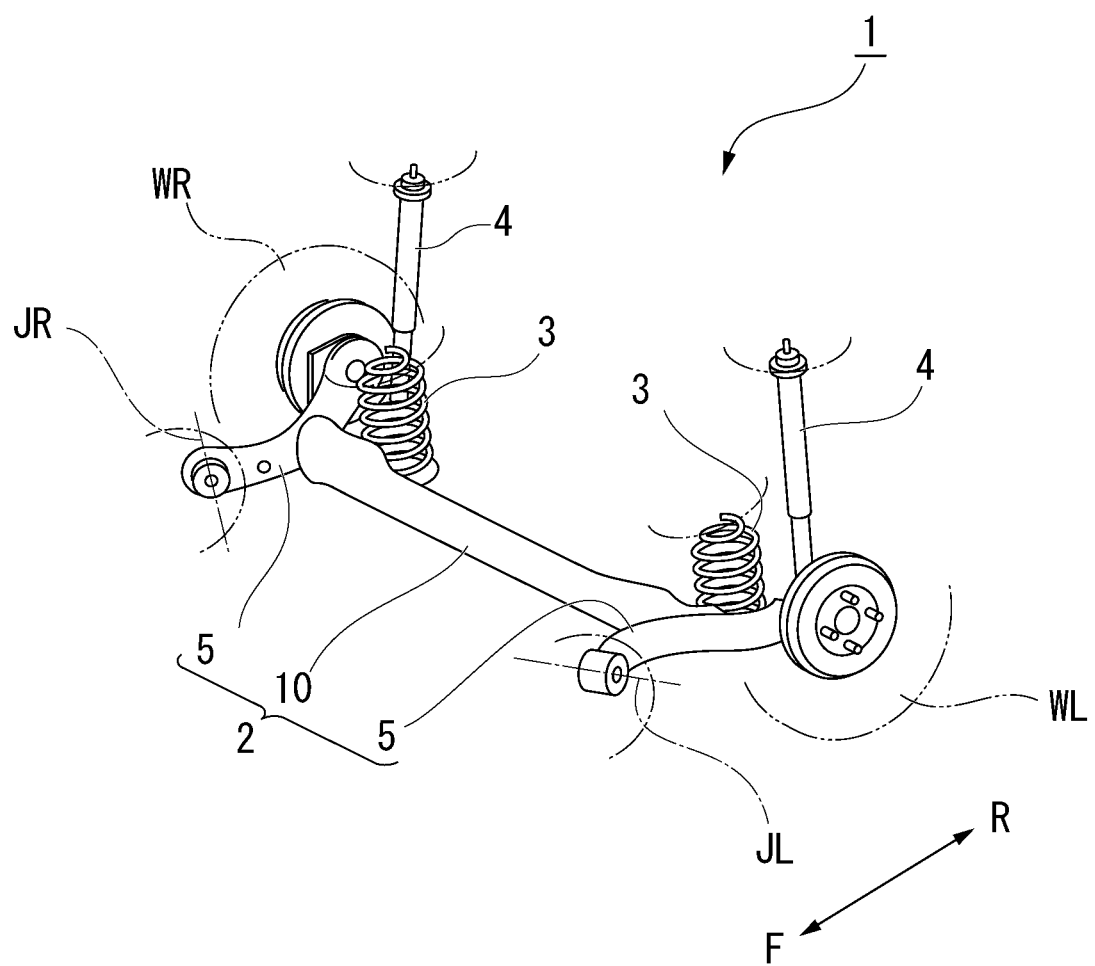
FIG. 1 is a perspective view illustrating a schematic configuration of a torsion beam-type rear suspension apparatus according to a first embodiment of the present invention.

FIG. 1 is a view illustrating a schematic configuration of a torsion beam-type rear suspension apparatus (torsion beam-type suspension apparatus) according to the present embodiment. The reference sign 1 indicates a torsion beam-type rear suspension apparatus. The reference sign 2 indicates a torsion beam assembly. The reference sign 10 indicates a torsion beam. The reference sign F illustrated in FIG. 1 indicates the front of a vehicle (not illustrated) in which the torsion beam-type rear suspension apparatus 1 is mounted, and the reference sign R indicates the rear.

As illustrated in FIG. 1, the torsion beam-type rear suspension apparatus 1 includes the torsion beam assembly 2, and springs 3 and absorbers 4 through which the torsion beam assembly 2 and a vehicle body (not illustrated) are coupled to each other.

The torsion beam assembly 2 supports right and left wheels WL and WR using a pair of right and left trailing arms 5 and is coupled to the vehicle body via pivot axes JL and JR extending respectively from the right and the left of the vehicle body slightly forward toward the central side of the vehicle body. Then, the torsion beam assembly 2 is oscillatable with respect to the vehicle body.

Figure 2:
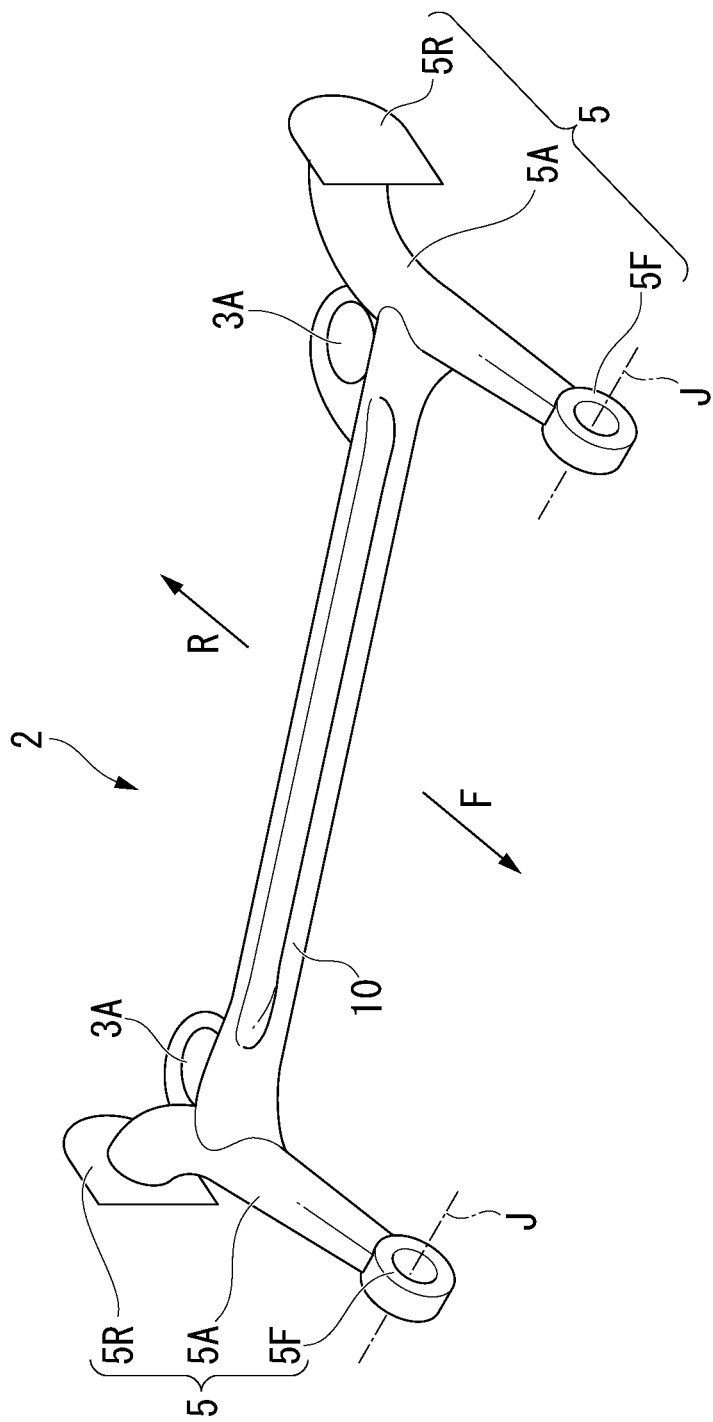
FIG. 2 is a view illustrating a schematic configuration of a torsion beam assembly according to the same embodiment and is a perspective view seen from below.

As illustrated in FIG. 2, for example, the torsion beam assembly 2 includes the pair of right and left trailing arms (arms) 5, the torsion beam 10 through which the trailing arms 5 are coupled to each other, and a pair of right and left spring receiving portions 3A which respectively support the springs 3. In addition, one end side of the absorbers 4 (cushioning device) is connected to a cushioning reception portion (not illustrated).

In the present embodiment, the torsion beam 10 has a closed cross-sectional shape of a substantial V-shape projected upward.

As illustrated in FIG. 2, for example, the trailing arms 5 include trailing arm main bodies 5A, pivot attachment members 5F which are respectively connected to front ends of the trailing arm main bodies 5A and are supported by the vehicle body via pivot axes J, and wheel attachment members 5R which are respectively coupled to rear ends of the trailing arm main bodies 5A and support the wheels WL and WR.

The spring receiving portion 3A is disposed on a side opposite to the pivot attachment member 5F with the torsion beam 10 interposed therebetween. One end side of the spring 3 is attached to the spring receiving portion 3A. A load received from a road surface is transmitted to the vehicle via the wheels WL and WR, the trailing arms 5, and the springs 3.

Hereinafter, with reference to FIGS. 3 to 5C, the torsion beam 10 according to the present embodiment will be described.

Figure 3:
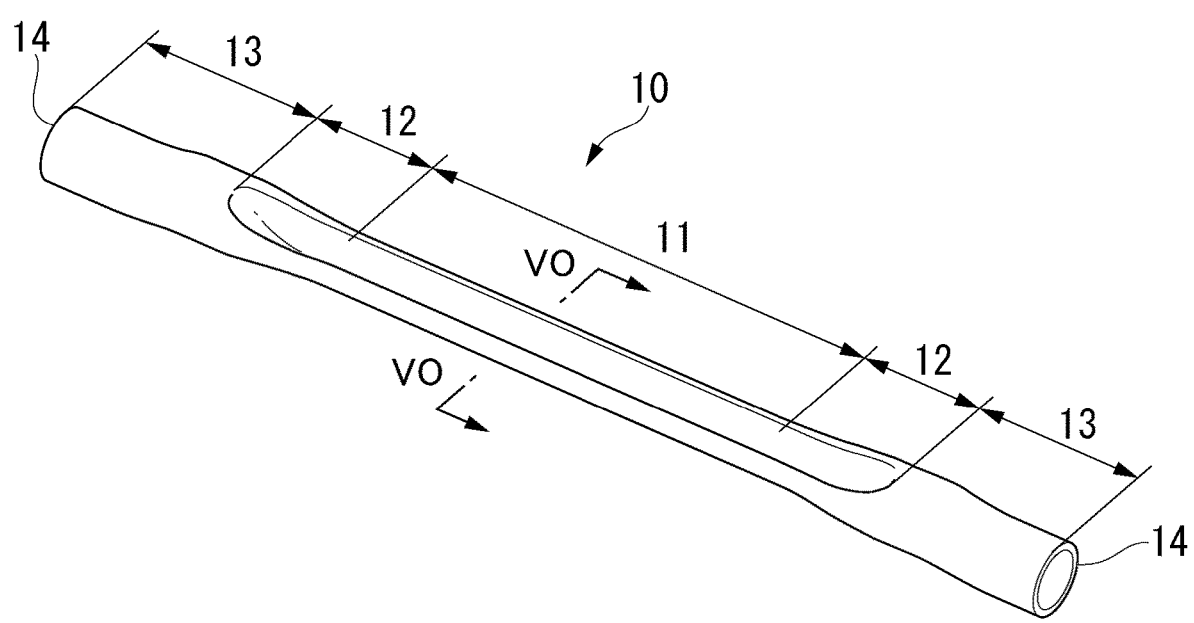
FIG. 3 is a perspective view illustrating a schematic configuration of a torsion beam according to the same embodiment.
Figure 4:
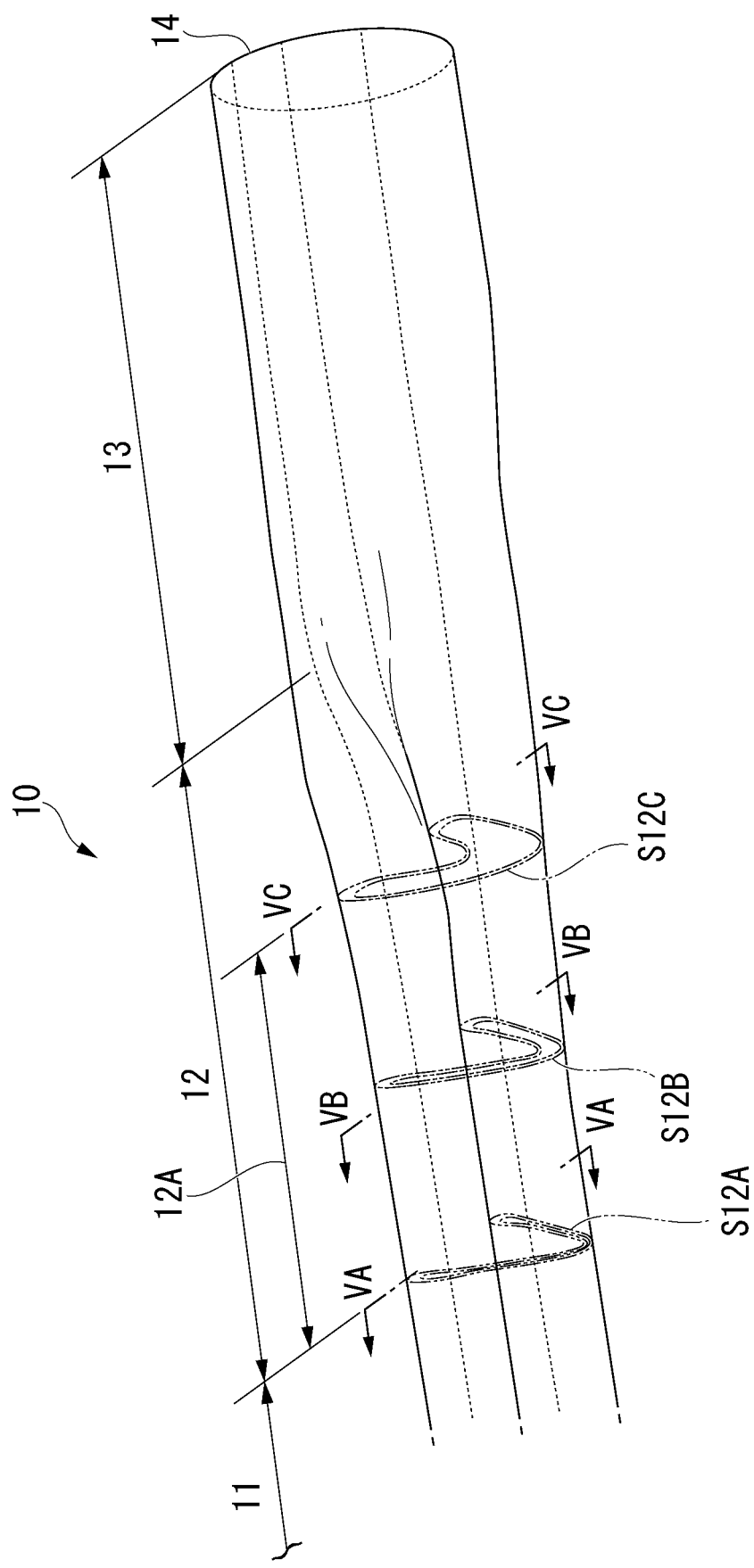
FIG. 4 is a perspective view illustrating a schematic configuration of a shape changing portion of the torsion beam according to the same embodiment.
Figure 5A:
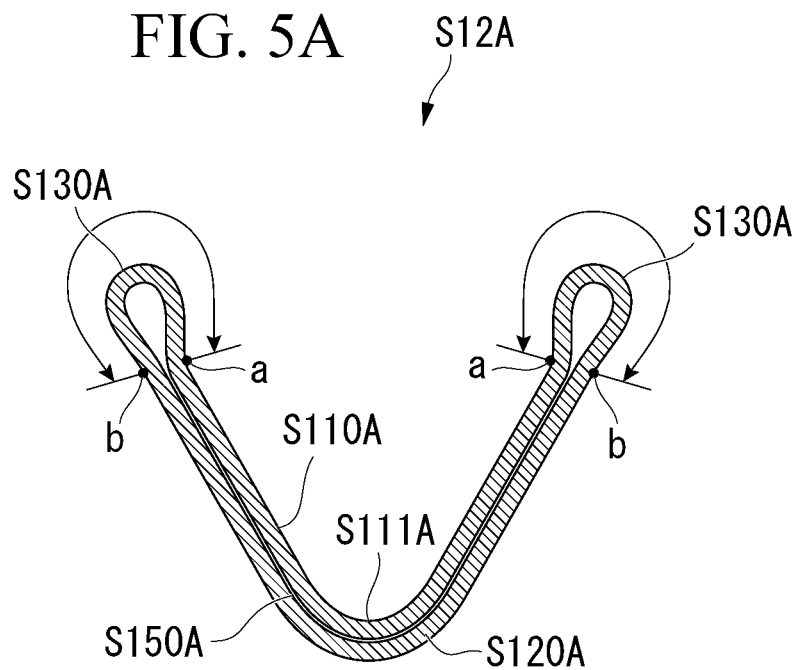
FIG. 5A is a view illustrating a schematic configuration of the torsion beam according to the same embodiment and is a closed cross-sectional view seen along arrow VA-VA in FIG. 4.
Figure 5B:
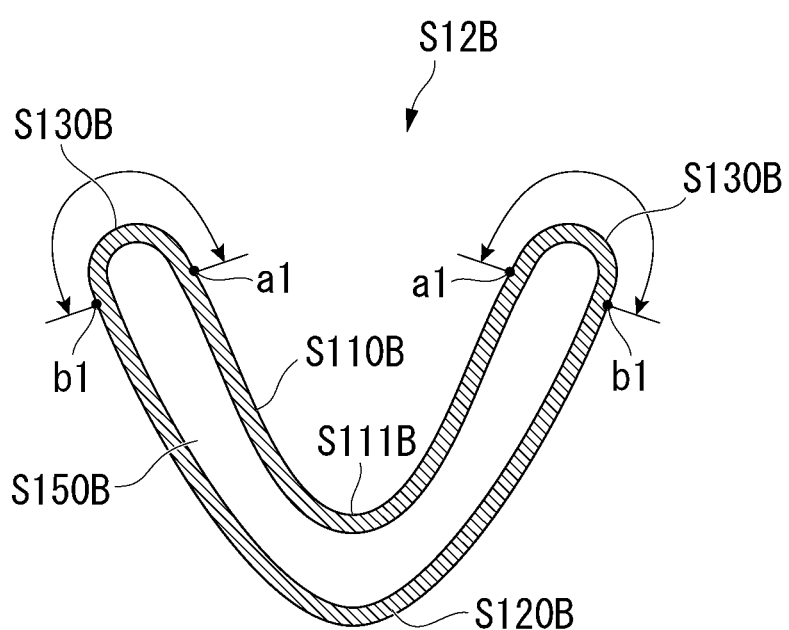
FIG. 5B is a view illustrating a schematic configuration of the torsion beam according to the same embodiment and is a closed cross-sectional view seen along arrow VB-VB in FIG. 4.
Figure 5C:
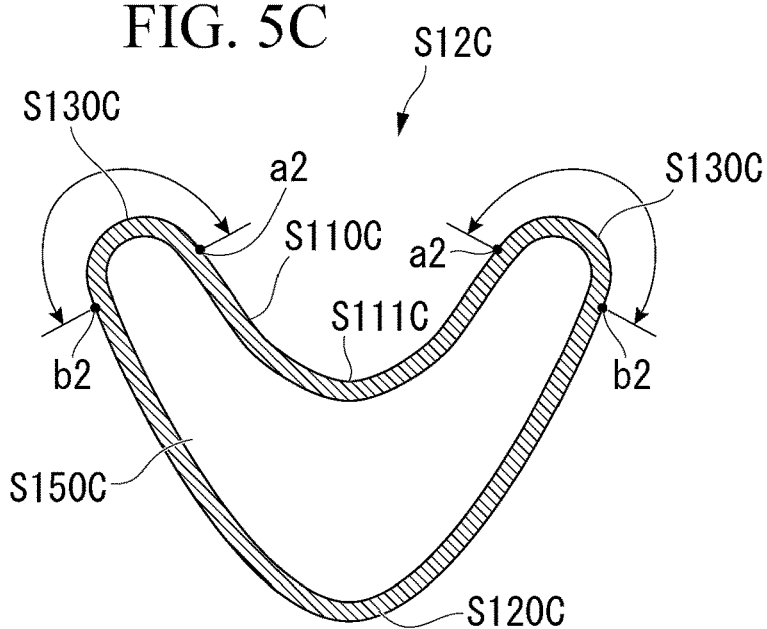
FIG. 5C is a view illustrating a schematic configuration of the torsion beam according to the same embodiment and is a closed cross-sectional view seen along arrow VC-VC in FIG. 4.

FIG. 3 is a perspective view illustrating a schematic configuration of a torsion beam 10 according to the present embodiment. FIG. 4 is a perspective view illustrating the outline in the vicinity of a shape changing portion of the torsion beam 10. FIGS. 5A to 5C are cross-sectional views illustrating the torsion beam 10, FIG. 5A shows a cross-sectional view taken along arrow VA-VA in FIG. 4, FIG. 5B is a cross-sectional view taken along arrow VB-VB in FIG. 4, and FIG. 5C is a cross-sectional view taken along arrow VC-VC in FIG. 4.

As illustrated in FIGS. 3 and 4, the torsion beam 10 includes a central portion 11 which is formed on a central side in a longitudinal direction and has a substantially uniform V-shape, shape changing portions 12, attachment closed cross-sectional portions 13, and attachment portions 14 which are formed in outer side end portions of the attachment closed cross-sectional portions 13, which have a substantially elliptic closed cross-sectional shape, and to which the trailing arms 5 are attached.

The central portion 11 may be a part in which a substantially constant closed cross-sectional shape having a substantial V-shape or a substantial U-shape is continuously formed along the longitudinal direction in a view where the torsion beam 10 is seen in a cross-section orthogonal to the longitudinal direction. In the central portion 11, unevenness may be partially formed in the valley portion (bottom portion) of the wall portion constituting the recessed side having a substantial V-shape or a substantial U-shape.

The shape changing portion 12 is a part in which the depth of the valley portion (bottom portion) of the wall portion constituting the recessed side having a substantial V-shape or a substantial U-shape gradually becomes shallower outward in the longitudinal direction (outward in a vehicle width direction). A portion in which the valley portion (bottom portion) becomes shallower may be partially formed in the middle of the shape changing portion 12.

The attachment closed cross-sectional portion 13 denotes a part which is disposed outward in the longitudinal direction of the shape changing portion 12 (outward in the vehicle width direction) and in which a recessed part having a substantial V-shape or a substantial U-shape is not formed.

The central portion 11, the shape changing portions 12, the attachment closed cross-sectional portions 13, and the attachment portions 14 are disposed in this order from the center of the torsion beam 10 to both ends in the longitudinal direction.

As illustrated in FIGS. 3 and 4, the central portion 11 is positioned at the center of the torsion beam 10 in the longitudinal direction and is connected to the shape changing portions 12 at both ends in the longitudinal direction.

In the central portion 11, a cross-section orthogonal to the longitudinal direction of the torsion beam 10 is formed into a substantial V-shape. In this embodiment, for example, the central portion 11 has a symmetric shape in a forward/rearward direction of the vehicle body.

For example, the cross-section of the central portion 11 includes a first wall portion S110A forming a recessed side inner surface in the closed cross-section having a substantial V-shape illustrated in FIG. 5A, a second wall portion S120A forming a projected side outer surface, and two folded wall portions S130A connecting both ends of each of the first wall portion S110A and the second wall portion S120A and swelling outward in the closed cross-section. The central portion of the first wall portion S110A in the circumferential direction is formed into a valley portion (bottom portion) S111A of a recessed side having a substantial V-shape in the central portion 11.

Then, the first wall portion S110A and the second wall portion S120A are in contact with each other via an adhering portion S150A.

The range of each of the folded wall portions S130A is indicated with the arrow in FIG. 5A, and each thereof is formed between a first wall portion side folded point a and a second wall portion side folded point b.

The first wall portion side folded point a is a connection point between the end edge of the first wall portion S110A and the end edge of the folded wall portion S130A. In addition, the second wall portion side folded point b is a connection point between the end edge of the second wall portion S120A and the end edge of the folded wall portion S130A.

The connection portion 12A (connection region) illustrated in FIG. 4 is a part which is included in the shape changing portion 12, is positioned on a side on which the central portion 11 and the shape changing portion 12 are connected to each other in the shape changing portion 12, and includes the boundary between the central portion 11 and the shape changing portion 12. That is, as illustrated in FIG. 4, the connection portion 12A is a part from the cross-section S12A which is the boundary between the central portion 11 and the shape changing portion 12 to the longitudinal direction middle position of the shape changing portion 12 (for example, the position of the cross-section S12C in which the valley portion (bottom portion) of the wall portion constituting the recessed side having a substantial V-shape or a substantial U-shape in the shape changing portion 12 gradually becomes shallower and is transferred to a shape inclined to the longitudinal direction).

A range of the connection portion 12A can be randomly set based on the distribution of tensile residual stress or the like. For example, the connection portion 12A may include a portion in which the tensile residual stress is maximum in the shape changing portion 12. In addition, the range of the connection portion 12A may be a predetermined range from the boundary between the central portion 11 and the shape changing portion 12, or may include a portion in which the tensile residual stress is maximum in the shape changing portion 12 and may be a predetermined range from the boundary between the central portion 11 and the shape changing portion 12.

As illustrated in FIG. 5B, for example, the cross-section S12B included in the connection portion 12A includes a first wall portion S110B forming a recessed side inner surface in the closed cross-section having a substantial V-shape, a second wall portion S120B forming a projected side outer surface in the closed cross-section, and two folded wall portions S130B connecting both ends of the first wall portion S110B and the second wall portion S120B and swelling outward in the closed cross-section. The central portion of the first wall portion S110B in the circumferential direction is formed into a valley portion (bottom portion) S111B of a recessed side having a substantial V-shape in the connection portion 12A.

Then, a hollow portion S150B is formed between the first wall portion S110B and the second wall portion S120B.

The range of each of the folded wall portions S130B is indicated with the arrow in FIG. 5B, and each thereof is formed between a first wall portion side folded point a1 and a second wall portion side folded point b1.

The first wall portion side folded point a1 is a connection point between the end edge of the first wall portion S110B and the end edge of the folded wall portion S130B. In addition, the second wall portion side folded point b1 is a connection point between the end edge of the second wall portion S120B and the end edge of the folded wall portion S130B.

As illustrated in FIG. 4, in the shape changing portion 12, a center-sided part in the longitudinal direction of the torsion beam 10 is connected to the central portion 11 and an outer side in the longitudinal direction is connected to the attachment closed cross-sectional portion 13.

In addition, in the shape changing portion 12, the shape of the closed cross-section orthogonal to the longitudinal direction of the torsion beam 10 is gradually transformed from the central portion 11 into the attachment closed cross-sectional portion 13.

As illustrated in FIG. 5C, for example, the shape changing portion 12 includes a first wall portion S110C forming a recessed side inner surface in the closed cross-section having a substantial V-shape, a second wall portion S120C forming a projected side outer surface in the closed cross-section, and two folded wall portions S130C connecting both ends of each of the first wall portion S110C and the second wall portion S120C and swelling outward in the closed cross-section. The central portion of the first wall portion S110C in the circumferential direction is formed into a valley portion (bottom portion) S111C of a recessed side having a substantial V-shape.

Then, a hollow portion S150C is formed between the first wall portion S110C and the second wall portion S120C.

The range of each of the folded wall portions S130C is indicated with the arrow in FIG. 5C, and each thereof is formed between a first wall portion side folded point a2 and a second wall portion side folded point b2.

The first wall portion side folded point a2 is a connection point between the end edge of the first wall portion S110C and the end edge of the folded wall portion S130C. In addition, the second wall portion side folded point b2 is a connection point between the end edge of the second wall portion S120C and the end edge of the folded wall portion S130C.

As illustrated in FIG. 4, for example, the attachment closed cross-sectional portion 13 is positioned outward in the longitudinal direction of the shape changing portion 12 (outward in the vehicle width direction) and has a substantially elliptic-shaped closed cross-section in which a recessed part having a substantial V-shape or a substantial U-shape is not formed.

Figure 6:
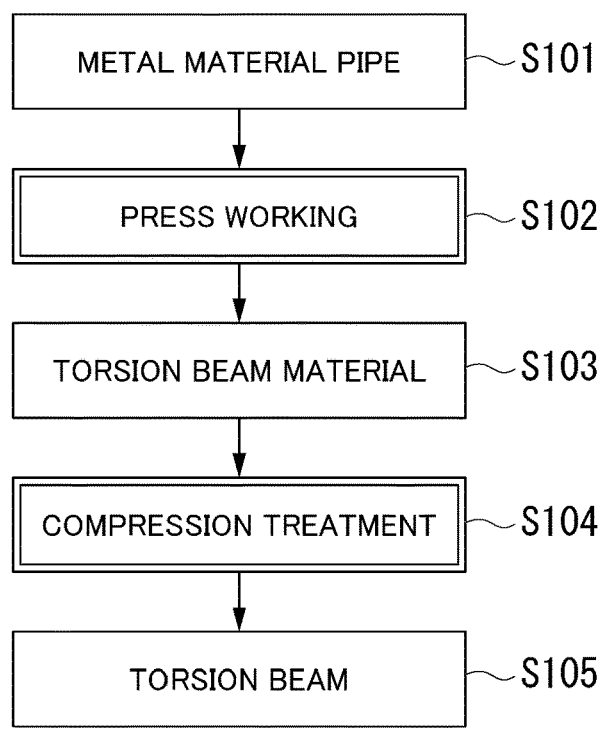
FIG. 6 is a flowchart illustrating an example of a step of manufacturing a torsion beam according to the same embodiment.

Next, an example of a torsion beam 10 manufacturing step according to the first embodiment will be described with reference to FIG. 6. FIG. 6 is a flowchart illustrating an example of the torsion beam 10 manufacturing step.

Hereinafter, with reference to FIG. 6, the torsion beam 10 manufacturing step will be described.

(1) A metal material pipe is prepared (Step S101). As the metal material pipe to be prepared, for example, it is possible to use a circular steel pipe having a uniform thickness.

(2) Next, in a press working step, the metal material pipe is subjected to press working (Step S102). A torsion beam material is formed by pressing a metal material pipe. For the press working, a known press working machine can be used.

(3) A torsion beam material is formed (Step S103) through the press working in Step S102. The torsion beam material has a central portion, shape changing portions, and attachment closed cross-sectional portions, and a connection portion (connection region) for connecting the central portion and the shape changing portion is formed.

(4) Next, in the compression treatment step, the torsion beam material is compressed in the axial direction without applying hydraulic pressure to the inside of the torsion beam material (Step S104). In this compression treatment, by applying a strain amount equal to or greater than 0.5% and equal to or smaller than 2.0% to the torsion beam material in the axial direction, the residual stress on the front and rear surfaces in the sheet thickness direction can be released without causing buckling. In addition, the compression force may be applied only to a portion of the torsion beam material in the longitudinal direction, particularly a portion in which the residual stress is to be reduced, but the addition over the entire length as in this embodiment is more preferable in that the residual stress can be reduced as a whole without leakage.

(5) In Step S104, the torsion beam 10 is formed through compression treatment of the torsion beam material (Step S105).

Figure 7:
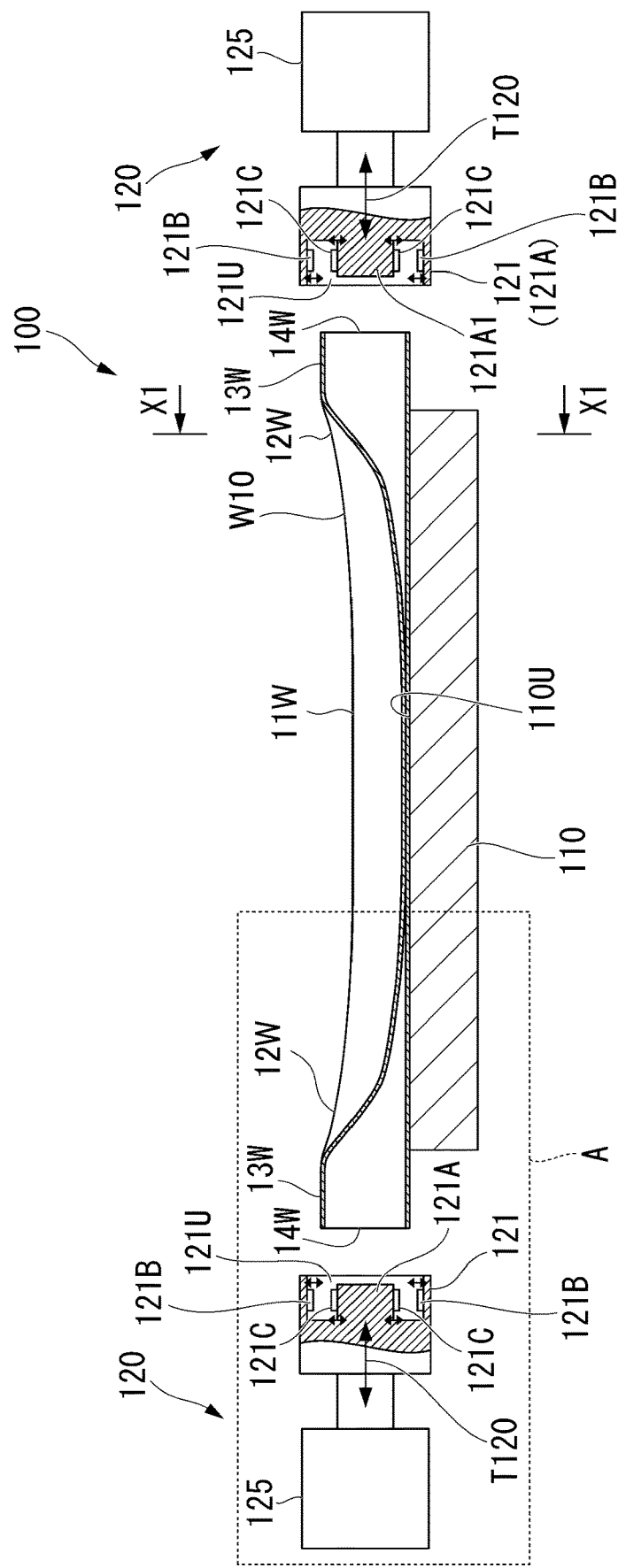
FIG. 7 is a longitudinal sectional view illustrating a schematic configuration of a torsion beam manufacturing apparatus according to the same embodiment.
Figure 8:
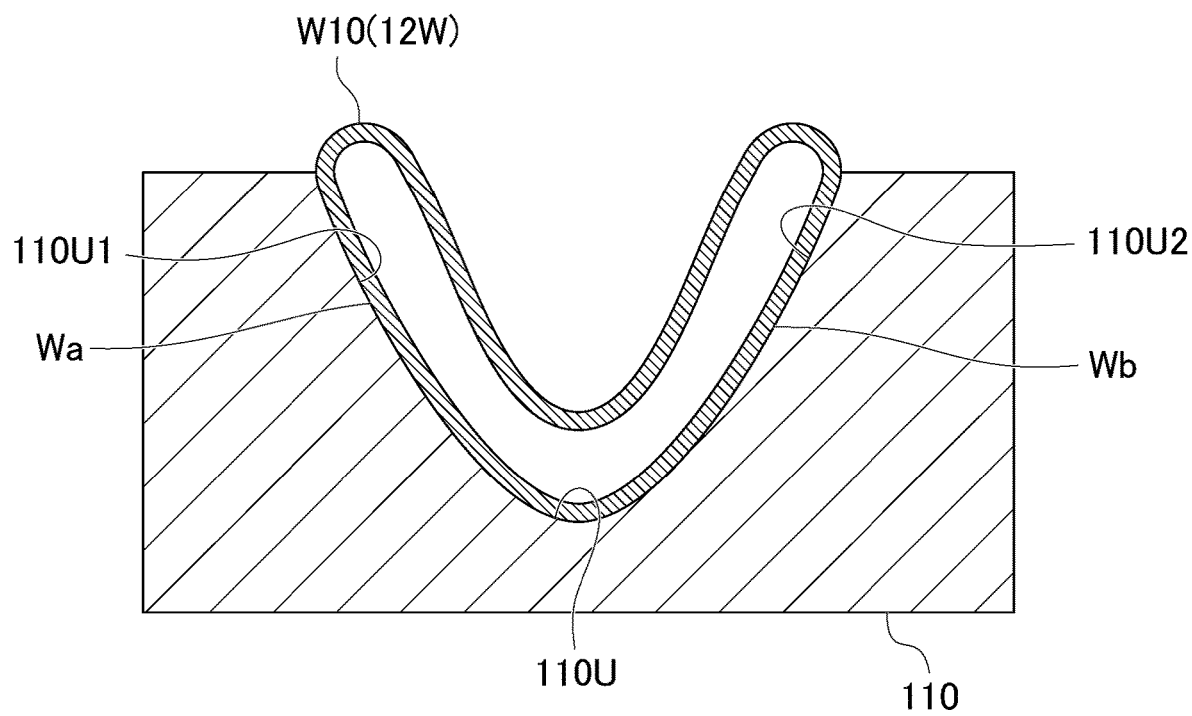
FIG. 8 is a view illustrating a main part of the torsion beam manufacturing apparatus according to the same embodiment, and is a longitudinal sectional view seen along arrow X1-X1 in FIG. 7.
Figure 9:
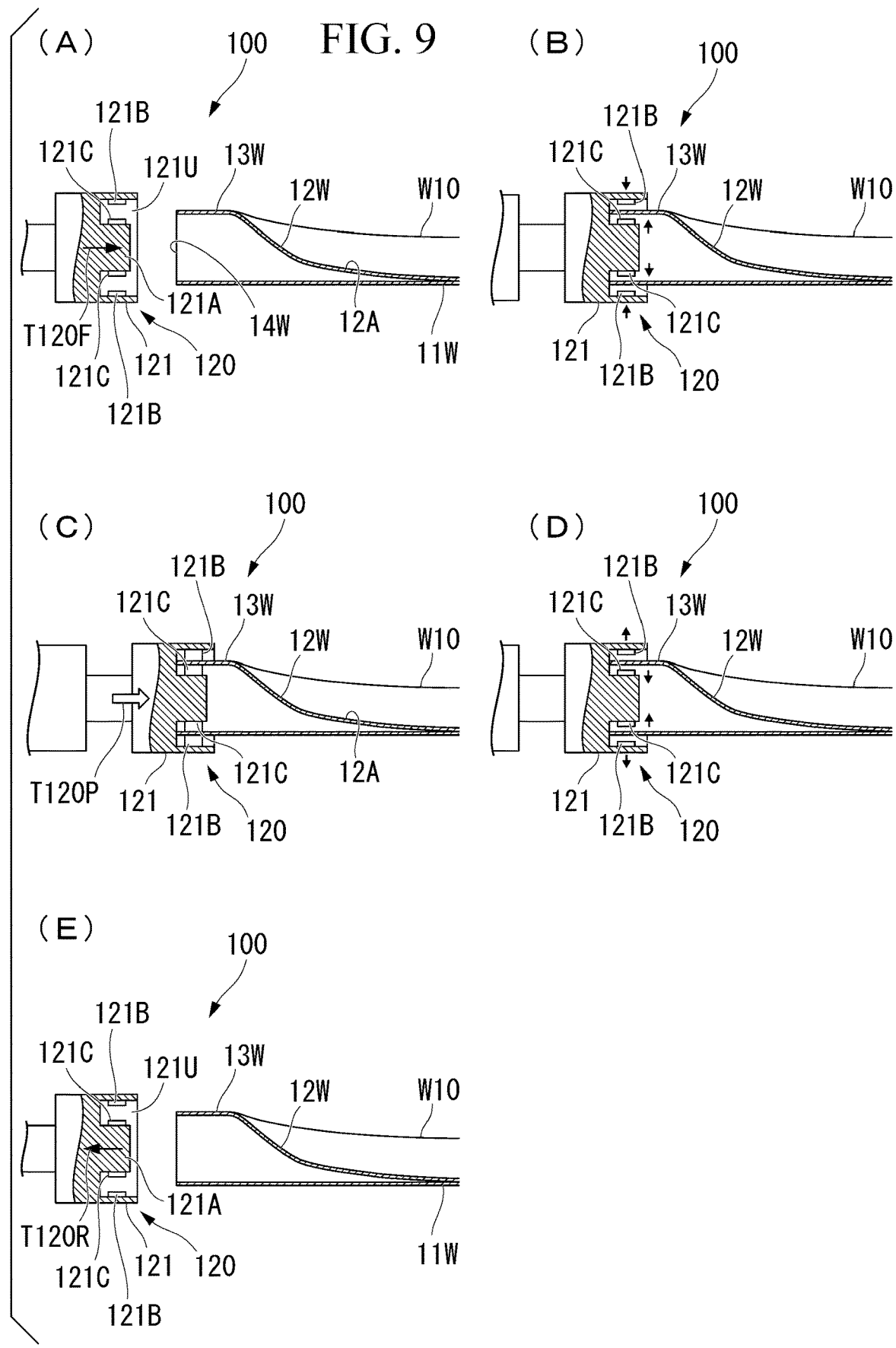
FIG. 9 is a view illustrating a compression treatment step of a torsion beam manufacturing method according to the same embodiment along a flow of (A) to (E) and is a view corresponding to A-section in FIG. 7.

Next, with reference to FIGS. 7 and 8, a schematic configuration of a torsion beam manufacturing apparatus according to the first embodiment will be described. FIG. 7 is a longitudinal sectional view illustrating a schematic configuration of a torsion beam manufacturing apparatus 100 according to the first embodiment. FIG. 8 is a view illustrating the torsion beam manufacturing apparatus according to the same embodiment, and is a longitudinal sectional view seen along arrow X1-X1 in FIG. 7.

The torsion beam manufacturing apparatus 100 includes a torsion beam material support base 110 on which a torsion beam material W10 is placed, two compression treatment units 120 which compress the torsion beam material W10 in its longitudinal direction, and a control unit (not illustrated).

A recessed part 110U corresponding to an exterior shape of the torsion beam material W10 is formed in an upper portion of the torsion beam material support base 110, which stably supports the torsion beam material W10 placed on the recessed part 110U.

In the following description regarding the torsion beam material W10, to be distinguished from the torsion beam 10, portions corresponding to the portions of the torsion beam 10, such as the central portion 11, the shape changing portion 12, the attachment closed cross-sectional portion 13, and the attachment portion 14, will be described with distinguishable reference signs, such as a central portion 11W, a shape changing portion 12W, an attachment closed cross-sectional portion 13W, and an attachment portion 14W.

As illustrated in FIG. 8, the recessed part 110U has a cross-sectional shape which has a substantial V-shape or substantial U-shape at any position in the longitudinal direction. This cross-sectional shape matches with the longitudinal cross-sectional shapes of the central portion 11W and the shape changing portion 12W of the torsion beam material W10. More specifically, a support surface 110U1 which supports an outer surface wa of each of the central portion 11W and the shape changing portion 12W, and a support surface 110U2 which supports an outer surface wb of each of the central portion 11W and the shape changing portion 12W are formed in the recessed part 110U. These support surfaces 110U1 and 110U2 are connected to each other at lower end edges thereof.

As illustrated in FIG. 7, the recessed part 110U of the torsion beam material support base 110 does not support the attachment closed cross-sectional portion 13W and the attachment portion 14W. This is because both ends of the torsion beam material W10 are held by an attachment closed cross-sectional portion holding member 121 described later.

As illustrated in FIG. 7, the compression treatment unit 120 includes an attachment closed cross-sectional portion holding member 121 which holds the attachment closed cross-sectional portion 13W of the torsion beam material W10, a hydraulic cylinder (first driving mechanism) 125 which moves the attachment closed cross-sectional portion holding member 121 forward and rearward along arrow T120 in the longitudinal direction of the torsion beam material W10, and the control unit. The operation of the compression treatment unit 120 is controlled by the control unit.

The attachment closed cross-sectional portion holding member 121 includes an attachment closed cross-sectional portion holding member main body 121A in which a protrusion having a shape corresponding to an interior shape of the attachment closed cross-sectional portion 13W is formed along the longitudinal direction of the torsion beam material W10 from the bottom portion of a recessed part 121U, and a plurality of sets of a clamping member 121B and a clamping member 121C disposed to face each other.

The clamping member 121B is connected to a driving unit (not illustrated) such as an actuator and can move forward and rearward from the wall portion of the attachment closed cross-sectional portion holding member main body 121A toward the inside.

The clamping member 121C is connected to a driving unit (not illustrated) such as an actuator and can move forward and rearward from the protrusion of the attachment closed cross-sectional portion holding member main body 121A toward the outside.

The clamping member 121B and the clamping member 121C interpose the vicinity of the attachment portion 14W of the attachment closed cross-sectional portion 13W of the torsion beam material W10 therebetween and hold the attachment portion 14W from the outside and the inside thereof in cooperation with each other. By holding the portion in this manner, it is possible to make the central axis of the attachment portion 14W coincide with the central axis of the attachment closed cross-sectional portion holding member main body 121A. That is, the attachment closed cross-sectional portion 13W can be coaxially held by the attachment closed cross-sectional portion holding member 121. Moreover, the attachment portion 14W at this time is caused to abut on the bottom portion of the recessed part 121U.

In a case where an instruction is received from the control unit, the hydraulic cylinder (first driving mechanism) 125 moves the attachment closed cross-sectional portion holding member 121 forward and rearward in the longitudinal direction of the torsion beam material W10 along the arrow T120.

That is, in a state where the pair of attachment closed cross-sectional portion holding members 121 holds the attachment closed cross-sectional portions 13W at both ends of the torsion beam material W10 by the control unit, the bottom portion of the recessed part 121U is compressed in the longitudinal direction. At this time, in a state where the central portion 11W and the shape changing portion 12W are supported by the recessed part 110U, the central portion and the shape changing portion receive the compression force and thus buckling does not occur. In addition, since both the inner and outer surfaces of the attachment closed cross-sectional portion 13W are also supported by the attachment closed cross-sectional portion holding members 121, buckling does not occur. By applying the compression force to the torsion beam material W10 in a state where buckling is prevented as described above, at least the residual stress in the central portion 11W and the shape changing portion 12W can be removed or reduced. In addition, at least the central portion 11W and the shape changing portion 12W can be thickened at the same time. In the thickening, since the outer surfaces wa and wb of the central portion 11W and the shape changing portion 12W are supported, the thickness is increased so that inner dimension is reduced in a state where the outer dimension of the cross-section is maintained. Therefore, it is possible to increase the thickness while maintaining the outer dimension as designed.

In the embodiment, the compression force is applied from both ends of the torsion beam material W10, but the present invention is not limited thereto. An embodiment in which after the pair of attachment closed cross-sectional portion holding members 121 respectively holds the attachment closed cross-sectional portions 13W at both ends of the torsion beam material W10, the position of one of the pair of attachment closed cross-sectional portion holding members 121 is fixed and the other is caused to approach relatively to the one to compress the torsion beam material W10 can be adopted. This is the same for the other embodiments.

Next, an outline of a compression treatment process using the torsion beam manufacturing apparatus 100 will be described with reference to FIGS. 9(A) to 9(E). FIGS. 9(A) to 9(E) are views illustrating the compression treatment process in the torsion beam manufacturing method according to a flow of FIGS. 9(A) to 9(E), and is a view corresponding to A-section in FIG. 7. The following compression treatment process may be automatically performed by the control unit.

(1) First, the torsion beam material W10 is disposed on the torsion beam material support base 110 to be supported, and then the attachment closed cross-sectional portion holding member 121 is moved forward in a direction of an arrow T120F, as illustrated in FIG. 9(A).

(2) Next, as illustrated in FIG. 9(B), when the attachment portion 14W of the attachment closed cross-sectional portion 13W abuts on the bottom portion of the recessed part 121U, the attachment closed cross-sectional portion holding member 121 is stopped.

Then, the clamping member 121B and the clamping member 121C protrude as indicated with the arrow and hold the attachment closed cross-sectional portion 13W.

(3) Next, as illustrated in FIG. 9(C), when the attachment closed cross-sectional portion 13W is held by the clamping member 121B and the clamping member 121C, the hydraulic cylinder (not illustrated) is operated to compress the torsion beam material W10 in a direction of an arrow T120P along its longitudinal direction. In this compression treatment, by applying a strain amount equal to or greater than 0.5% and equal to or smaller than 2.0% to the torsion beam material W10 in the axial direction, the residual stress on the front and rear surfaces in the sheet thickness direction can be released without causing buckling. In addition, since the attachment closed cross-sectional portion 13W is interposed between the clamping member 121B and the clamping member 121C at the time of axial compression, out-of-plane deformation of the attachment closed cross-sectional portion 13W is suppressed.

(4) When the compression of the torsion beam material W10 is completed, the torsion beam 10 is formed. Thereafter, as illustrated in FIG. 9(D), the clamping member 121B and the clamping member 121C are retracted as indicated by arrows. Thus, the holding of the attachment closed cross-sectional portion 13W is released by the attachment closed cross-sectional portion holding member 121.

(5) When the clamping member 121B and the clamping member 121C are retreated to a predetermined position, as illustrated in FIG. 9(E), the attachment closed cross-sectional portion holding member 121 is retreated in a direction of an arrow T120R, and compression treatment is completed.

According to the torsion beam manufacturing method and the torsion beam manufacturing apparatus 100 of the first embodiment, the torsion beam 10 having excellent fatigue durability can be efficiently manufactured. Since the effect of reducing the residual stress is obtained by the compression, the effect of reducing the stress generated (loaded) on the torsion beam during traveling of the vehicle is obtained and further improvement in fatigue durability can be expected. In addition, since the thickening effect can be obtained by compression at the same time, the structural strength of the torsion beam can be further increased.

Further, according to the torsion beam manufacturing method and the torsion beam manufacturing apparatus 100 of the first embodiment, since the attachment closed cross-sectional portion 13W of the torsion beam material W10 is held to compress the connection portion 12A in the longitudinal direction, compression can be performed over the entire length of the torsion beam material W10. As a result, the tensile residual stress can be removed without leakage in the entire range of the central portion 11W and the shape changing portion 12W of the torsion beam material W10.

Second Embodiment

Figure 11A:
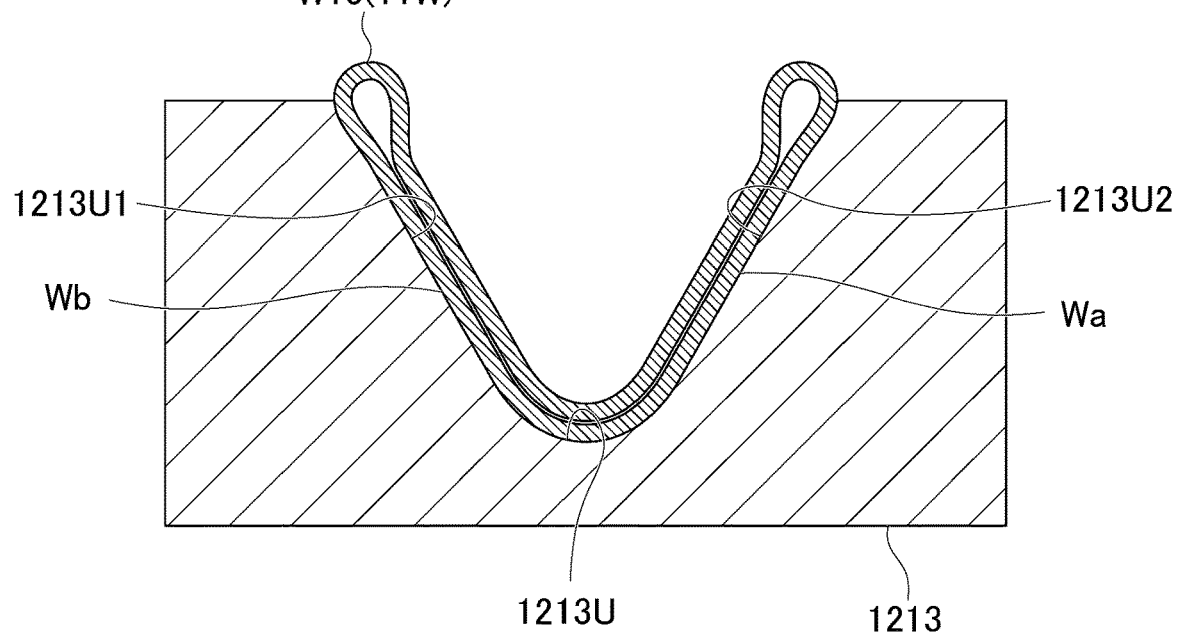
FIG. 11A is a view illustrating a main part of the torsion beam manufacturing apparatus according to the same embodiment, and is a longitudinal sectional view seen along arrow X2-X2 in FIG. 10.
Figure 11B:
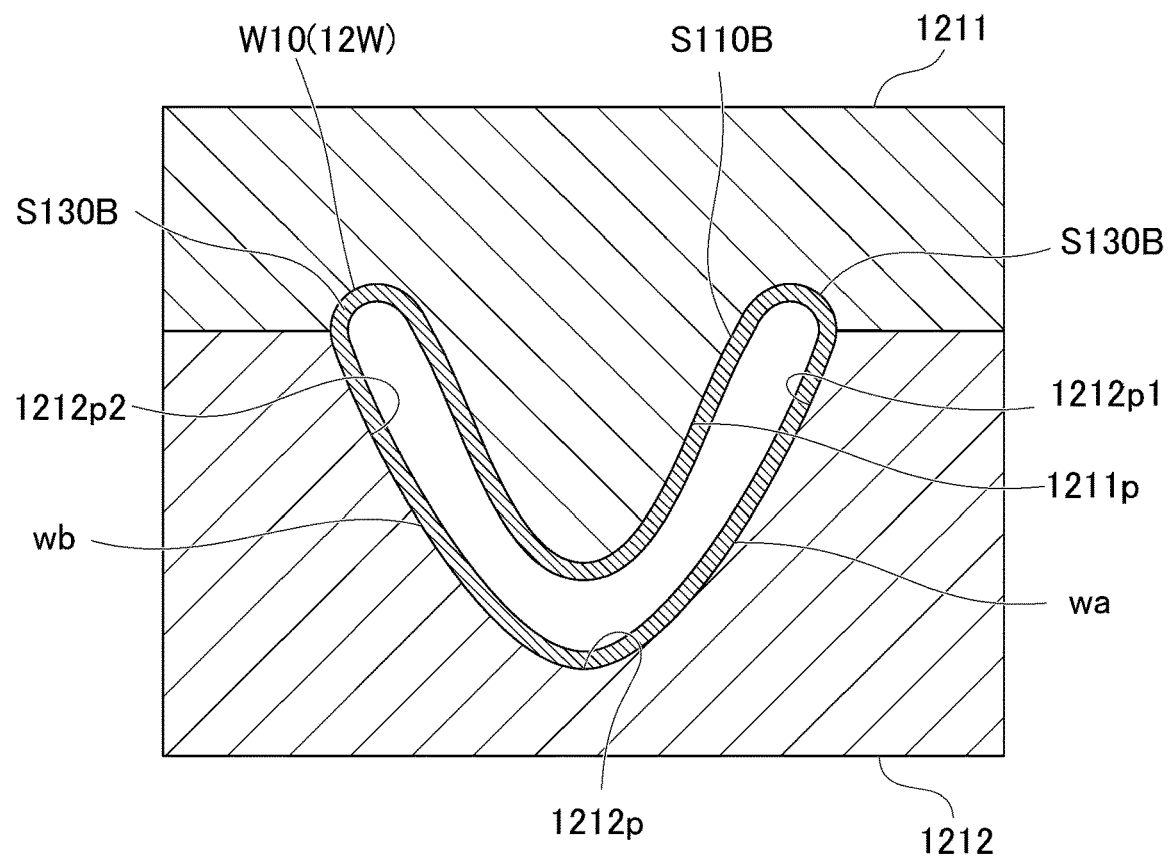
FIG. 11B is a view illustrating a main part of the torsion beam manufacturing apparatus according to the same embodiment, and is a longitudinal sectional view seen along arrow X3-X3 in FIG. 10.
Figure 12:
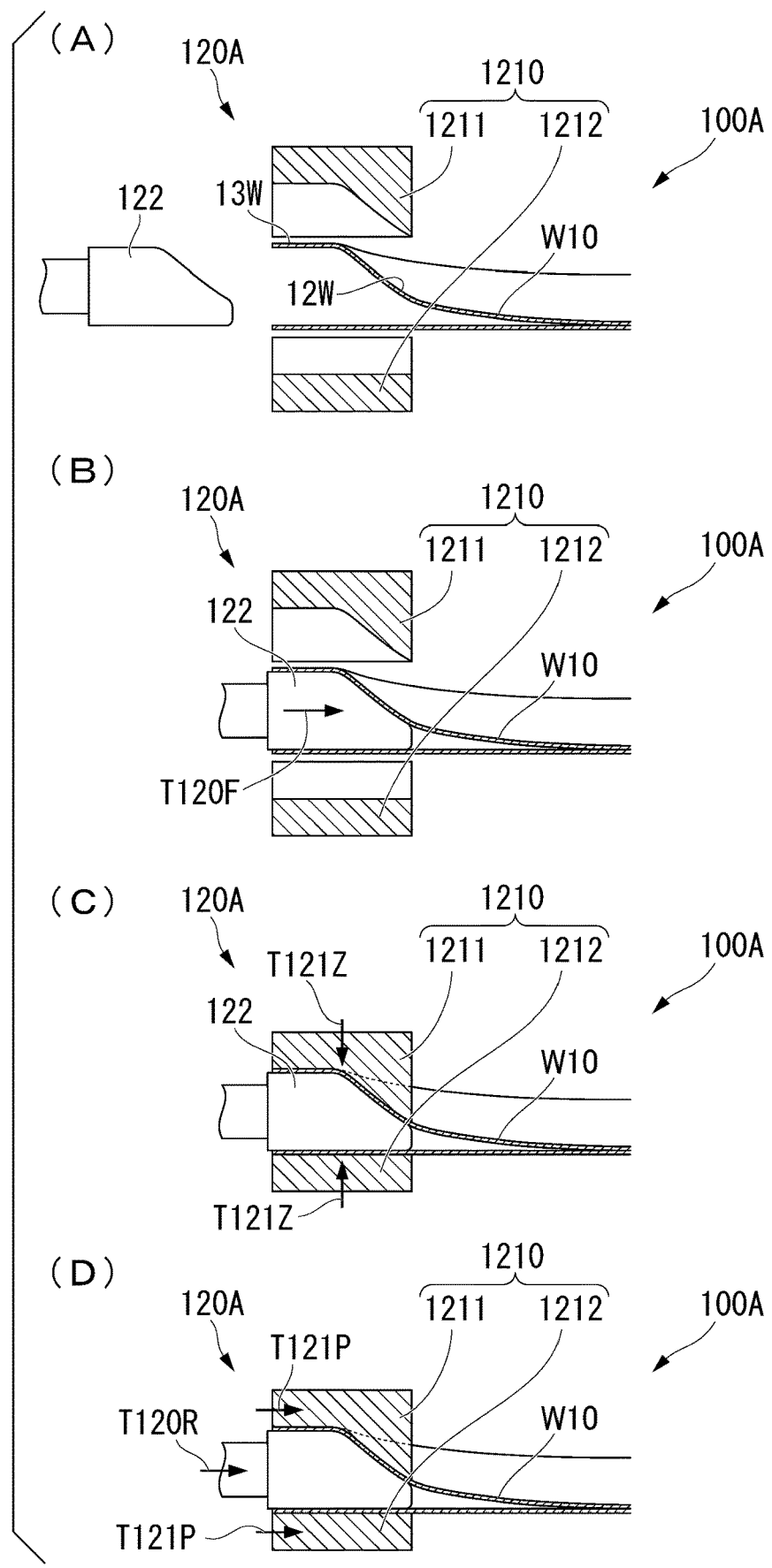
FIG. 12 is a view illustrating a step of manufacturing a torsion beam according to the same embodiment along a flow of (A) to (D) and is a view corresponding to B-section in FIG. 10.

Next, with reference to FIGS. 10 to 12, a second embodiment of the present invention will be described.

Figure 10:
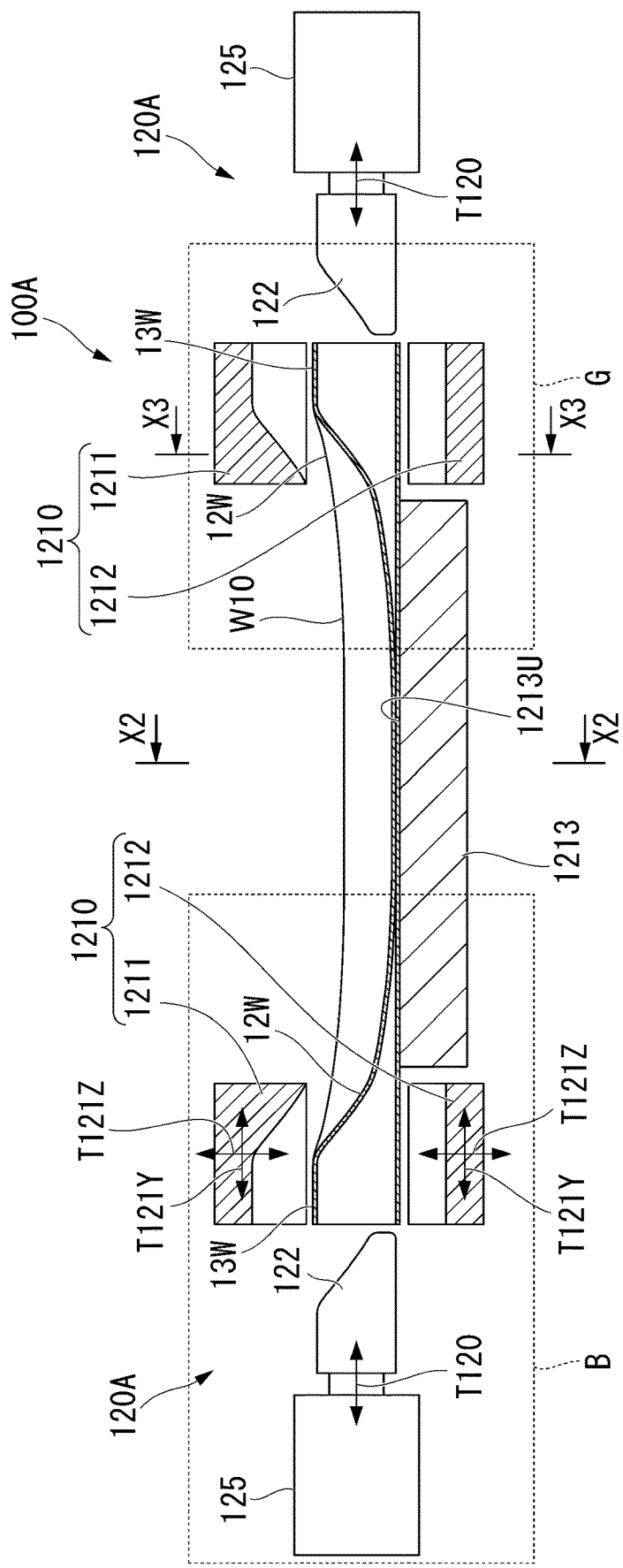
FIG. 10 is a longitudinal sectional view illustrating a schematic configuration of a torsion beam manufacturing apparatus according to a second embodiment of the present invention.

FIG. 10 is a longitudinal sectional view illustrating a schematic configuration of a torsion beam manufacturing apparatus 100A according to a second embodiment of the present invention. FIG. 11A is a view illustrating a part of the same torsion beam manufacturing apparatus 100A, and is a longitudinal sectional view seen along arrow X2-X2 in FIG. 10. FIG. 11B is a view illustrating a part of the same torsion beam manufacturing apparatus 100A, and is a longitudinal sectional view seen along arrow X3-X3 in FIG. 10. FIG. 12 is a view illustrating a step of manufacturing a torsion beam according to the same embodiment along a flow of (A) to (D) and is a view corresponding to B-section in FIG. 10.

The second embodiment is different from the first embodiment in regard to the method of holding the torsion beam material W10 when the torsion beam material W10 is subjected to compression treatment.

Hereinafter, with reference to FIGS. 10 to 11B, a schematic configuration of a torsion beam manufacturing apparatus 100A according to the second embodiment will be described.

As illustrated in FIG. 10, the torsion beam manufacturing apparatus 100A includes the torsion beam material support base 1213 on which the torsion beam material W10 is placed, a pair of compression treatment units 120A which compress the torsion beam material W10 in the longitudinal direction, and a control unit (not illustrated).

A recessed part 1213U corresponding to an exterior shape of the torsion beam material W10 is formed in an upper portion of the torsion beam material support base 1213, which stably supports the torsion beam material W10 placed on the recessed part 1213U. However, the recessed part 1213U supports only the central portion 11W and portions near both ends thereof. This is because both ends of the torsion beam material W10 are held by a shape changing portion outside holding member 1210 described later.

As illustrated in FIG. 11A, the recessed part 1213U is formed to have a cross-section having a substantial V-shape or a substantial U-shape at any position in the longitudinal direction. This cross-sectional shape matches with the lower cross-sectional shapes of the central portion 11W of the torsion beam material W10 and portions near both ends thereof. More specifically, a support surface 1213U1 which supports an outer surface wa of each of parts of the central portion 11W and the shape changing portion 12W, and a support surface 1213U2 which supports an outer surface wb of each of parts of the central portion 11w and the shape changing portion 12W are formed in the recessed part 1213U. These support surfaces 1213U1 and 1213U2 are connected to each other at lower end edges thereof.

As illustrated in FIG. 10, the compression treatment unit 120A includes a shape changing portion outside holding member 1210 which holds the shape changing portion 12W and the attachment closed cross-sectional portion 13W from the outside, a shape changing portion support punch (inner side support member) 122 which supports the shape changing portion 12W and the attachment closed cross-sectional portion 13W from the inside, and the hydraulic cylinder 125 which moves the shape changing portion support punch 122 forward and rearward in the direction of the arrow T120 along the longitudinal direction of the torsion beam material W10.

The shape changing portion outside holding member 1210 includes an upper exterior shape holding portion 1211 which is formed to correspond to upper exterior shapes of the shape changing portion 12W and the attachment closed cross-sectional portion 13W of the torsion beam material W10, a lower exterior shape holding portion 1212 which is formed to correspond to lower exterior shapes of the shape changing portion 12W and the attachment closed cross-sectional portion 13W, and a driving unit (not illustrated) such as an actuator which moves the upper exterior shape holding portion 1211 and the lower exterior shape holding portion 1212 forward and rearward in a direction of an arrow T121Y (compression direction) and a direction of an arrow T121Z (holding direction).

As illustrated in FIG. 11B, the upper exterior shape holding portion 1211 includes an upper support surface 1211p formed complementarily to the upper exterior shapes of the shape changing portion 12W and the attachment closed cross-sectional portion 13W, and is connected to the driving unit (not illustrated).

The upper support surface 1211p has a longitudinal section having a substantial V-shape or a substantial U-shape at a position corresponding to the shape changing portion 12W. In addition, the upper support surface 1211p has a longitudinal section having recessed semicircular shape at a position corresponding to the attachment closed cross-sectional portion 13W. Accordingly, the longitudinal cross-sectional shape of the upper support surface 1211p matches with upper cross-sectional shapes of the shape changing portion 12W and the attachment closed cross-sectional portion 13W of the torsion beam material W10. Then, the upper support surface 1211p supports the first wall portion S110B and the pair of folded wall portions S130B from those upper side thereof, of the torsion beam raw material W10.

As illustrated in FIG. 11B, the lower exterior shape holding portion 1212 includes a lower support surface 1212p formed complementarily to the lower exterior shapes of the shape changing portion 12W and the attachment closed cross-sectional portion 13W, and is connected to the driving unit (not illustrated).

The lower support surface 1212p is formed to have a cross-section having a substantially V-shaped or substantially U-shaped recessed shape at any position in the longitudinal direction thereof. This longitudinal cross-sectional shape matches with the lower cross-sectional shapes of the shape changing portion 12W and the attachment closed cross-sectional portion 13W of the torsion beam material W10. More specifically, a support surface 1212p1 which supports an outer surface wa of each of the shape changing portion 12W and the attachment closed cross-sectional portion 13W, and a support surface 1212p2 which supports an outer surface wb of each of the shape changing portion 12W and the attachment closed cross-sectional portion 13W are formed in the lower support surface 1212p. These support surfaces 1212p1 and 1212p2 are connected to each other at lower end edges thereof.

Returning to FIG. 10, for example, the shape changing portion support punch 122 is formed to correspond to interior shapes of the shape changing portion 12W and the attachment closed cross-sectional portion 13W, is able to be inserted into the shape changing portion 12W, and supports the shape changing portion 12W from the inside thereof.

Specifically, the shape changing portion support punch 122 has a shape of holding the inner side of the shape changing portion formed complementarily to the interior shape of the shape changing portion 12W.

The compression treatment unit 120A is controlled by the control unit (not illustrated). Specifically, the hydraulic cylinder 125 receives an instruction from the control unit and moves the shape changing portion support punch 122 forward and rearward in the direction of the arrow T120.

The shape changing portion support punch 122, the upper exterior shape holding portion 1211, and the lower exterior shape holding portion 1212 may hold the attachment closed cross-sectional portion 13W side rather than a portion in which the tensile residual stress is maximum in the shape changing portion 12W.

Hereinafter, an example of an outline of a step of manufacturing a torsion beam by the torsion beam manufacturing apparatus 100A will be described with reference to FIGS. 12(A) to 12(D). FIGS. 12(A) to 12(D) are views illustrating an outline of a step of manufacturing a torsion beam according to the second embodiment.

(1) First, as illustrated in FIGS. 10 and 12(A), the torsion beam material W10 is disposed on the torsion beam material support base 110 to be supported, and the shape changing portion outside holding member 1210 is disposed at a predetermined position.

(2) Next, as illustrated in FIG. 12(B), the shape changing portion support punch 122 is moved forward in the direction of the arrow T120F and is inserted into the shape changing portion 12W. When the shape changing portion support punch 122 supports the shape changing portion 12W from the inside, the shape changing portion support punch 122 is stopped.

(3) Subsequently, as illustrated in FIG. 12(C), the driving unit (not illustrated) moves the upper exterior shape holding portion 1211 and the lower exterior shape holding portion 1212 forward in the direction of the arrow T121Z, and the upper exterior shape holding portion 1211 and the lower exterior shape holding portion 1212 hold the shape changing portion 12W and the attachment closed cross-sectional portion 13W in an upward/downward direction.

(4) Next, as illustrated in FIG. 12(D), in a state where the shape changing portion 12W and the attachment closed cross-sectional portion 13W are supported by the shape changing portion support punch 122 from the inside, and the shape changing portion 12W and the attachment closed cross-sectional portion 13W are held by the upper exterior shape holding portion 1211 and the lower exterior shape holding portion 1212, the torsion beam material is compressed in a direction of an arrow T121P to form a torsion beam 10. At this time, the shape changing portion support punch 122 moves in the direction of the arrow T120R in synchronization with or following the upper exterior shape holding portion 1211 and the lower exterior shape holding portion 1212. In this compression treatment, by applying a strain amount equal to or greater than 0.5% and equal to or smaller than 2.0% to the torsion beam material W10, the tensile residual stress on the front and rear surfaces in the sheet thickness direction can be released without causing buckling.

According to the torsion beam manufacturing method of the second embodiment and the torsion beam manufacturing apparatus 100A, residual stress of the connection portion 12A is reduced, and the torsion beam 10 having excellent fatigue durability can be efficiently manufactured.

According to the torsion beam manufacturing apparatus 100A, by inserting the shape changing portion support punch 122 into the shape changing portion 12W and the attachment closed cross-sectional portion 13W, the shape changing portion 12W and the attachment closed cross-sectional portion 13W are supported by the shape changing portion support punch 122 from the inside. Since the torsion beam material W10 is compressed in the longitudinal direction thereof in a state where the shape changing portion 12W and the attachment closed cross-sectional portion 13W are held by the upper exterior shape holding portion 1211 and the lower exterior shape holding portion 1212, stable compression treatment can be performed by preventing the shape changing portion 12W from being deformed and crushed.

Third Embodiment

Next, with reference to FIGS. 13 to 16, a third embodiment of the present invention will be described.

Figure 13:
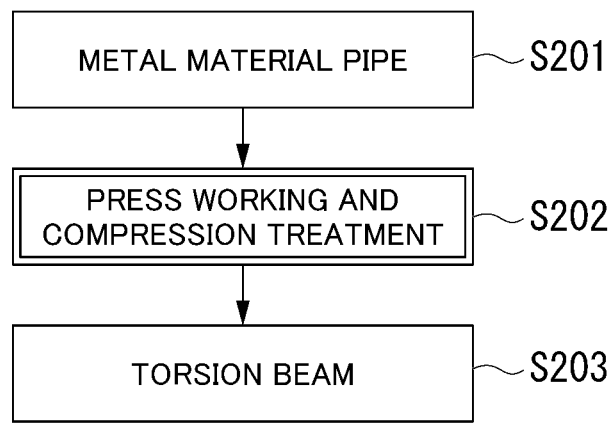
FIG. 13 is a flowchart illustrating a step of manufacturing a torsion beam according to a third embodiment of the present invention.
Figure 14:
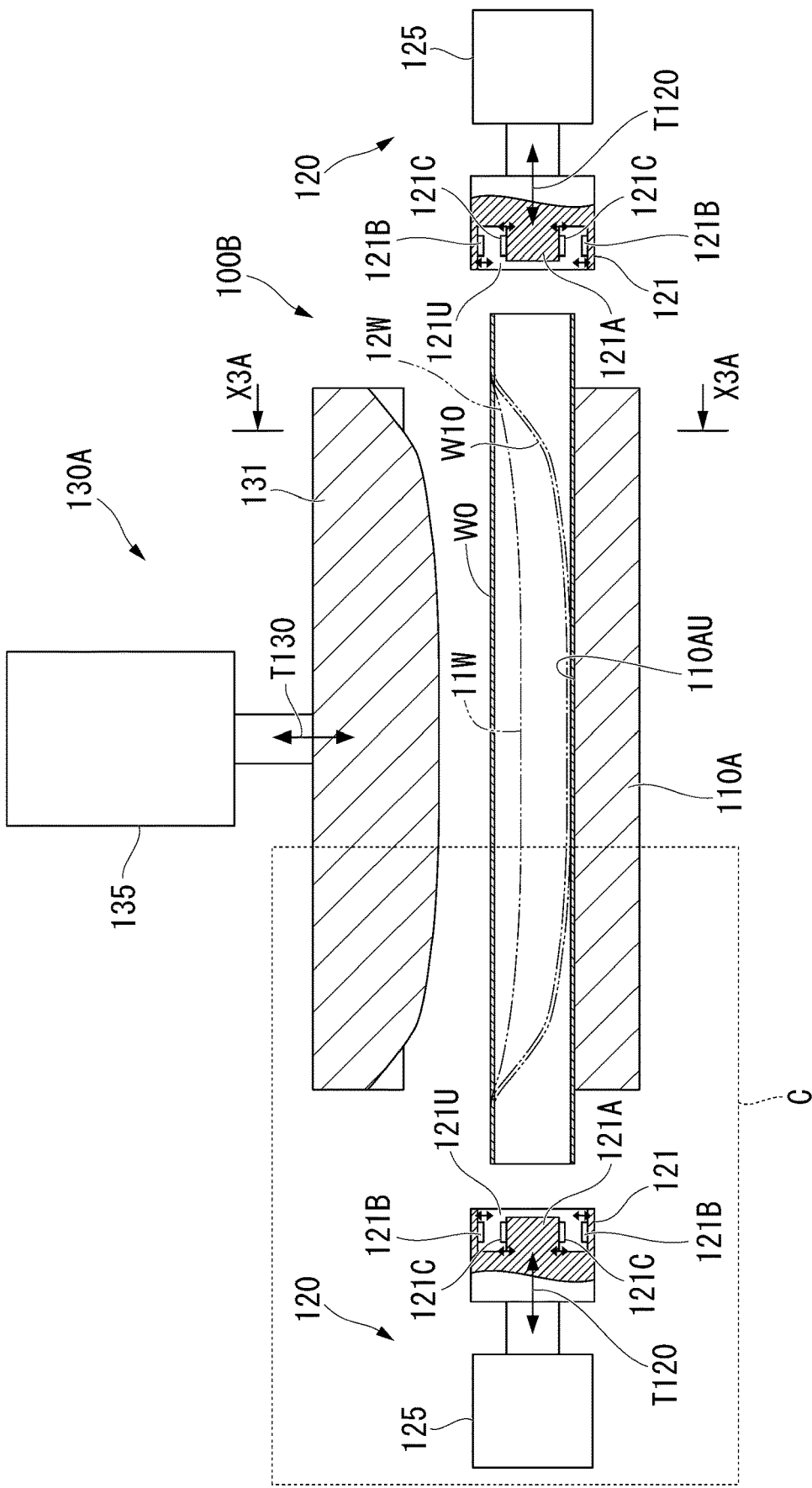
FIG. 14 is a longitudinal sectional view illustrating a schematic configuration of a torsion beam manufacturing apparatus according to the same embodiment.
Figure 15:
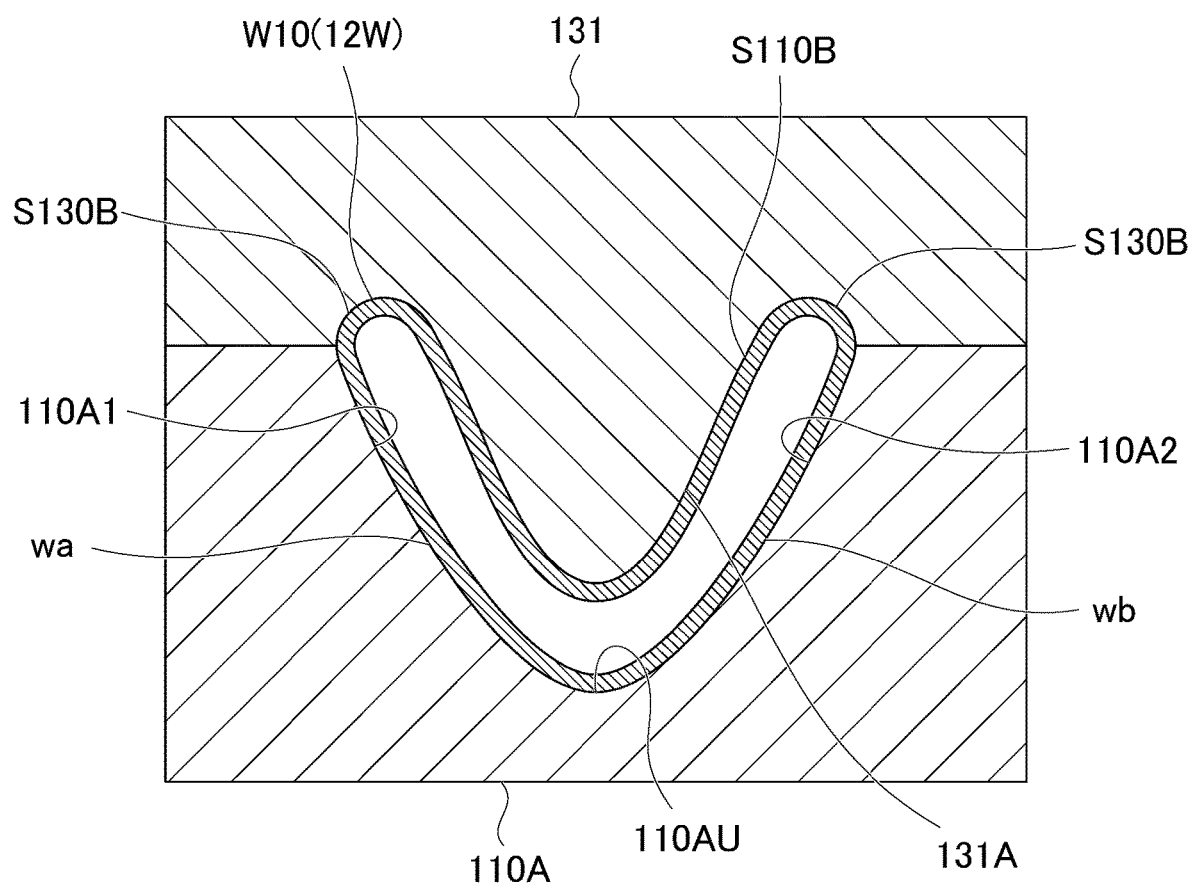
FIG. 15 is a view illustrating the torsion beam manufacturing apparatus according to the same embodiment, and is a longitudinal sectional view seen along arrow X3A-X3A in FIG. 14.
Figure 16:
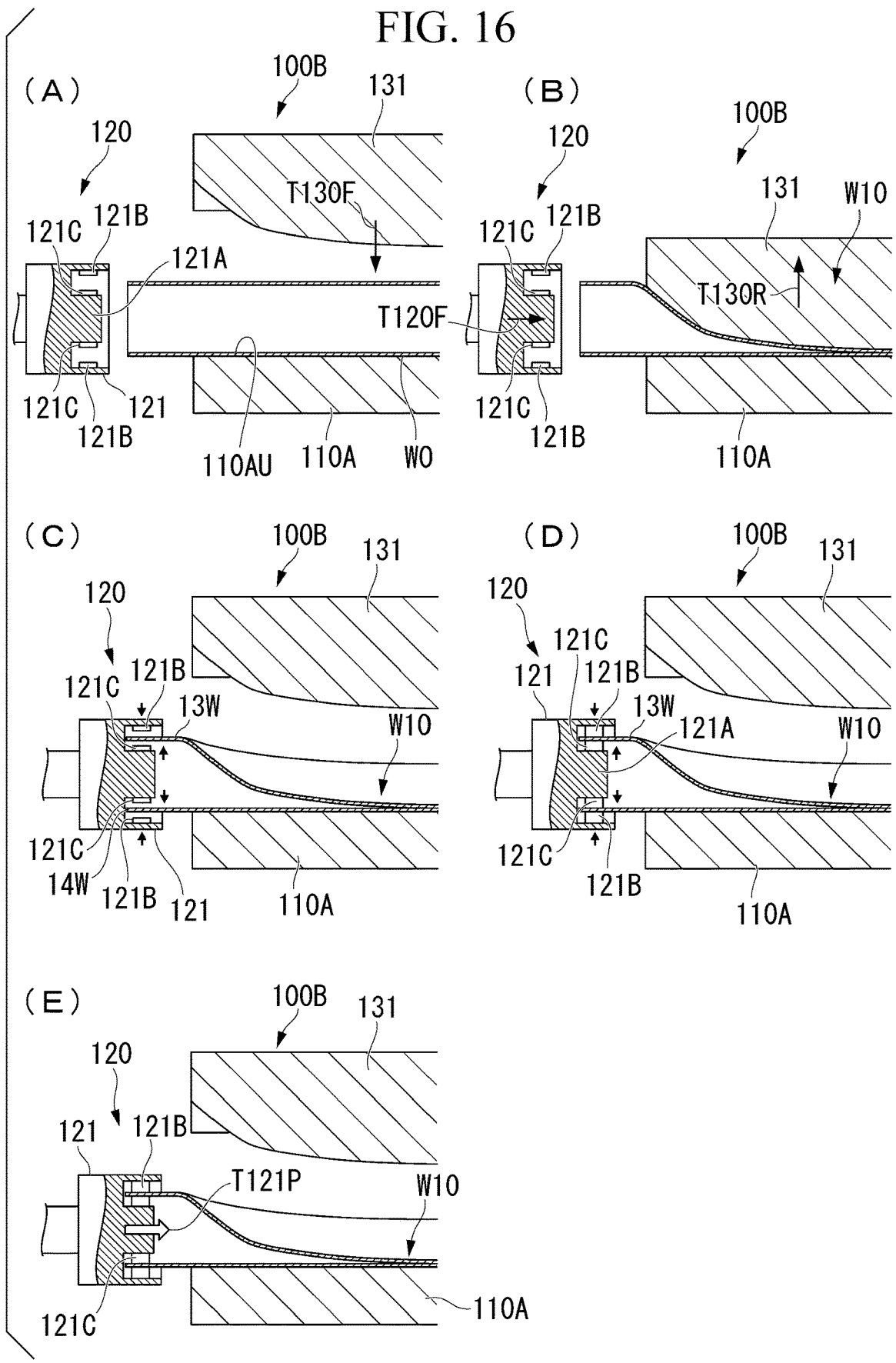
FIG. 16 is a view illustrating each step of a torsion beam manufacturing method according to the same embodiment along a flow of (A) to (E) and is a view corresponding to C-section in FIG. 14.

FIG. 13 is a flowchart illustrating a step of manufacturing a torsion beam according to a third embodiment of the present invention. FIG. 14 is a longitudinal cross-sectional view illustrating a schematic configuration of a torsion beam manufacturing apparatus 100B according to the embodiment. FIG. 15 is a longitudinal cross-sectional view seen along arrows X3A-X3A in FIG. 14. FIGS. 16(A) to 16(E) are views illustrating an outline of a step of manufacturing a torsion beam according to the embodiment.

In the first embodiment, the torsion beam material W10 is formed in advance by performing a press working step, and then the torsion beam material W10 is compressed by the torsion beam manufacturing apparatus 100 to manufacture the torsion beam 10. On the other hand, in this embodiment, both press working and compression treatment are performed by the torsion beam manufacturing apparatus 100B. Other points of the embodiment are the same as those of the first embodiment.

Hereinafter, with reference to FIG. 13, the torsion beam manufacturing step according to the present embodiment will be described.

(1) A metal material pipe is prepared (Step S201). As the metal material pipe to be prepared, for example, it is possible to use a circular steel pipe having a uniform thickness.

(2) Next, in press working and compression treatment step, the metal material pipe is subjected to press working and compression treatment (Step S202). In the press working and the compression treatment step, the torsion beam material W10 is formed by pressing the metal material pipe, and then the torsion beam material W10 is continuously compressed in the installed state. In this compression treatment, by applying a strain amount equal to or greater than 0.5% and equal to or smaller than 2.0% to the torsion beam material W10, the tensile residual stress on the front and rear surfaces in the sheet thickness direction can be released without causing buckling. The torsion beam material W10 at this time is compressed in the axial direction in a state where no hydraulic pressure is applied to the inside thereof.

(3) The torsion beam 10 is formed by being subjected to press working and compression treatment in Step S202 (Step S203).

Next, with reference to FIGS. 14 and 15, a schematic configuration of the torsion beam manufacturing apparatus 100B according to the present embodiment will be described.

As illustrated in FIG. 14, the torsion beam manufacturing apparatus 100B includes a fixed press forming die 110A, the pair of compression treatment units 120, a movable-type press forming driving apparatus 130A, and a control unit (not illustrated). In the torsion beam manufacturing apparatus 100B, the fixed press forming die 110A and the movable-type press forming driving apparatus 130A constitute a press working machine, and the pair of compression treatment units 120 constitutes a compression treatment machine.

The configuration and the operation of the compression treatment unit 120 are similar to those of the first embodiment. Therefore, the same reference signs are applied and duplicated description will be omitted.

The fixed press forming die (forming die) 110A is formed with a recessed part 110AU used when press working is performed on the metal material pipe to obtain a torsion beam material W10. That is, in the fixed press forming die 110A, the recessed part 110AU having a shape corresponding to the lower surface of the torsion beam material W10 is formed upward.

In addition, the fixed press forming die 110A also serves as a torsion beam material support base supporting the torsion beam material W10 when the torsion beam material W10 is subjected to compression treatment by the pair of compression treatment units 120.

As illustrated in FIG. 15, the recessed part 110AU is formed to have a cross-section having a substantially V-shaped or substantially U-shaped recessed shape at any position in the longitudinal direction thereof. This longitudinal cross-sectional shape matches with the lower cross-sectional shapes of the central portion 11W and the shape changing portion 12W of the torsion beam material W10. More specifically, a support surface 110A1 which supports an outer surface wa of each of the central portion 11W and the shape changing portion 12W, and a support surface 110A2 which supports an outer surface wb of each of the central portion 11w and the shape changing portion 12W are formed in the recessed part 110AU. These support surfaces 110A1 and 110A2 are connected to each other at lower end edges thereof.

As illustrated in FIG. 14, the recessed part 110AU of the fixed press forming die 110A does not support the attachment closed cross-sectional portion 13W and the attachment portion 14W. This is because both ends of the torsion beam material W10 are held by the attachment closed cross-sectional portion holding member 121.

The movable-type press forming driving apparatus 130A includes a movable press forming die (movable die) 131 and a hydraulic cylinder (second driving mechanism) 135 which moves the movable press forming die 131 forward and rearward in a direction of an arrow T130 (upward and downward).

As illustrated in FIG. 15, the movable press forming die 131 has a shape for forming the torsion beam material W10 on the lower surface and forms the torsion beam material W10 in cooperation with the fixed press forming die 110A. On the lower surface of the movable press forming die 131, an upper support surface 131A having a shape corresponding to the upper surface of the torsion beam material W10 is formed downward.

The upper support surface 131A has a projected cross-section having a substantial V-shape or a substantial U-shape. The longitudinal cross-sectional shape of the upper support surface 131A matches with the upper cross-sectional shapes of the shape changing portion 12W and the central portion 11W of the torsion beam material W10. The upper support surface 131A supports the first wall portion S110B and the pair of folded wall portions S130B from those upper side thereof in the torsion beam material W10.

The control unit (not illustrated) instructs each of the compression treatment units 120 and the movable-type press forming driving apparatus 130A to perform an operation related to press working and compression treatment.

Hereinafter, with reference to FIGS. 16(A) to 16(E), an outline of a step of manufacturing a torsion beam by the torsion beam manufacturing apparatus 100B will be described. FIGS. 16(A) to 16(E) are views illustrating a step of manufacturing a torsion beam of the embodiment according to a flow of FIGS. 16(A) to 16(E), and is a view corresponding to C-section in FIG. 14.

(1) First, as illustrated in FIG. 16(A), a metal material pipe W0 is placed on the fixed press forming die 110A, and the movable press forming die 131 is moved in a direction of an arrow T130F (downward).

(2) Next, as illustrated in FIG. 16(B), when the torsion beam material W10 is formed, the movable press forming die 131 is moved in a direction of an arrow T130R (upward). Then the attachment closed cross-sectional portion holding member 121 is moved forward in a direction of an arrow T120F.

(3) Next, as illustrated in FIG. 16(C), when the bottom portion of the recessed part 121U abuts on the vicinity of the attachment portion 14W of the attachment closed cross-sectional portion 13W, the forward movement of attachment closed cross-sectional portion holding member 121 is stopped. Then, the clamping member 121B and the clamping member 121C are caused to protrude in the arrow direction such that both approach each other.

(4) Subsequently, as illustrated in FIG. 16(D), the attachment closed cross-sectional portion 13W is interposed between the clamping member 121B and the clamping member 121C such that the vicinity of the attachment portion 14W of the torsion beam material W10 is held.

(5) Next, as illustrated in FIG. 16(E), in a state where the attachment closed cross-sectional portion 13W is held by the clamping member 121B and the clamping member 121C, a hydraulic cylinder (hydraulic cylinder 125 illustrated in FIG. 14) is operated to compress the torsion beam material W10 in the direction of the arrow T120P along the longitudinal direction thereof. Thus, a torsion beam 10 is formed. In this compression treatment, by applying a strain amount equal to or greater than 0.5% and equal to or smaller than 2.0% to the torsion beam material W10 in the axial direction, the tensile residual stress on the front and rear surfaces in the sheet thickness direction can be released without causing buckling.

After the torsion beam 10 is formed, the operation is similar to that described by using FIGS. 9(D) and 9(E) in the first embodiment. Here, duplicated description will be omitted.

According to the torsion beam manufacturing method of the present embodiment and the torsion beam manufacturing apparatus 100B, the torsion beam 10 having excellent fatigue durability can be efficiently manufactured.

In addition, according to the torsion beam manufacturing apparatus 100B of the present embodiment, after the metal material pipe W0 is pressed and the torsion beam material W10 is formed, the torsion beam 10 is manufactured by compressing the torsion beam material W10 in succession without transferring the torsion beam material W10 to another apparatus. Therefore, productivity can be improved.

Fourth Embodiment

Next, with reference to FIGS. 17 and 18, a fourth embodiment of the present invention will be described.

Figure 17:
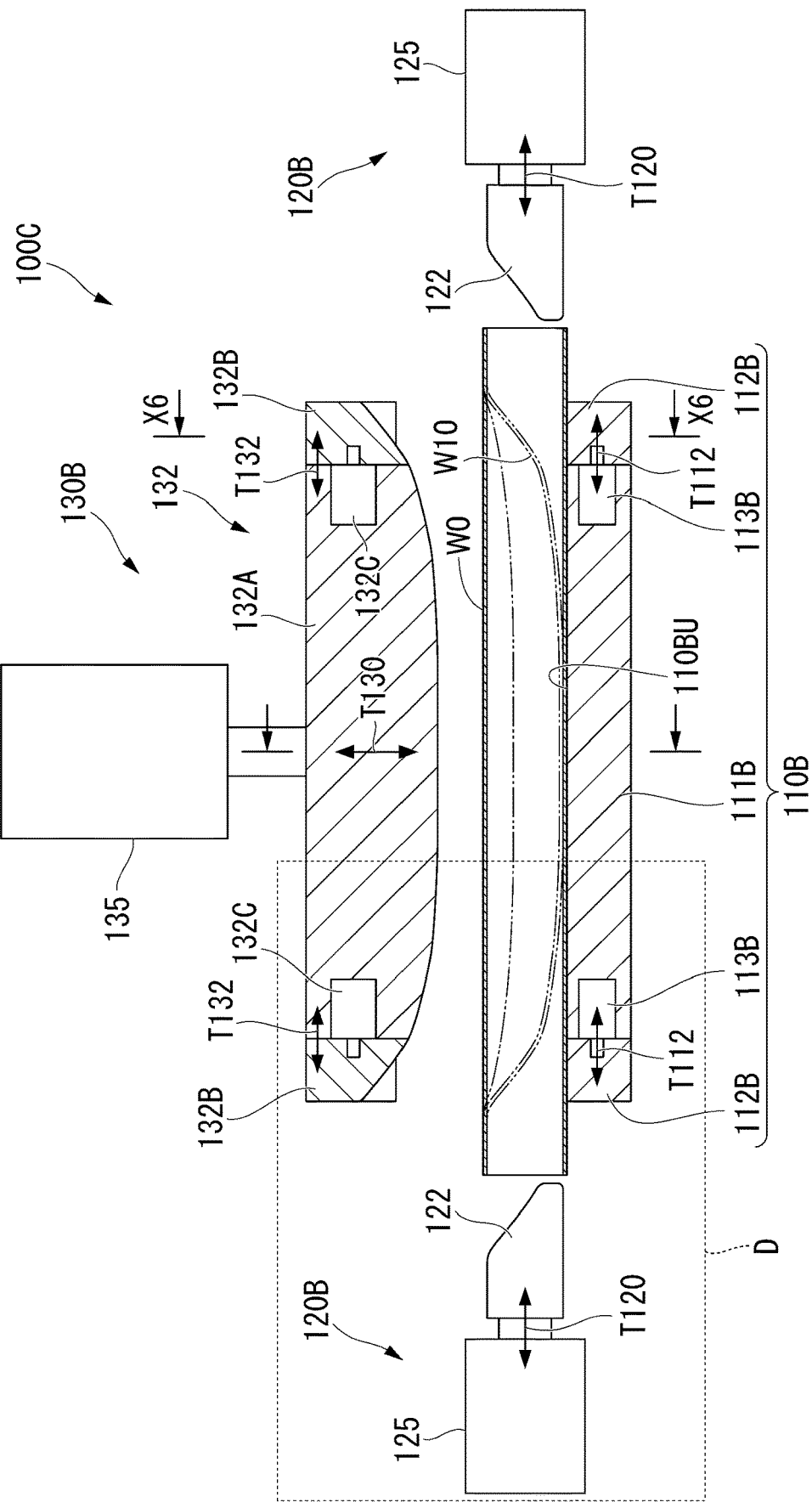
FIG. 17 is a longitudinal sectional view illustrating a schematic configuration of a torsion beam manufacturing apparatus according to a fourth embodiment of the present invention.
Figure 18:
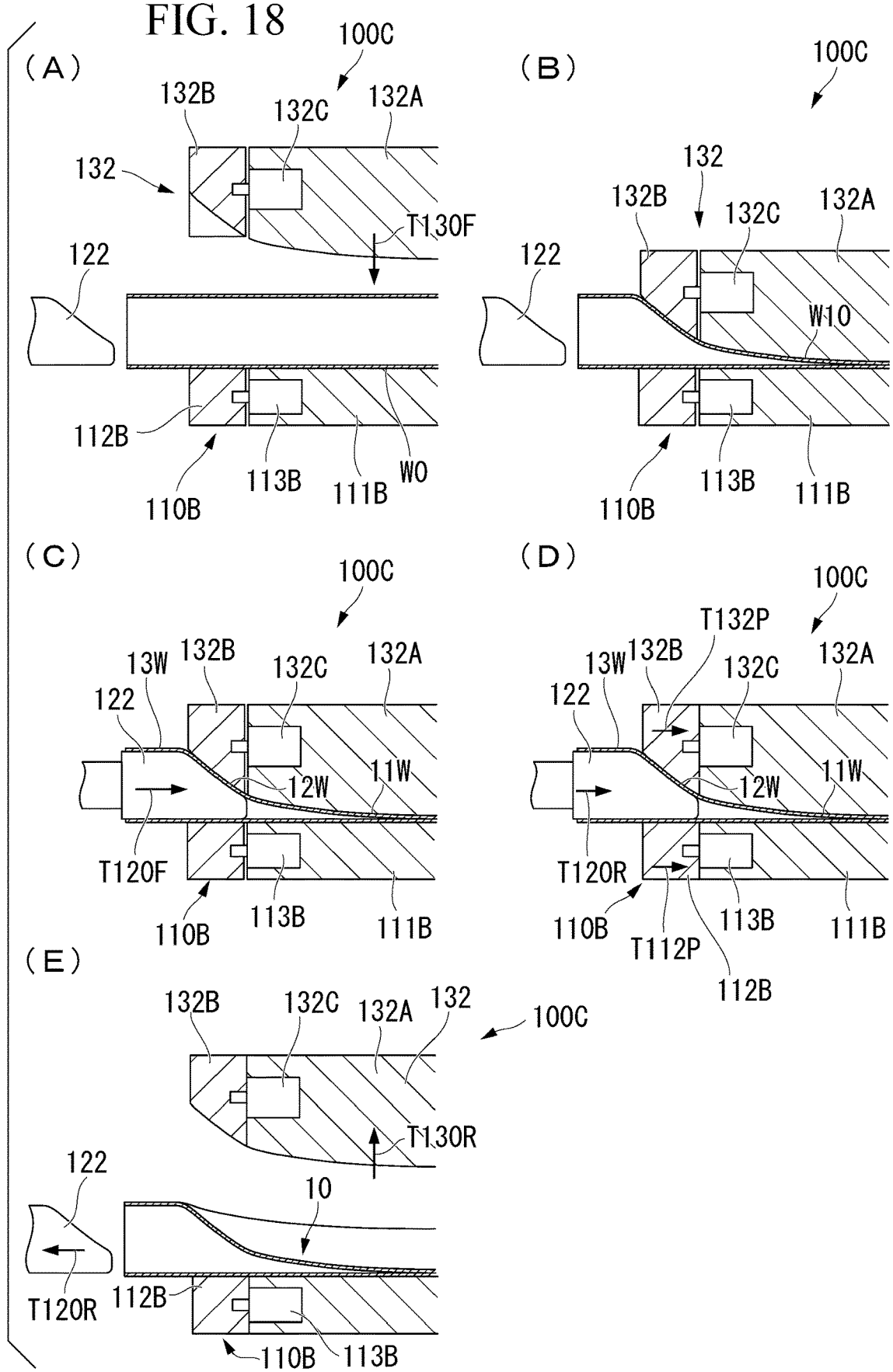
FIG. 18 is a view illustrating each step of a torsion beam manufacturing method according to the same embodiment along a flow of (A) to (E) and is a view corresponding to D-section in FIG. 17.

FIG. 17 is a longitudinal sectional view illustrating a schematic configuration of a torsion beam manufacturing apparatus 100C according to the present embodiment.

FIGS. 18(A) to 18(E) are views illustrating an outline of a step of manufacturing a torsion beam according to the embodiment along a flow of FIGS. 18(A) to 18(E) and are views corresponding to D-section in FIG. 17.

Hereinafter, with reference to FIG. 17, a schematic configuration of the torsion beam manufacturing apparatus 100C according to the present embodiment will be described.

The torsion beam manufacturing apparatus 100C includes a fixed press forming die (forming die) 110B, a pair of compression treatment units 120B, a movable-type press forming driving apparatus 130B, and a control unit (not illustrated). In the torsion beam manufacturing apparatus 100C, the fixed press forming die 110B and the movable-type press forming driving apparatus 130B constitute a press working machine, and the pair of compression treatment units 120B constitutes a compression treatment machine.

In the fixed press forming die (forming die) 110B, a recessed part 110BU which is used when the torsion beam material W10 is obtained by performing press working on the metal material pipe W0 is formed. That is, in the fixed press forming die 110B, the recessed part 110BU having a shape corresponding to the lower surface of the torsion beam material W10 is formed upward. Since the detailed cross-sectional shape of the recessed part 110BU is the same as that of the recessed part 110AU described in the third embodiment, the description thereof is omitted here.

In addition, the fixed press forming die 110B also serves as a torsion beam material support base supporting the torsion beam material W10 when the torsion beam material W10 is subjected to compression treatment by the pair of compression treatment units 120B.

The fixed press forming die 110B includes a first support portion 111B having a shape corresponding to the central portion 11W of the torsion beam material W10, a pair of second support portions 112B having shapes corresponding to the shape changing portion 12W and the attachment closed cross-sectional portion 13W, and an actuator (shape change absorption unit) 113B, such as a hydraulic cylinder, which is disposed in the first support portion 111B and moves the second support portions 112B forward and rearward in a direction of an arrow T112 with respect to the first support portion 111B. One actuator 113B is provided for each of the second support portions 112B.

The movable-type press forming driving apparatus 130B includes a movable press forming die (movable die) 132 and the hydraulic cylinder (second driving mechanism) 135 which moves the movable press forming die 132 forward and rearward in the direction of the arrow T130 (upward and downward).

A shape corresponding to the upper shape of the torsion beam material W10 is formed on a lower surface of the movable press forming die 132, which performs press working of the metal material pipe W0 in cooperation with the fixed press forming die 110B, and the torsion beam material W10 is thereby obtained. In addition, since the lower surface shape of the movable press forming die 132 is the same as the lower surface shape of the movable press forming die 131 described in the third embodiment, the description thereof is omitted here. For example, the cross-sectional shape in the view taken along the arrow X6-X6 in FIG. 17 is the same as the cross-sectional shape described in FIG. 15 of the third embodiment.

As illustrated in FIG. 17, each of the compression treatment units 120B includes a shape changing portion support punch (inner side support member) 122 and the hydraulic cylinder 125 which moves the shape changing portion support punch 122 forward and rearward in the direction of the arrow T120 along the longitudinal direction of the torsion beam material W10.

Each of the shape changing portion support punches 122 is formed into a shape corresponding to the interior shapes of the shape changing portion 12W and the attachment closed cross-sectional portion 13W, is inserted into the shape changing portion 12W, and supports the shape changing portion 12W from the inside thereof. Specifically, each of the shape changing portion support punches 122 includes a shape portion holding the inner side of the shape changing portion formed complementarily to the interior shape of the shape changing portion 12W.

Each of the hydraulic cylinders 125 moves the shape changing portion support punch 122 forward and rearward in the direction of the arrow T120 in accordance with an instruction from the control unit (not illustrated).

As illustrated in FIG. 17, the movable press forming die 132 includes a first forming portion 132A, two second forming dies (shape changing portion support members) 132B which are respectively disposed on both sides of the first forming portion 132A in the longitudinal direction, and a pair of hydraulic cylinders (shape changing portion support member driving units) 132C which moves the second forming portions 132B forward and rearward in a direction of an arrow T132.

A shape corresponding to the upper shape of the torsion beam material W10 is formed on a lower surface of the movable press forming die 132, which performs press forming of the torsion beam material W10 in cooperation with the fixed press forming die 110B.

The control unit (not illustrated) instructs each of the actuators 113B of the fixed press forming die 110B, each of the compression treatment units 120B, and the movable-type press forming driving apparatus 130B to perform an operation related to press working and compression treatment.

Each actuator 113B is displaced corresponding to the shape change (shrinkage) in the longitudinal direction accompanying the forming process of the torsion beam material W10. Specifically, each actuator operates in synchronization with or following the movement of each hydraulic cylinder (shape changing portion support member driving unit) 132C.

The control unit causes each of the actuators 113B of the fixed press forming die 110B and each of the hydraulic cylinders (shape changing portion support member driving units) 132C disposed in the movable press forming die 132 to be synchronized and to move forward and rearward.

Each of the hydraulic cylinders 125 operates while being synchronized with or following each of the actuators 113B and each of the hydraulic cylinders 132C.

By using the torsion beam manufacturing apparatus 100C according to the fourth embodiment, any portion of the torsion beam material W10 can be partially compressed, and the effect obtained by the compression can be concentrated on a specific part.

Hereinafter, the outline of a step of manufacturing a torsion beam by the torsion beam manufacturing apparatus 100C will be described with reference to FIGS. 18(A) to 18(E). FIGS. 18(A) to 18(E) are views illustrating each step of manufacturing a torsion beam according to the embodiment along a flow of FIGS. 18(A) to 18(E) and are views corresponding to D-section in FIG. 17.

(1) First, as illustrated in FIG. 18(A), the metal material pipe W0 is placed on the fixed press forming die 110B, and the movable press forming die 132 is moved in the direction of the arrow T130F.

(2) Then, as illustrated in FIG. 18(B), the metal material pipe W0 is interposed between the fixed press forming die 110B and the movable press forming die 132, and the torsion beam material W10 is subjected to press forming.

(3) Next, as illustrated in FIG. 18(C), the shape changing portion support punch 122 is moved forward in the direction of the arrow T120F and is inserted into the shape changing portion 12W. As a result, the shape changing portion support punch 122 is caused to abut on the shape changing portion 12W of the torsion beam material W10 to support the shape changing portion 12W and the attachment closed cross-sectional portion 13W from the inside.

(4) Then, as illustrated in FIG. 18(D), the hydraulic cylinder 132C and the actuator 113B are made to cooperate to move the second forming portion 132B rearward in a direction of an arrow T132P, and in a state where the shape changing portion 12W is supported by the shape changing portion support punch 122 and the second forming portion 132B, the torsion beam material W10 is compressed in the longitudinal direction. In addition, the second support portion 112B is moved rearward in a direction of an arrow T112P in synchronization with the second forming portion 132B to form a torsion beam 10. At this time, the shape changing portion support punch 122 is further moved forward in the direction of the arrow T120F in synchronization with the second forming portion 132B and the second support portion 112B.

In this compression treatment, by applying a strain amount equal to or greater than 0.5% and equal to or smaller than 2.0% to the torsion beam material W10 in the axial direction, the tensile residual stress on the front and rear surfaces in the sheet thickness direction can be released without causing buckling. In addition, since compression is applied after the respective outer surfaces wa and wb of the central portion 11W and the shape changing portion 12W of the torsion beam material W10 are supported, buckling is less likely to occur.

(5) When the torsion beam 10 is formed, as illustrated in FIG. 18(E), the shape changing portion support punch 122 is moved rearward in the direction of the arrow T120R. Further, the movable press forming die 132 is moved (raised) in the direction of the arrow T130R.

In the states (2) to (4), that is, FIGS. 18(B) to 18(D), the central portion 11W of the torsion beam material W10 is held by the first forming portion 132A and the first support portion 111B. Further, compression is performed in a state where the shape changing portion 12W of the torsion beam material W10 is held by the shape changing portion support punch 122, the second forming portion 132B, and the second support portion 112B. As a result, a portion of the torsion beam material W10 that is not held is partially compressed.

According to the torsion beam manufacturing method of the present embodiment and the torsion beam manufacturing apparatus 100C, the torsion beam 10 having excellent fatigue durability can be efficiently manufactured. Furthermore, since partial thickening is obtained by partially compressing a portion of the torsion beam material W10 that is not held by the die, the structural strength of the torsion beam can be further increased.

In addition, according to the torsion beam manufacturing apparatus 100C, since the torsion beam material W10 is compressed in the longitudinal direction thereof in a state in which the shape changing portion 12W is held in corporation of the shape changing portion support punch 122 and the second forming portion 132B, the tensile residual stress of the connection portion 12A is reduced or removed and a torsion beam with high dimensional accuracy can be obtained.

In addition, according to the torsion beam manufacturing apparatus 100C, there is provided the actuator 113B which is displaced in accordance with a shape change in the longitudinal direction entailed in compression working of the torsion beam material W10 when the torsion beam material W10 is compressed in the longitudinal direction. Therefore, even in a case where the exterior shape of the torsion beam W10 on the central side in the longitudinal direction is smaller than those of both sides, compression treatment can be easily performed.

In addition, according to the torsion beam manufacturing apparatus 100C, since there is provided the actuator 113B, it is possible to prevent damage to the torsion beam material W10 when performing compression treatment and to efficiently reduce residual stress.

In addition, according to the torsion beam manufacturing apparatus 100C, after the metal material pipe W0 is subjected to press working and the torsion beam material W10 is formed, the torsion beam material W10 is compressed in succession without being transferred to another apparatus, and the torsion beam 10 can be thereby manufactured. Therefore, productivity can be improved.

In addition, according to the torsion beam manufacturing apparatus 100C, since the hydraulic cylinders (shape changing portion support member driving units) 132C move the second forming portion 132B forward and rearward in the direction of the arrow T132, a moving speed or a moving timing of the second forming portion 132B can be controlled easily and efficiently.

Fifth Embodiment

Next, with reference to FIGS. 19 to 20, a fifth embodiment of the present invention will be described.

Figure 19:
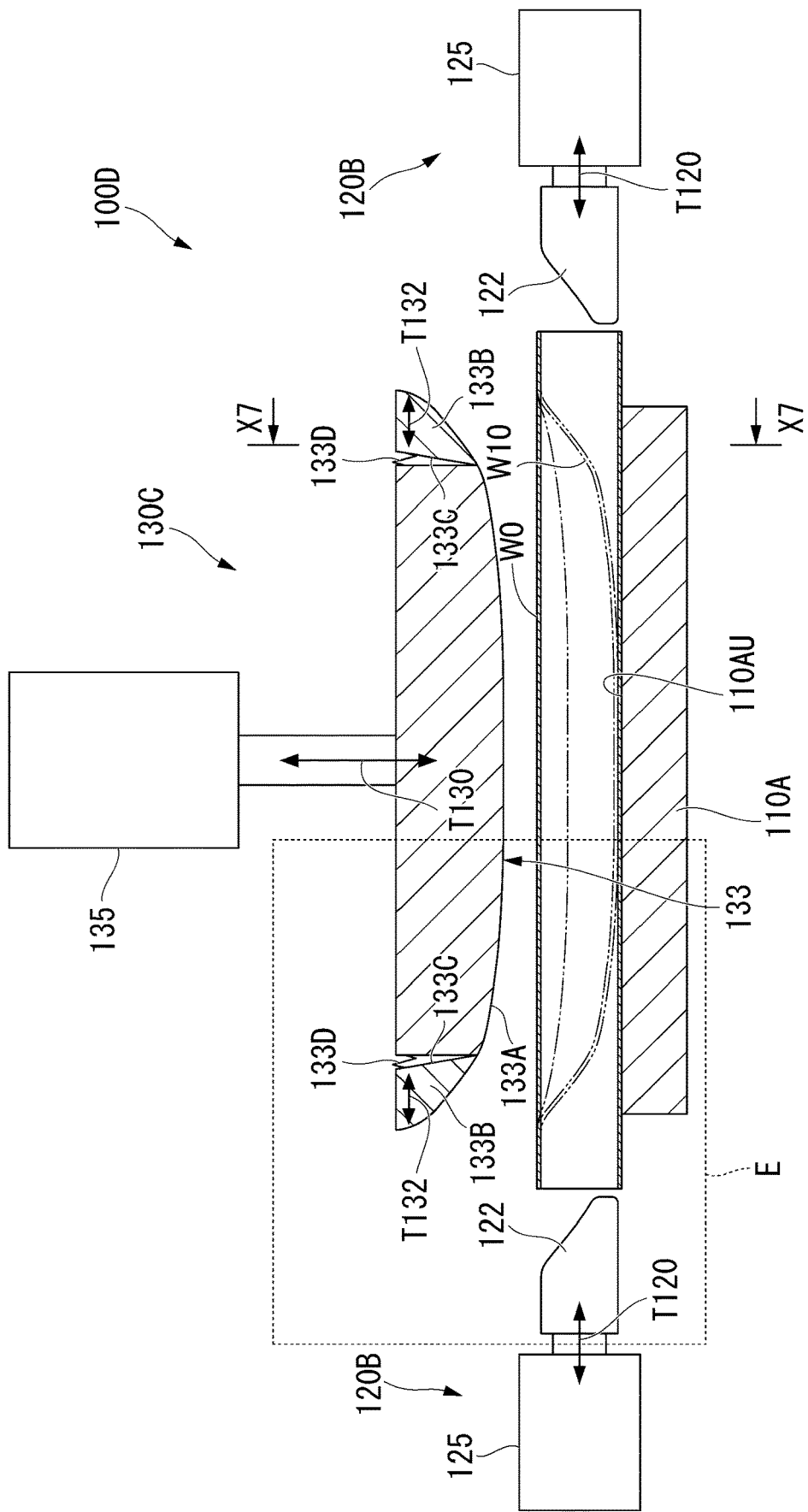
FIG. 19 is a longitudinal sectional view illustrating a schematic configuration of a torsion beam manufacturing apparatus according to a fifth embodiment of the present invention.
Figure 20:
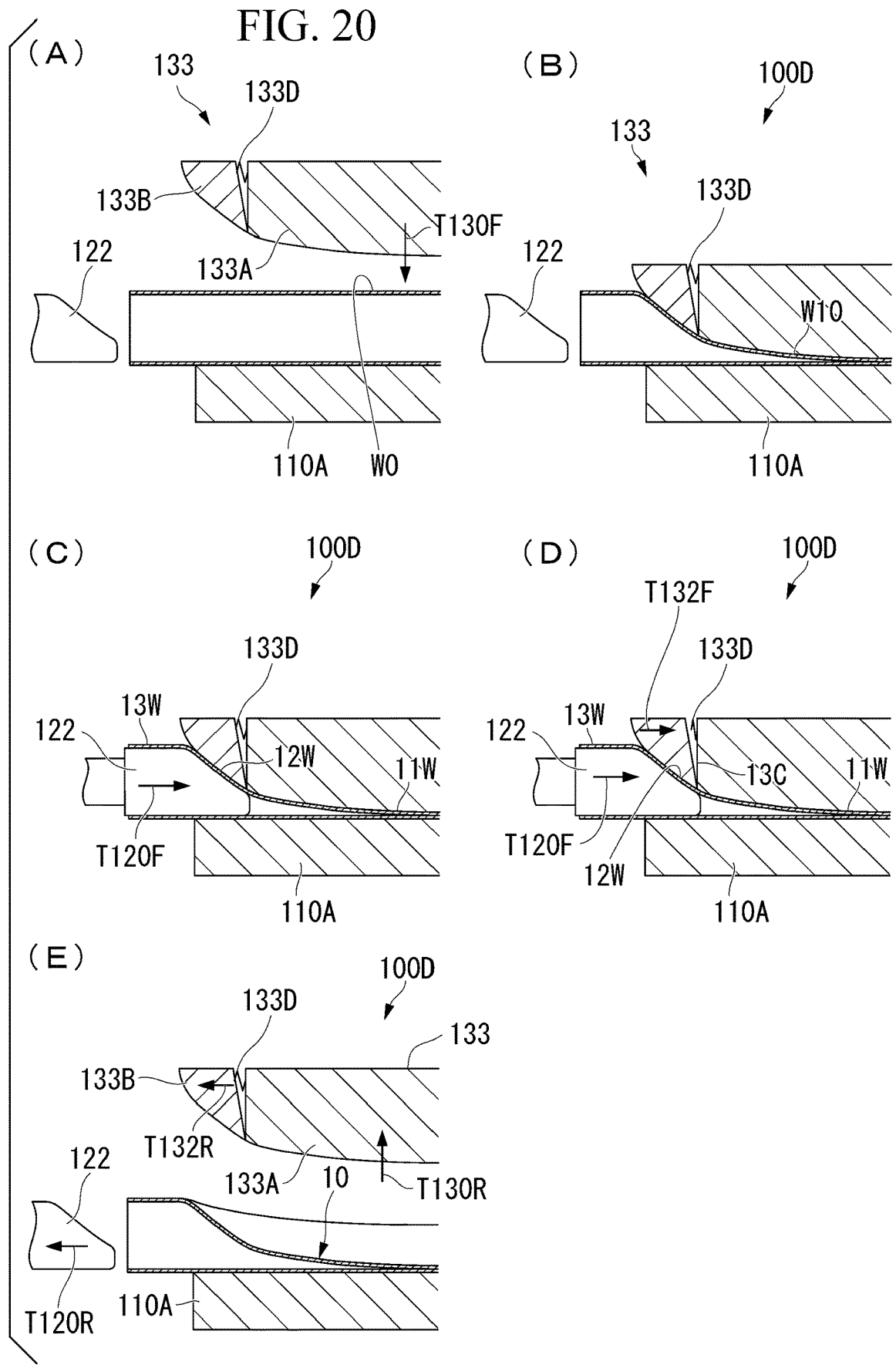
FIG. 20 is a view illustrating each step of a torsion beam manufacturing method according to the same embodiment along a flow of (A) to (E) and is a view corresponding to E-section in FIG. 19.

FIG. 19 is a longitudinal sectional view illustrating a schematic configuration of a torsion beam manufacturing apparatus 100D according to the present embodiment. FIGS. 20(A) to 20(E) are views illustrating the step of manufacturing a torsion beam according to the embodiment along a flow of FIGS. 20(A) to 20(E) and are views corresponding to E-section in FIG. 19.

Hereinafter, with reference to FIG. 19, a schematic configuration of the torsion beam manufacturing apparatus 100D according to the present embodiment will be described.

The torsion beam manufacturing apparatus 100D includes the fixed press forming die (forming die) 110A, the pair of compression treatment units 120B, a movable-type press forming driving apparatus 130C, and a control unit (not illustrated). In the torsion beam manufacturing apparatus 100D, the fixed press forming die 110A and the movable-type press forming driving apparatus 130C constitute the press working machine, and the pair of compression treatment units 120B constitutes a compression treatment machine.

The configuration and the operation of the fixed press forming die 110A are similar to those of the third embodiment and the configuration, and the operation of the compression treatment unit 120B are similar to those of the fourth embodiment. Therefore, the same reference signs are applied and duplicated description will be omitted.

The movable-type press forming driving apparatus 130C includes a movable press forming die (movable die) 133 and the hydraulic cylinder (second driving mechanism) 135 which moves the movable press forming die 133 forward and rearward in the direction of the arrow T130 (upward and downward).

As illustrated in FIG. 19, the movable press forming die 133 includes a first forming portion 133A, two second forming portions (shape changing portion support members) 133B which are respectively disposed on both sides of the first forming portion 133A in the longitudinal direction, a cam surface (cam mechanism) 133C, and a spring 133D. In addition, the movable press forming die may further include a guide member which guides the second forming portion 133B in a horizontal direction with respect to the first forming portion 133A.

In addition, a shape corresponding to the upper shape of the torsion beam material W10 is formed on a lower surface of the movable press forming die 133, which performs press forming of the torsion beam material W10 in cooperation with the fixed press forming die 110A. Since the lower surface shape of the movable press forming die 133 is substantially the same as the lower surface shape of the movable press forming die 131 described in the third embodiment, the description thereof is omitted here. For example, the cross-sectional shape in the view taken along the arrow X7-X7 in FIG. 19 is the same as the cross-sectional shape described in FIG. 15 in the third embodiment.

The cam surface 133C is an inclined surface that is formed on the inner surface of the second forming portion 133B and is inclined so as to approach the side surface of the first forming portion 133A toward the lower surface of the first forming portion 133A. Then, a gap formed between the cam surface 133C and the facing surface thereof is tapered toward the pressing direction of the movable press forming die 133.

The first forming portion 133A and the second forming portion 133B are maintained by the spring 133D so as to maintain a predetermined distance in a state where an external force is not applied. In a case where an external force is applied to the spring 133D, a cam mechanism in which the cam surface 133C approaches the first forming portion 133A side and the second forming portion 133B is moved in the longitudinal direction of the torsion beam material W10 is constituted.

The control unit (not illustrated) instructs the compression treatment unit 120B and the movable-type press forming driving apparatus 130C to perform an operation related to press working and compression treatment.

Hereinafter, with reference to FIGS. 20(A) to 20(E), an outline of a step of manufacturing a torsion beam by the torsion beam manufacturing apparatus 100D will be described. FIGS. 20(A) to 20(E) are views illustrating a step of manufacturing a torsion beam according to a fifth embodiment along a flow of FIGS. 20(A) to 20(E), and are views corresponding to E-section of FIG. 19.

(1) First, as illustrated in FIG. 20(A), the metal material pipe W0 is placed on the fixed press forming die 110A, and the movable press forming die 133 is moved in the direction of the arrow T130F.

(2) As illustrated in FIG. 20(B), the torsion beam material W10 is formed through press forming using the fixed press forming die 110A and the movable press forming die 133.

(3) Next, as illustrated in FIG. 20(C), the shape changing portion support punch 122 is moved forward in the direction of the arrow T120F.

(4) Next, as illustrated in FIG. 20(D), the shape changing portion support punch 122 is further moved forward in the direction of the arrow T120F.

At this time, the spring 133D contracts and the second forming portion 133B is moved in a direction of an arrow T132F. As a result, in a state in which the shape changing portion 12W is supported by the shape changing portion support punch 122 and the second forming portion 133B, the torsion beam material W10 is compressed in the longitudinal direction thereof to form a torsion beam 10. In this compression treatment, by applying a strain amount equal to or greater than 0.5% and equal to or smaller than 2.0% to the torsion beam material W10 in the axial direction, the tensile residual stress on the front and rear surfaces in the sheet thickness direction can be released without causing buckling. In addition, since compression is applied after the respective outer surfaces wa and wb of the central portion 11W and the shape changing portion 12W of the torsion beam material W10 are supported, buckling is less likely to occur.

(5) When the torsion beam 10 is formed, as illustrated in FIG. 20(E), the movable press forming die 133 is raised in the direction of the arrow T130R. As a result, the second forming die moves in the direction of the arrow T132R by the reversion force of the spring 133D.

In addition, the shape changing portion support punch 122 is caused to retreat in the direction of the arrow T120R.

According to the torsion beam manufacturing method of the fifth embodiment and the torsion beam manufacturing apparatus 100D, the torsion beam 10 having excellent fatigue durability can be efficiently manufactured.

According to the torsion beam manufacturing apparatus 100D, sine the torsion beam material W10 is compressed inward in the longitudinal direction in a state where the shape changing portion 12W is held by the shape changing portion support punch 122 and the second forming portion 133B, the residual stress can be effectively reduced or removed from the connection portion 12A.

In addition, according to the torsion beam manufacturing apparatus 100D, after the metal material pipe W0 is pressed and the torsion beam material W10 is formed, the torsion beam material W10 can be compressed in succession without being transferred to another apparatus. Therefore, productivity when manufacturing the torsion beam 10 can be improved.

Sixth Embodiment

Figure 21:
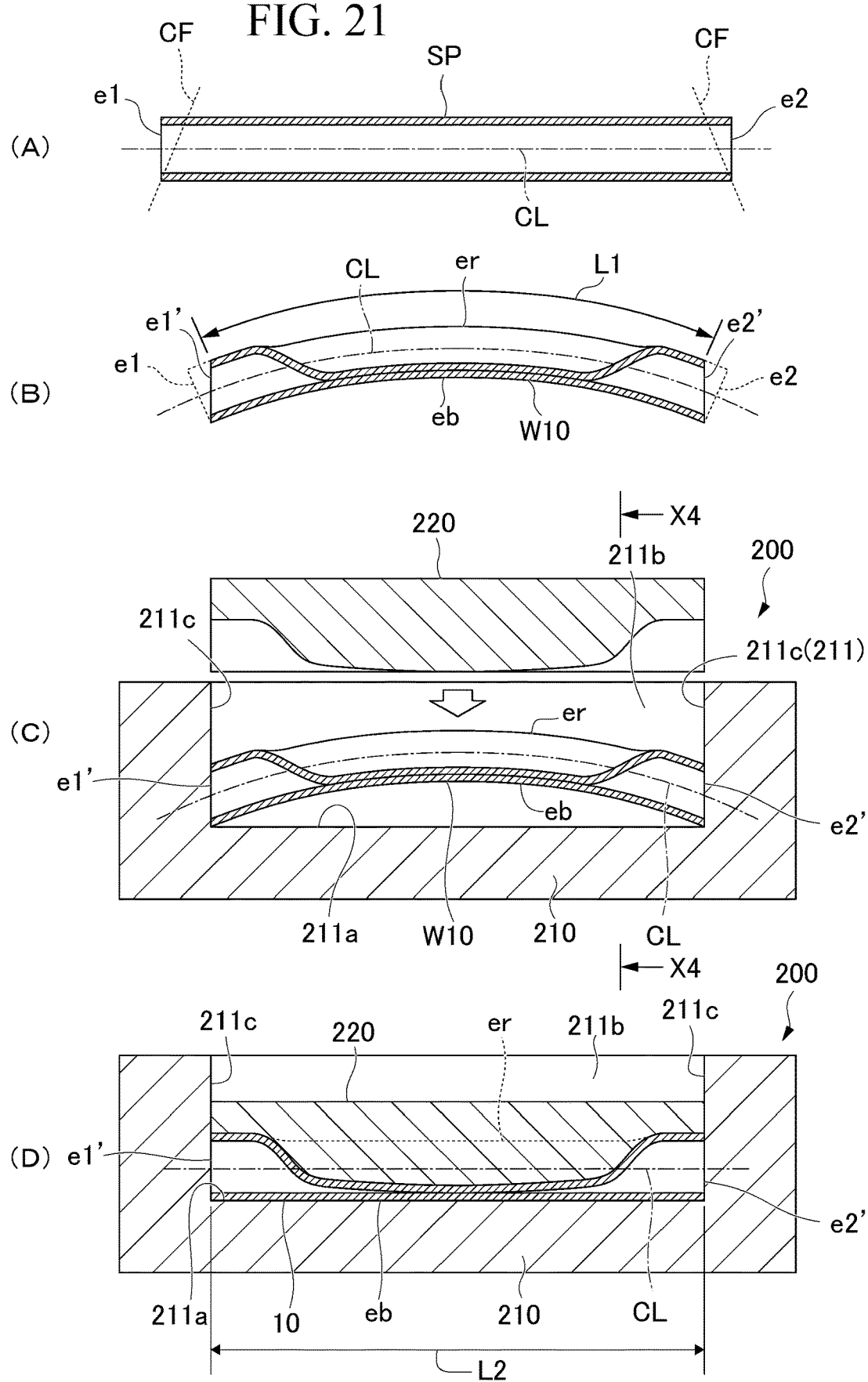
FIG. 21 is a view illustrating each step of a torsion beam manufacturing method according to the sixth embodiment along a flow of (A) to (D).
Figure 22:
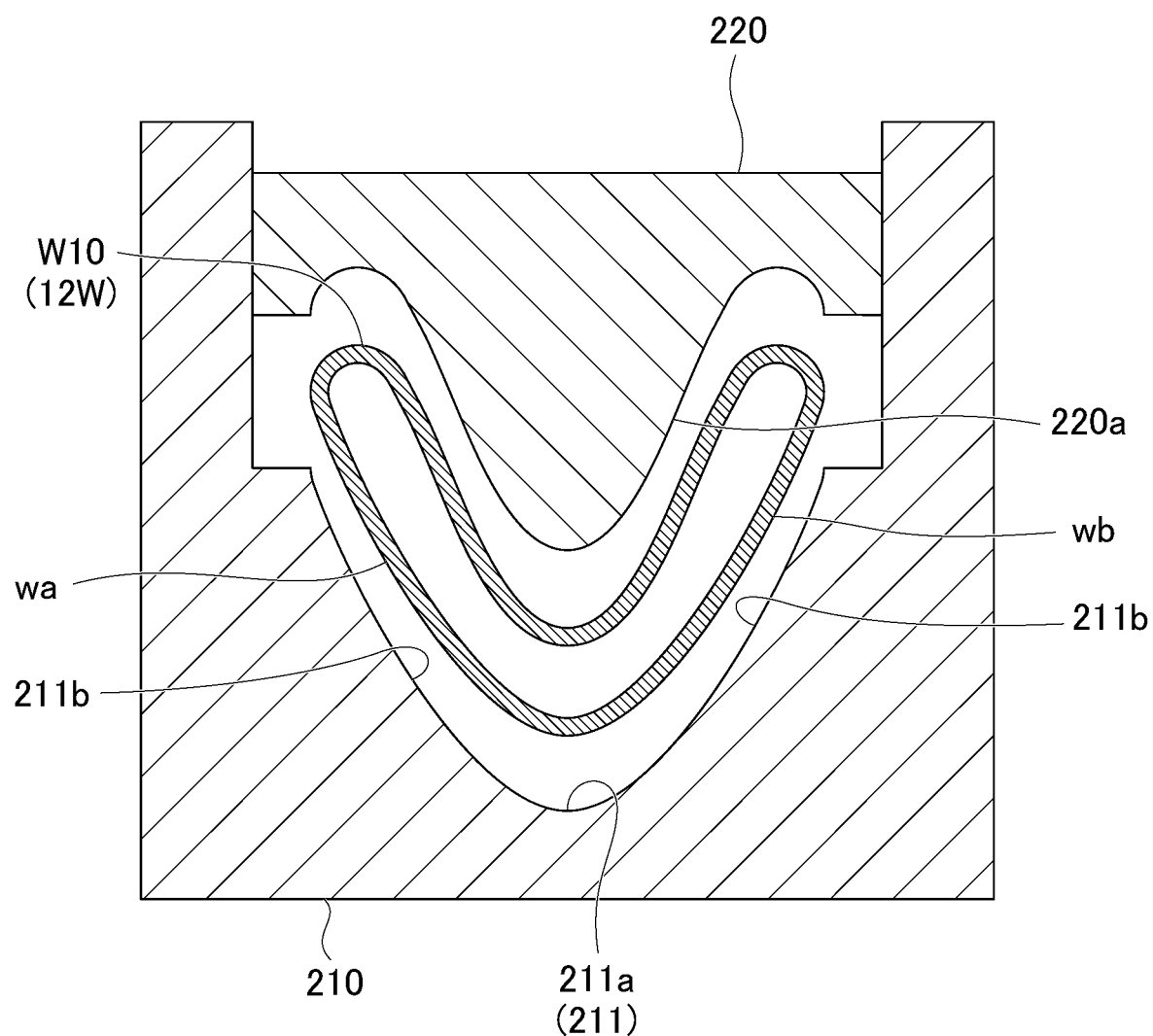
FIG. 22 is a view illustrating a torsion beam manufacturing apparatus according to the same embodiment, and is a longitudinal sectional view seen along arrow X4-X4 in FIG. 21.

Next, with reference to FIGS. 21 to 22, a sixth embodiment of the present invention will be described. FIG. 21 is a cross-sectional view illustrating a step of manufacturing a torsion beam according to the embodiment along a flow of (A) to (D). FIG. 22 is a view showing a main part of the torsion beam manufacturing apparatus according to the embodiment and is a cross-sectional view seen along arrows X4-X4 in FIG. 21.

FIG. 21(A) corresponds to a preparation step illustrated in Step S101 in FIG. 6. In this step, a metal material pipe SP (raw pipe) that is a circular steel pipe which is straight along a central axis CL and has a uniform thickness is prepared. Both end edges e1 and e2 of the metal material pipe SP are orthogonal to the rotation axis CL in a case of being seen in a longitudinal section including the rotation axis CL. A broken line CF will be described later.

Subsequent FIG. 21(B) corresponds to a press working step illustrated in Step S102 in FIG. 6. In this step, press working of the metal material pipe SP is performed by a press working machine (not illustrated) to obtain a torsion beam material W10 having a bottom eb and ear portions er. The bottom eb is a folded portion at the lowermost end of the second wall portion S120C illustrated in FIG. 5C, for example, and is formed so as to extend along the central axis CL. The ear portions er are, for example, a pair of folded wall portions S130C illustrated in FIG. 5C, and is formed so as to extend along the central axis CL.

At the time of press working, as illustrated in FIG. 21(B), the bottom eb is warped so as to form a recessed circular arc shape, and the ear portions er is warped so as to form a projected circular arc shape. Since both end edges e1 and e2 are vertical with respect to the central axis CL at this time, both end edges e1 and e2 are inclined with respect to the vertical direction. Therefore, the extra length portion including both end edges e1 and e2 is cut off so that both end edges e1' and e2' of the torsion beam material W10 are arranged along the vertical direction. In FIG. 21(B), the cut-off extra length portion is indicated by a broken line. In this manner, the torsion beam material W10 is obtained (corresponding to Step S103 in FIG. 6).

Subsequent FIGS. 21(C) and 21(D) correspond to a compression treatment step illustrated in Step S104 in FIG. 6. In this step, the torsion beam material W10 is compressed and a compression strain amount equal to or greater than 0.5% and equal to or smaller than 2.0% in the axial direction is applied. Thus, the residual stress on the front and rear surfaces in the sheet thickness direction of the torsion beam material W10 is released without causing buckling to obtain a torsion beam 10 (corresponding to Step S105 in FIG. 6).

The compression strain amount can be set based on the entire length along the projected circular arc shape illustrated in FIG. 21(B) and the entire length along the straight line shape illustrated in FIG. 21(D). More specifically, for example, the compression strain amount $\varepsilon$ (%) at the position of the ear portion er can be calculated by $\varepsilon=((L1-L2)/L1)\times 100$ using a total length L1 (mm) along the projected circular arc shape illustrated in FIG. 21(B) and a total length L2 (mm) along the straight line shape shown in FIG. 21(D). $\varepsilon$ preferably satisfies $0.5 \leq \varepsilon \leq 2.0$.

The torsion beam manufacturing apparatus used in this step includes a press working machine which performs a press working step illustrated in FIG. 21(B) and a compression treatment machine 200 which performs a step illustrated in FIGS. 21(C) and 21(D).

The compression treatment machine 200 includes a fixed die 210 that forms a recessed part 211, a movable die 220 that moves forward or rearward with respect to the recessed part 211 of the fixed die 210, a driving unit that drives the movable die 220, and a control unit (not illustrated).

The recessed part 211 of the fixed die 210 is divided and formed by a bottom wall surface 211a having a shape matching with the bottom shape of the torsion beam 10, a pair of side wall surfaces 211b having a shape matching with the side surface shape of the torsion beam 10, and a pair of end wall surfaces 211c facing the both end edges e1' and e2' of the torsion beam 10. As illustrated in FIG. 21(D), an interval between the pair of end wall surfaces 211c is set to be equal to the length of the torsion beam 10 to be manufactured. Each end wall surface 211c is orthogonal to the central axis CL of the torsion beam 10. Furthermore, a plurality of punching pins (not illustrated) are provided on the bottom wall surface 211a, and the formed torsion beam 10 is discharged out of the recessed part 211.

As illustrated in FIG. 22, the recessed part 211 has a substantially V-shape or substantially U-shape longitudinal cross-sectional shape in the central portion in the longitudinal direction. This longitudinal cross-sectional shape matches with the longitudinal cross-sectional shape of the central portion 11W and the shape changing portion 12W of the torsion beam material W10. More specifically, the longitudinal cross-sectional shape of the pair of side wall surfaces 211b matches with the longitudinal cross-sectional shape of the outer surfaces wa and wb of the central portion 11W and the shape changing portion 12W, respectively. The outer surfaces wa and wb are spaced above the pair of side wall surfaces 211b at the stage of FIG. 21(C) in which compression is to be performed.

On the other hand, the recessed part 211 has a semicircular longitudinal cross-sectional shape at both end portions in the longitudinal direction thereof. This longitudinal cross-sectional shape matches with the longitudinal cross-sectional shape of the attachment closed cross-sectional portion 13W of the torsion beam material W10.

As illustrated in FIG. 22, the lower surface 220a of the movable die 220 has a substantially V-shape or U-shape projected cross-section at a position corresponding to the central portion 11W and the shape changing portion 12W. The lower surface 220a has a semicircular recessed cross-section at a position corresponding to the attachment closed cross-sectional portion 13W. At the stage of FIG. 21(C) in which compression starts, the lower surface 220a is spaced upward with respect to the pair of side wall surfaces 211b except for the center position in the longitudinal direction.

In the compression treatment working step using the compression treatment machine 200 described above, first, as illustrated in FIG. 21(C), the torsion beam material W10 is disposed in the recessed part 211 so that the bottom eb thereof is directed vertically downward and the ear portion er is directed vertically upward. The end edges e1' and e2' of the torsion beam material W10 disposed in this manner face the end wall surfaces 211c.

After the torsion beam material W10 is disposed, the drive unit that has received an instruction from the control unit pushes the movable die 220 into the recessed part 211 to the bottom dead center position as illustrated in FIG. 21(D). Then, the torsion beam material W10 receives a pressing force by the movable die 220 on the ear portion er side, and is deformed in a direction in which the warpage is reduced. That is, the torsion beam material W10 warped so that the central axis CL forms a gentle circular arc is pressed to obtain a torsion beam 10 in which the central axis CL forms a straight line.

During this press working, the distance between both end edges e1' and e2' of the torsion beam material W10 is kept constant to be equal to the distance between the pair of end wall surfaces 211c. Therefore, a compression force along the center axis CL is applied to the torsion beam material W10 so that the entire length along the curved shape is gradually shortened. Although this compression force is applied in the entire vertical direction range from the bottom eb to the ear portion er, as illustrated in FIG. 21(B), by such an amount that the both end edges e1 and e2 are cut off obliquely in advance, the compression amount is set to be slightly larger in the bottom eb than in the ear portion er. As a result, the bottom eb has a slightly higher compression rate than the ear portion er.

As described above, the torsion beam material W10 can be provided with compression strain due to a compression force warped in the axial direction thereof. Moreover, in the present embodiment, in a case of comparing the portion along the bottom eb and the portion along the ear portion er, when the end portion is cut off in FIG. 21(B), the bottom eb side is left longer than the ear portion er side. Thus, thickening can be performed by further increasing the compression rate on the bottom eb side by the left length. As described above, according to the present embodiment, it is possible to obtain a torsion beam 10 in which the residual stress is reduced or removed, the entire thickness is increased, and the bottom eb side is thicker than the ear portion er.

In the present embodiment, both end edges e1 and e2 are cut off obliquely after the press working step illustrated in FIG. 21(B), but the present invention is not limited to this embodiment. For example, as illustrated in FIG. 21(A), at the point of time of the metal material pipe SP before the press working step, the portion including both end edges e1 and e2 may be cut off obliquely at the broken line CF, and then the press working step may be performed. Also in this case, a torsion beam material W10 having both end edges e1' and e2' can be obtained.

Essentials of the embodiment will be summarized below.

In the torsion beam manufacturing method of the present embodiment, as illustrated in FIGS. 21(A) and 21(B), before the compression step, a preparation step of preparing a torsion beam material W10 having warpage in the longitudinal direction over the entire length including the connection portion 12A (connection region) is provided. Moreover, in this preparation step, a torsion beam material W10 having both end edges e1' and e2' inclined with respect to the longitudinal direction is prepared.

As illustrated in FIGS. 21(C) and 21(D), in the compression step, in a state in which the extension of the linear distance between both end edges e1' and e2' of the torsion beam material W10 is regulated, a pressing force for reducing the warpage is applied to the torsion beam material W10. By this compression step, a strain amount equal to or greater than 0.5% and equal to or smaller than 2.0% is applied in the longitudinal direction over the entire length of the torsion beam material W10 including the connection portion 12A (connection region).

The compression treatment machine 200 (torsion beam manufacturing apparatus) of the present embodiment manufactures a torsion beam 10 including the central portion 11 in which the cross-section orthogonal to the longitudinal direction is a substantially V-shape or U-shape closed cross-section at an any position in the longitudinal direction, and the shape changing portion 12 which has the connection portion 12A (connection region) leading to the central portion 11 and including a closed cross-section having a shape different from the shape of the closed cross-section of the central portion 11.

The compression treatment machine 200 includes a fixed die (first die) 210 that forms a recessed part 211 which receives the torsion beam material W10 having the central portion 11 and the shape changing portion 12 and having warpage in the longitudinal direction over the entire length including the connection portion 12A (connection region), a movable die (second die) 220 that further approaches respect to the torsion beam material W10 disposed in the recessed part 211, and the driving unit (fourth driving mechanism) that causes the fixed die 210 and the movable die 220 to approach each other.

The recessed part 211 has a pair of end wall surfaces 211c (elongation regulating surfaces) facing the both end edges e1' and e2' of the torsion beam material W10. The distance (total length L2) between the pair of end wall surfaces 211c is shorter than the total length L1 of the curve along the warpage of the torsion beam material W10.

Seventh Embodiment

Figure 23:
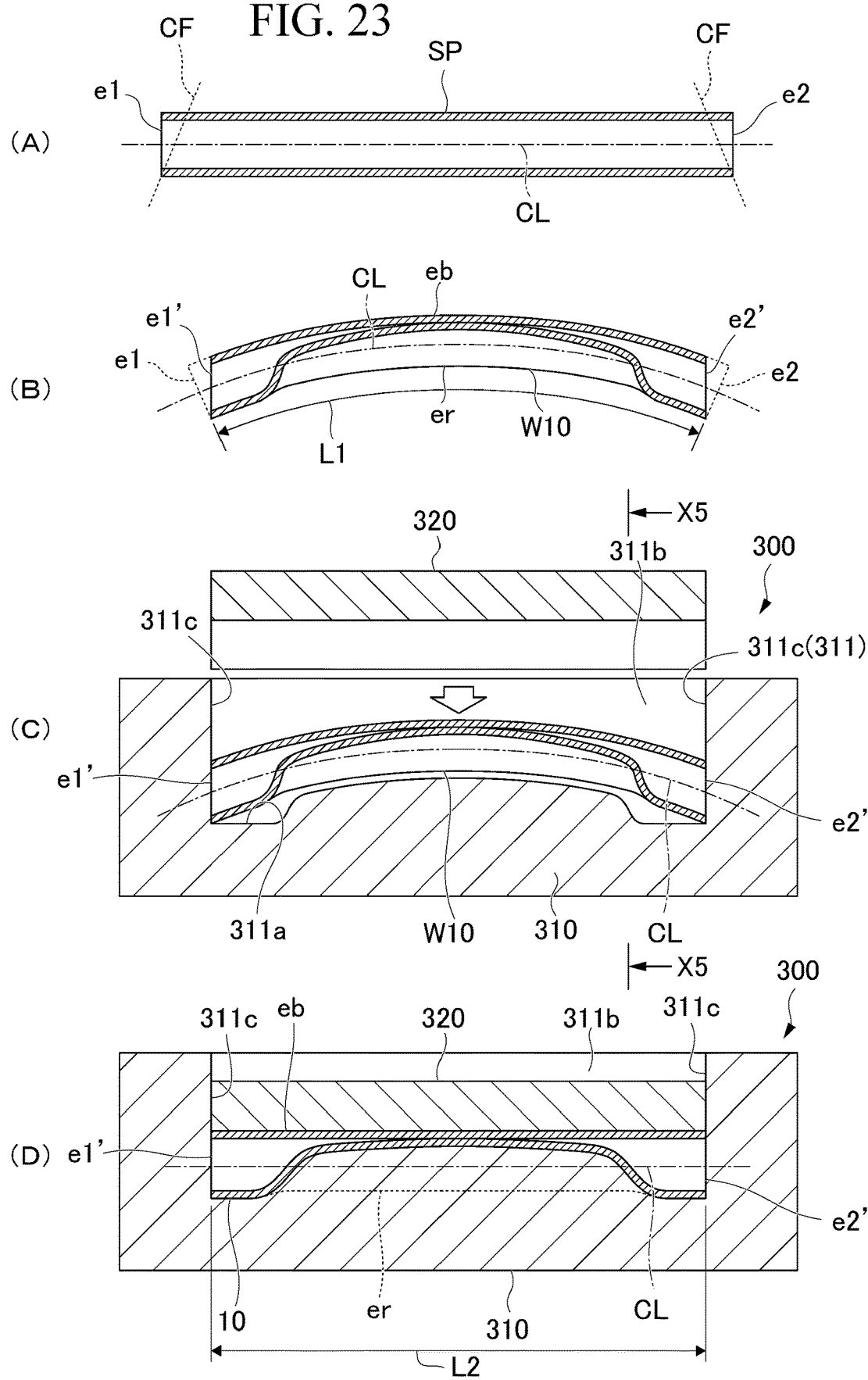
FIG. 23 is a view illustrating each step of a torsion beam manufacturing method according to the seventh embodiment along a flow of (A) to (D).
Figure 24:
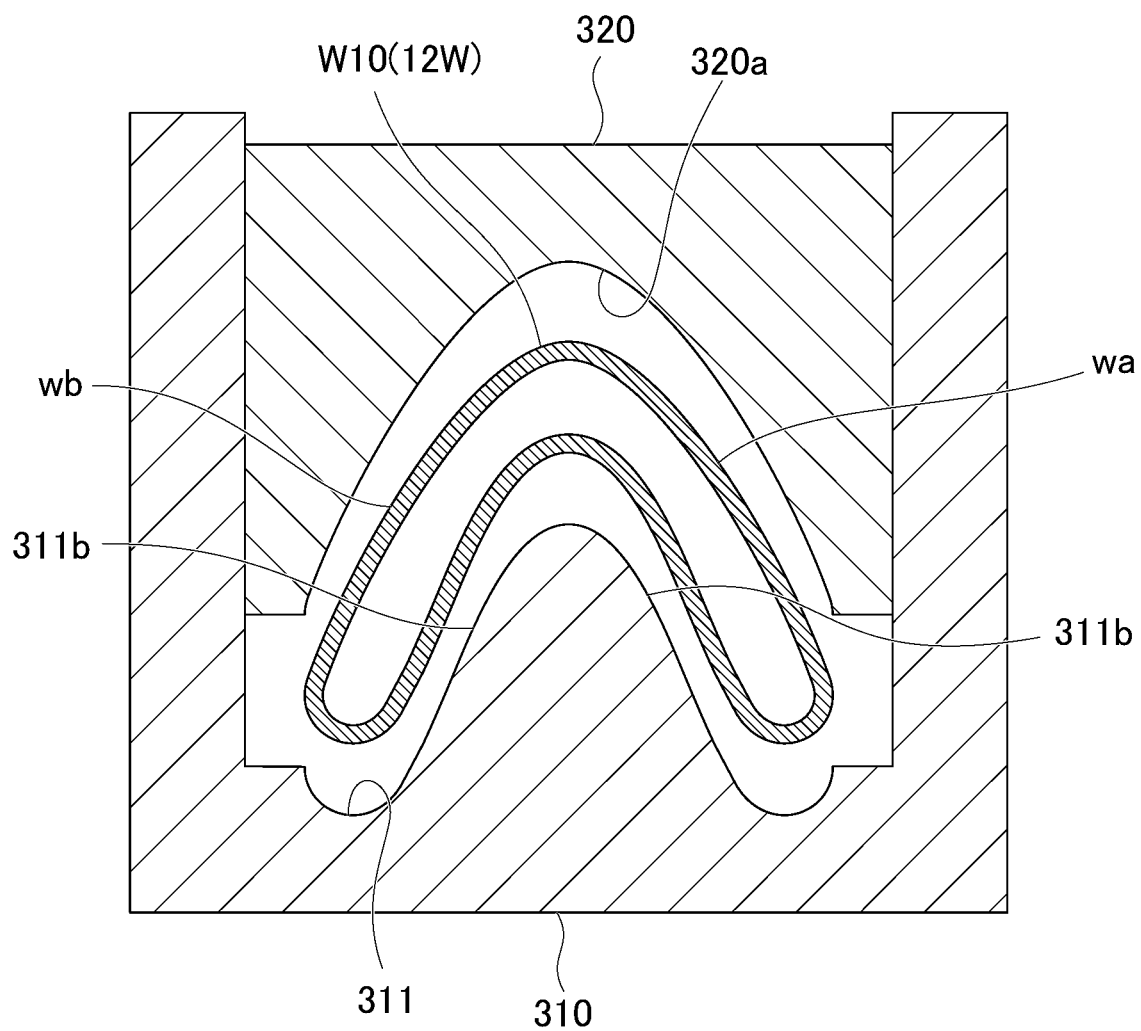
FIG. 24 is a view illustrating a torsion beam manufacturing apparatus according to the same embodiment, and is a longitudinal sectional view seen along arrow X5-X5 in FIG. 23.

Next, with reference to FIGS. 23 and 24, a seventh embodiment of the present invention will be described. FIG. 23 is a longitudinal cross-sectional view illustrating a step of manufacturing a torsion according to the present embodiment along a flow (A) to (D). FIG. 24 is a view illustrating a torsion beam manufacturing apparatus according to the present embodiment, and is a longitudinal cross-sectional view seen along arrows X5-X5 in FIG. 23(C).

Since the present embodiment corresponds to a modification example of the sixth embodiment, the following description will focus on differences from the sixth embodiment, and the rest is the same as the sixth embodiment and the description will be omitted.

In FIG. 23(A), a metal material pipe SP is prepared as in FIG. 21(A). A broken line CF will be described later.

Subsequent FIG. 23(B) corresponds to a press working step illustrated in Step S102 in FIG. 6. In this step, press working of the metal material pipe SP is performed by a press working machine (not illustrated) to obtain a torsion beam material W10 having a bottom eb and ear portions er. At the time of this press working, as illustrated FIG. 23(B), the bottom eb is warped to form a projected circular arc shape and the ear portion er is formed to have a recessed circular arc shape. Since both end edges e1 and e2 are vertical with respect to the central axis CL at this time, both end edges e1 and e2 are inclined with respect to the vertical direction. Therefore, the extra length portion including both end edges e1 and e2 is cut off so that both end edges e1' and e2' of the torsion beam material W10 are arranged along the vertical direction. In FIG. 23(B), the cut-off extra length portion is indicated by a broken line. In this manner, the torsion beam material W10 is obtained (corresponding to Step S103 in FIG. 6).

Subsequent FIGS. 23(C) and 23(D) correspond to the compression treatment step illustrated in Step S104 in FIG. 6. In this step, the torsion beam material W10 is compressed to apply a compression strain amount equal to or greater than 0.5% and equal to or smaller than 2.0% in the axial direction. Thus, by releasing the residual stress on the front and rear surfaces of the torsion beam material W10 in the sheet thickness direction without buckling, a torsion beam 10 can be obtained (corresponding to Step S105 in FIG. 6).

The compression strain amount can be set based on the total length along the projected circular arc shape illustrated in FIG. 23(B) and the total length along the straight line shape illustrated in FIG. 23(D). More specifically, for example, the compression strain amount $\varepsilon$ (%) at the position of the ear portion er can be calculated by $\varepsilon=((L1-L2)/L1) \times 100$ using a total length L1 (mm) over the entire length of the projected circular arc shape illustrated in FIG. 23(B) and a total length L2 (mm) along the straight line shape illustrated in FIG. 23(D). $\varepsilon$ preferably satisfies $0.5 \leq \varepsilon \leq 2.0$.

The torsion beam manufacturing apparatus used in this step includes a press working machine that performs the press working step illustrated in FIG. 23(B), and a compression treatment machine 300 that performs a step illustrated in FIGS. 23(C) and 23D.

The compression treatment machine 300 includes a fixed die 310 that forms a recessed part 311, a movable die 320 that moves forward or rearward with respect to the recessed part 311 of the fixed die 310, a driving unit that drives the movable die 320, and a control unit (not illustrated).

The recessed part 311 of the fixed die 310 is divided and formed by a bottom wall surface 311a having a shape matching with the shape of an ear portion er of the torsion beam 10, a pair of side wall surfaces 311b having a shape matching with the side surface shape of the torsion beam 10, and a pair of end wall surfaces 311c facing the both end edges e1' and e2' of the torsion beam 10. As illustrated in FIG. 23(D), an interval between the pair of end wall surfaces 311c is set to be equal to the length of the torsion beam 10 to be manufactured. Each end wall surface 311c is orthogonal to the central axis CL of the torsion beam 10. Furthermore, a plurality of punching pins (not illustrated) are provided on the bottom wall surface 311a, and the formed torsion beam 10 is discharged out of the recessed part 311.

As illustrated in FIG. 24, the recessed part 311 has a substantially V-shaped or substantially U-shaped longitudinal cross-sectional shape in the central portion in the longitudinal direction. This longitudinal cross-sectional shape matches with the upper cross-sectional shape of the central portion 11W and the shape changing portion 12W of the torsion beam material W10.

On the other hand, the recessed part 311 has a semicircular longitudinal cross-sectional shape at both end portions in the longitudinal direction thereof. This longitudinal cross-sectional shape matches with the cross-sectional shape of the attachment closed cross-sectional portion 13W of the torsion beam material W10.

As illustrated in FIG. 24, a lower surface 320a of the movable die 320 has a substantially V-shape or U-shape projected cross-section at a position corresponding to the central portion and the shape changing portion. This cross-sectional shape matches with the lower cross-sectional shape of the central portion 11W and the shape changing portion 12W of the torsion beam material W10.

On the other hand, the lower surface 320a has a semicircular longitudinal cross-sectional shape at both end portions in the longitudinal direction thereof. This longitudinal cross-sectional shape matches with the cross-sectional shape of the attachment closed cross-sectional portion 13W of the torsion beam material W10.

In the compression treatment step using compression treatment machine 300 described above, first, as illustrated in FIG. 23(C), a torsion beam material W10 is disposed in the recessed part 211 such that the bottom eb is directed vertically upward and the ear portion er is directed vertically downward. The end edges e1' and e2' of the torsion beam material W10 disposed in this manner face the end wall surfaces 311c.

After the torsion beam material W10 is disposed, the driving unit that has received an instruction from the control unit pushes the movable die 320 into the recessed part 311 to position of bottom dead point as illustrated in FIG. 23(D). Then, the torsion beam material W10 receives a pressing force by the movable die 320 on the ear portion er side, and is deformed in a direction in which the warpage is reduced. That is, the torsion beam material W10 warped so that the central axis CL forms a gentle circular arc is pressed to obtain the torsion beam 10 in which the central axis CL forms a straight line.

During this press working, the distance between both end edges e1' and e2' of the torsion beam material W10 is kept constant to be equal to the distance between the pair of end wall surfaces 311c. Therefore, a compression force along the center axis CL is applied to the torsion beam material W10 so that the entire length along the curved shape is gradually shortened. Although this compression force is applied in the entire vertical direction range from the bottom eb to the ear portion er, as illustrated in FIG. 23(B), by such an amount that the both end edges e1 and e2 are cut off obliquely in advance, the compression amount is set to be slightly larger in the ear portion er than in the bottom eb. As a result, the ear portion er has a slightly higher compression rate than the bottom eb.

As described above, the torsion beam material W10 can be provided with compression strain due to a compression force warped in the axial direction thereof. Moreover, in the present embodiment, in a case of comparing the portion along the bottom eb and the portion along the ear portion er, when the end portion is cut off in FIG. 23(B), the ear portion er side is left longer than the bottom eb side. Thus, thickening can be performed by further increasing the compression rate on the ear portion er side by the left length. As described above, according to the present embodiment, it is possible to obtain a torsion beam 10 in which the residual stress is reduced or removed and the entire thickness is increased, and the ear portion er is thicker than the bottom eb side.

In the present embodiment, both end edges e1 and e2 are cut off obliquely after the press working step illustrated in FIG. 23(B), but the present invention is not limited to this embodiment. For example, as illustrated in FIG. 23(A), at the point of time of the metal material pipe SP before the press working step, the portion including both end edges e1 and e2 may be cut off obliquely at the broken line CF, and then the press working step may be performed. Also in this case, a torsion beam material W10 having both end edges e1' and e2' can be obtained.

Eighth Embodiment

Figure 25:
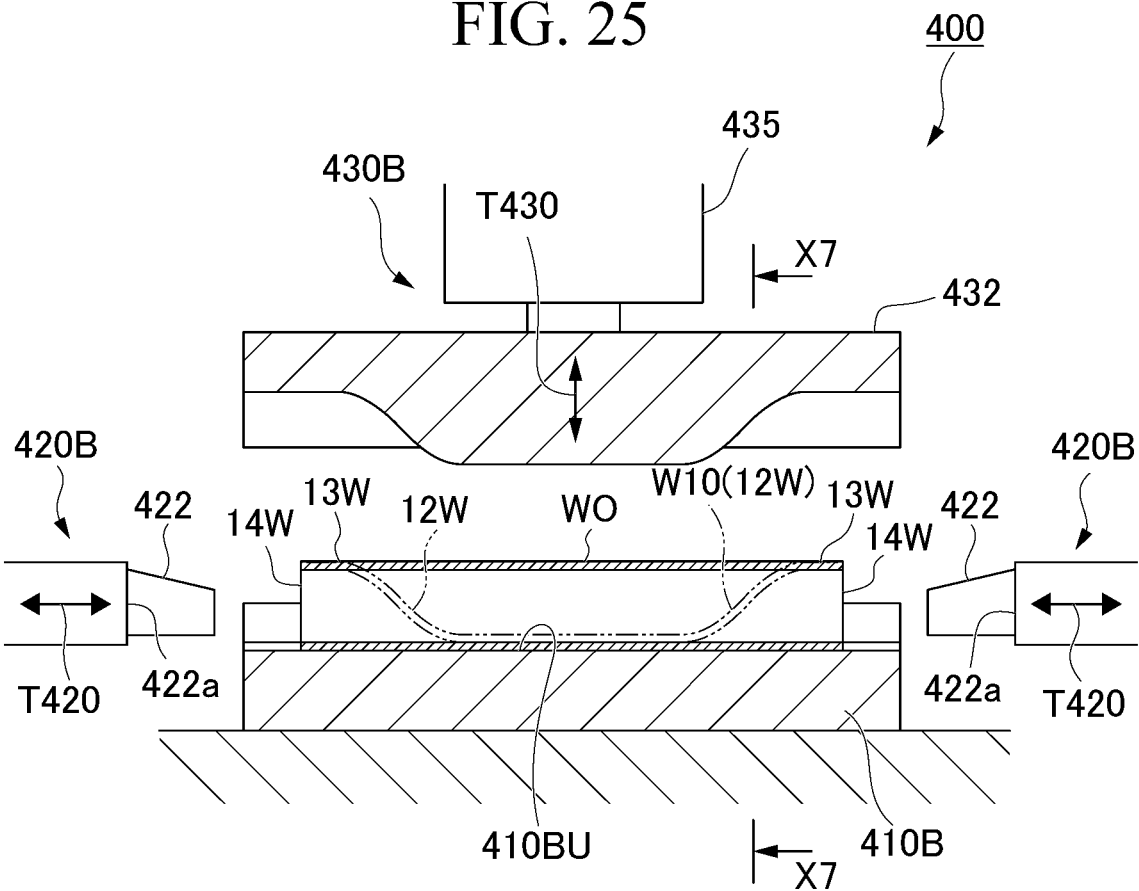
FIG. 25 is a longitudinal sectional view illustrating a schematic configuration of a torsion beam manufacturing apparatus according to an eighth embodiment of the present invention.

Next, with reference to FIG. 25, an eighth embodiment of the present invention will be described. FIG. 25 is a longitudinal sectional view illustrating a schematic configuration of a torsion beam manufacturing apparatus 400 according to the present embodiment.

The torsion beam manufacturing apparatus 400 includes a fixed press forming die (forming die) 410B, a pair of compression treatment units 420B, a movable-type press forming driving apparatus 430B, and a control unit (not illustrated).

In the torsion beam manufacturing apparatus 400, the fixed press forming die 410B and the movable-type press forming driving apparatus 430B constitute a press working machine, and the pair of compression treatment units 420B constitutes a compression treatment machine.

In the fixed press forming die (forming die) 410B, a recessed part 410BU that can be used when the torsion beam material W10 is obtained by performing press working on the metal material pipe W0 is formed. That is, in the fixed press forming die 410B, the recessed part 410BU having a shape corresponding to the lower surface of the torsion beam material W10 is formed upward. The detailed cross-sectional shape of the recessed part 410BU is the same as that of the recessed part 110AU described in the third embodiment, and thus the description thereof is omitted here.

In addition, the fixed press forming die 410B also serves as a torsion beam material support base supporting the torsion beam material W10 when the torsion beam material W10 is subjected to compression treatment by the pair of compression treatment units 420B.

The movable-type press forming driving apparatus 430B includes a movable press forming die (forming die) 432 and the hydraulic cylinder (driving unit) 435 which moves the movable press forming die 432 forward and rearward in the direction of the arrow T430 (upward and downward).

A shape corresponding to the upper shape of the torsion beam material W10 is formed on a lower surface of the movable press forming die 432, which performs press working of the metal material pipe W0 in cooperation with the fixed press forming die 410B, and the torsion beam material W10 is thereby obtained. In addition, since the lower surface shape of the movable press forming die 432 is the same as the lower surface shape of the movable press forming die 131 described in the third embodiment, the description thereof is omitted here. For example, the cross-sectional shape in the view taken along the arrow X7-X7 in FIG. 25 is the same as the cross-sectional shape described in FIG. 15 of the third embodiment.

As illustrated in FIG. 25, each of the compression treatment units 420B includes a shape changing portion support punch (inner side support member) 422, and the hydraulic cylinder (not illustrated) which moves the shape changing portion support punch 422 forward and rearward in the direction of the arrow T420 along the longitudinal direction of the torsion beam material W10.

Each shape changing portion support punch 422 is formed in a shape corresponding to the inner shape of the shape changing portion 12W and the attachment closed cross-sectional portion 13W. After press working is performed on the metal material pipe W0 to obtain a torsion beam material W10, each of the shape changing portion support punches 422 are pushed into each end portions of the torsion beam material W10 and pinches each end portion from the inside thereof. Each of the hydraulic cylinders moves the shape changing portion support punch 422 forward and rearward in the direction of the arrow T420 in accordance with an instruction from the control unit (not illustrated).

The control unit (not illustrated) instructs each of the compression treatment units 420B and the movable-type press forming driving apparatus 430B to perform an operation related to press working and compression treatment.

Next, an outline of process for manufacturing a torsion beam by the torsion beam manufacturing apparatus 400 will be described below.

(1) First, a metal material tube W0 is placed on the fixed press forming die 410B, and the movable press forming die 432 is lowered.

(2) Then, the metal material pipe W0 is interposed between the fixed press forming die 410B and the movable press forming die 432, and the torsion beam material W10 is subjected to press forming. At the point of time, the shape changing portions 12W on both sides thereof are pulled when the central portion 11W is formed, and thus the cross-sectional shape of the shape changing portion 12W is slightly narrower than the final shape.

(3) Next, the shape changing portion support punch 422 is moved forward and pushed into the shape changing portion 12W. As a result, since the shape changing portion support punch 422 pinches the shape changing portion 12W of the torsion beam material W10 from the inside thereof, the cross-sectional shape of the shape changing portion 12W becomes the final shape.

(4) When the shape changing portion support punch 422 is further pushed, a step 422a formed on the outer circumferential surface engages with the attachment portion 14W of the torsion beam material W10 to compress the torsion beam material W10 along the longitudinal direction.

In this compression treatment, by applying a strain amount equal to or greater than 0.5% and equal to or smaller than 2.0% to the torsion beam material W10 in the axial direction, the tensile residual stress on the front and rear surfaces in the sheet thickness direction can be released without causing buckling. In addition, since compression is applied after the respective outer surfaces and of the central portion 11W and the shape changing portion 12W of the torsion beam material W10 are supported, buckling is less likely to occur.

(5) When the torsion beam 10 is formed, the shape changing portion support punch 422 is moved rearward. In addition, the movable press forming die 432 is raised.

According to the torsion beam manufacturing method of the present embodiment and the torsion beam manufacturing apparatus 400, the torsion beam 10 having excellent fatigue durability can be efficiently manufactured.

In addition, according to the torsion beam manufacturing apparatus 400, after the metal material pipe W0 is subjected to press working and the torsion beam material W10 is formed, the torsion beam material W10 is compressed in succession without being transferred to another apparatus, and the torsion beam 10 can be thereby manufactured. Therefore, productivity can be improved.

Each embodiment of the present invention has been described above. However, the present invention is not limited to the above embodiments, and various modifications can be made without departing from the scope of the present invention.

For example, the first embodiment has described a case where the torsion beam manufacturing apparatus 100 compresses the torsion beam material W10 in the longitudinal direction while holding the vicinity of the attachment portion 14W of the attachment closed cross-sectional portion 13W by the attachment closed cross-sectional portion holding member 121. However, the present invention is not limited to this configuration, and the configuration of the attachment closed cross-sectional portion holding member 121 and the position for holding the torsion beam material W10 can be randomly set within a range in which the connection portion 12A can be compressed.

In addition, each of the embodiments has described a case where each of the movable press forming dies (movable die) 131, 132, and 133 moves forward and rearward by the hydraulic cylinder 135. For example, a configuration of moving forward and rearward by an actuator other than a crank mechanism or a hydraulic cylinder (not illustrated) may be employed.

The first and third embodiments have described cases where the torsion beam manufacturing apparatuses 100 and 100B hold the attachment closed cross-sectional portion 13W by the attachment closed cross-sectional portion holding member 121 and compress the torsion beam material W10 in the longitudinal direction by the hydraulic cylinder (first driving mechanism) 125. However, the present invention is not limited to this configuration, and the configuration of the attachment closed cross-sectional portion holding member 121, the holding position by the attachment closed cross-sectional portion holding member 121, and the configuration of the driving unit can be randomly set as long as the connection portion 12A can be compressed.

The second and fourth embodiments have described cases where the torsion beam manufacturing apparatuses 100A and 100C hold the shape changing portion 12W by the second forming portions 132B and 133B and the shape changing portion support punch (inner side support member) 122 and compress the torsion beam material W10 in the longitudinal direction. In addition, the case where the torsion beam manufacturing apparatus 100B holds the shape changing portion 12W by the shape changing portion outside holding member 1210 and the shape changing portion support punch (inner side support member) 122 and compresses the torsion beam material W10 in the longitudinal direction has been described. However, the present invention is not limited to this configuration, and the configuration of the holding member for holding the shape changing portion 12W, the position for holding the torsion beam material W10, and the configuration of the driving unit can be randomly set as long as the connection portion 12A can be compressed.

In addition, the second embodiment has described a case where the shape changing portion outside holding member 1210 includes the upper exterior shape holding portion 1211 and the lower exterior shape holding portion 1212. However, for example, the shape changing portion outside holding member 1210 may be divided into three or more sections when seen along the longitudinal direction of the torsion beam material W10.

In addition, the second embodiment has described a case where the shape changing portion outside holding member 1210 holds the shape changing portion 12W and the attachment closed cross-sectional portion 13W. However, only the shape changing portion 12W may be held as long as the connection portion 12A can be compressed.

In addition, the second embodiment has described a case where the upper exterior shape holding portion 1211 and the lower exterior shape holding portion 1212 each have the exterior shape holding shape formed complementarily to both the shape changing portion 12W and the attachment closed cross-sectional portion 13W. However, the present invention is not limited to this embodiment. These portions may be formed complementarily to only a part of the outer shape of the shape changing portion 12W and the attachment closed cross-sectional portion 13W within a range in which the connection portion 12A can be compressed and the exterior shape holding shape portion can be randomly set.

In addition, the fourth embodiment has described a case where the torsion beam manufacturing apparatus 100C includes the actuator (shape change absorption unit) 113B. However, whether or not to include the actuator 113B can be set in any manner. In addition, the torsion beam manufacturing apparatus of a different embodiment may include the actuator 113B.

Figure 26:
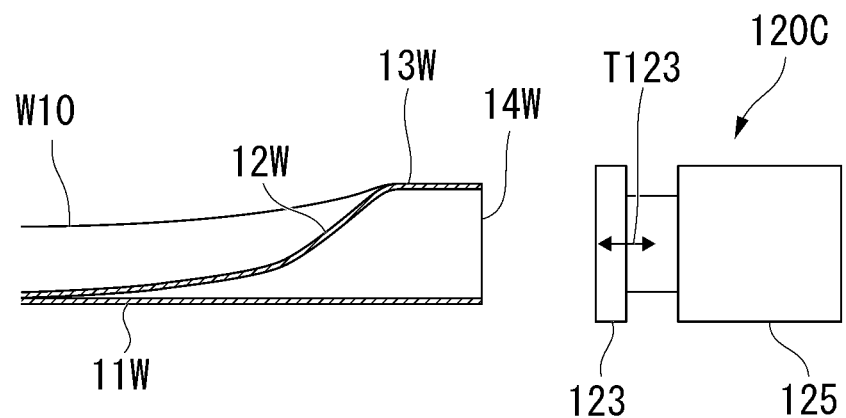
FIG. 26 is a front view illustrating a schematic configuration of a modification example of a compression treatment unit.

Further, instead of the compression treatment unit 120 of the first embodiment or the third embodiment, the compression treatment unit 120C as shown in FIG. 26 may be adopted. In this case, the configuration of any one of the first to fifth embodiments except the compression treatment unit 120, 120A or 120B can be combined with the compression treatment unit 120C. In the following description, the configuration of the first embodiment is cited and described.

In a case where the hydraulic cylinder receives an instruction from the control unit (not illustrated), the hydraulic cylinder (first driving mechanism) 125 moves an attachment closed cross-sectional portion pushing member 123 forward or rearward along an arrow T123. Thus, the torsion beam material W10 can be compressed in the longitudinal direction.

On the surfaces of the attachment closed cross-sectional portion pushing member 123 in contact with the attachment portions 14W at both ends of the torsion beam material W10, a recessed part (not illustrated) corresponding to the cross-sectional shape of the attachment portion 14W may be provided. For example, when the cross-sectional shape of the attachment portion 14W is a circular pipe shape, a circular recessed part having an inner diameter slightly larger than the outer diameter may be provided. Thus, the torsion beam material W10 can be reliably held. Alternatively, when such a recessed part is not provided, various sizes of torsion beam materials W10 can be handled with a single attachment closed cross-sectional portion pushing member 123.

Further, it is also possible to adopt an embodiment in which compression is applied to the torsion beam material W10 by fixing one position of the pair of attachment closed cross-sectional portion pushing members 123 and making the other relatively approach to the one.

By employing the attachment closed cross-sectional portion pushing member 123 having such a simple structure, the torsion beam manufacturing apparatus 100 itself can be made to have a simpler structure at a lower cost.

Further, the compression treatment units 120, 120A, and 120B of the first to fifth embodiments are driven by the hydraulic cylinder (first driving mechanism) 125. However, a cam mechanism may be employed instead of the hydraulic cylinder 125.

Figure 27:
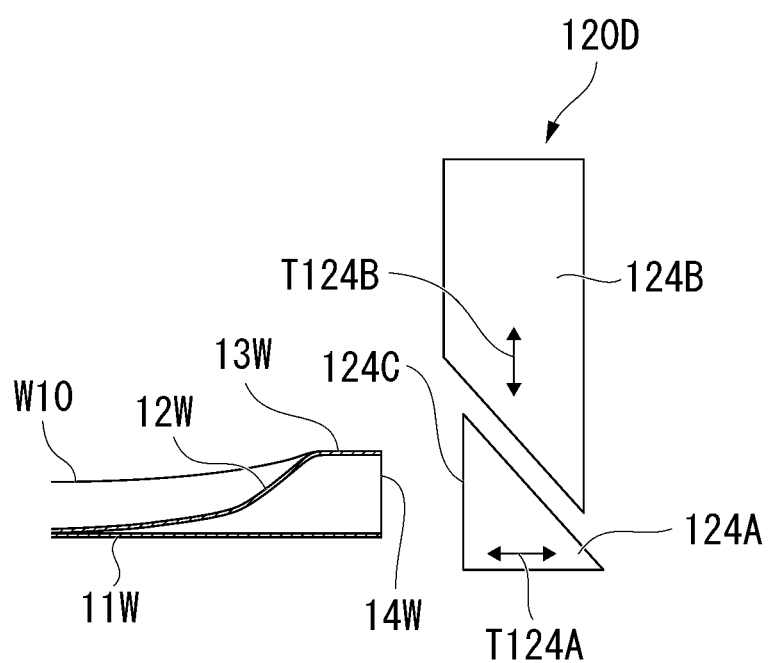
FIG. 27 is a front view illustrating a schematic configuration of a modification example of a compression treatment unit using a cam mechanism.

FIG. 27 illustrates a schematic configuration of a compression treatment unit 120D using a cam mechanism. The compression treatment unit 120D includes a first cam 124A and a second cam 124B. As the second cam 124B moves upward and downward along an arrow T124B, the first cam 124A can be moved forward and rearward along an arrow T124A.

By moving the first cam 124A forward and rearward, an attachment closed cross-sectional portion pushing surface 124C of the first cam 124A can press the attachment portions 14W at both ends of the torsion beam material W10 to compress the torsion beam material W10.

The compression treatment unit 120D shown in FIG. 27 can be used as the compression treatment units 120, 120A, and 120B of the first to fifth embodiments.

In the present invention, the strain amount can be defined as a value obtained by dividing a difference between the total length of the torsion beam before compression and the total length of the torsion beam after compression by the total length of the torsion beam material before compression and multiplying the result by 100. For example, when a torsion beam material having a total length of 1000 mm is compressed 4 mm on one side in the longitudinal direction, the strain amount is 0.8%. The lower limit of the strain amount is preferably 0.5%. Further, from the viewpoint of stable manufacturing, the lower limit of the strain amount is preferably 0.8%. On the other hand, the upper limit of the strain amount is preferably 2.0% from the viewpoint of preventing deterioration of dimensional accuracy such as buckling and wrinkling. Further, from the viewpoint of stable manufacturing, the upper limit of the strain amount is more preferably 1.7%.

In addition, whether or not to cause operations of the shape changing portion support punch (inner side support member) 122, the actuator 113B, and the hydraulic cylinders (shape changing portion support member driving units) 132C to be synchronized with or to follow each other can be set in any manner.

In addition, each of the embodiments has described a case where the first wall portion S110A constituting the central portion 11 and the inner side of the closed cross-section of the second wall portion S120 are formed to be in tight contact with each other. However, whether or not to cause the first wall portion S110A and the inner side of the second wall portion S120 to be in tight contact with each other can be set in any manner.

In addition, each of the embodiments has described a case where the torsion beam 10 has a substantial V-shape projected to an upper side in a case of being mounted in the vehicle body. However, the embodiments may be applied to a torsion beam formed into a substantial U-shape and may employ a configuration of protruding to a lower side with respect to the vehicle body.

In addition, each of the embodiments has described a case where the metal material pipe W0 used when the torsion beam material W10 is formed is a round steel pipe with uniform thickness. As this metal material pipe W0 (or metal material pipe SP), for example, a metal pipe formed through deformation processing using a welded pipe formed by press forming or roll forming a steel sheet (metal material sheet) in which a fatigue relaxation thickness shape corresponding portion is formed or a metal pipe formed by extrusion forming or drawing forming may be used.

In addition, each of the embodiments has described a case where the metal material pipe used for manufacturing the torsion beam 10 is a steel pipe. However, the metal material pipe may be a metal pipe other than a steel pipe.

In addition, each of the embodiments has described a case where as illustrated in FIG. 4, the shape of the attachment closed cross-sectional portion 13 is straight in the longitudinal direction, but a stepped shape may be adopted. That is, a modification example in which a step is first formed in the attachment closed cross-sectional portion 13 and then a compression force is applied in a state where the step is pinched by the shape changing portion outside holding member 1210 may be adopted.

Figure 28:
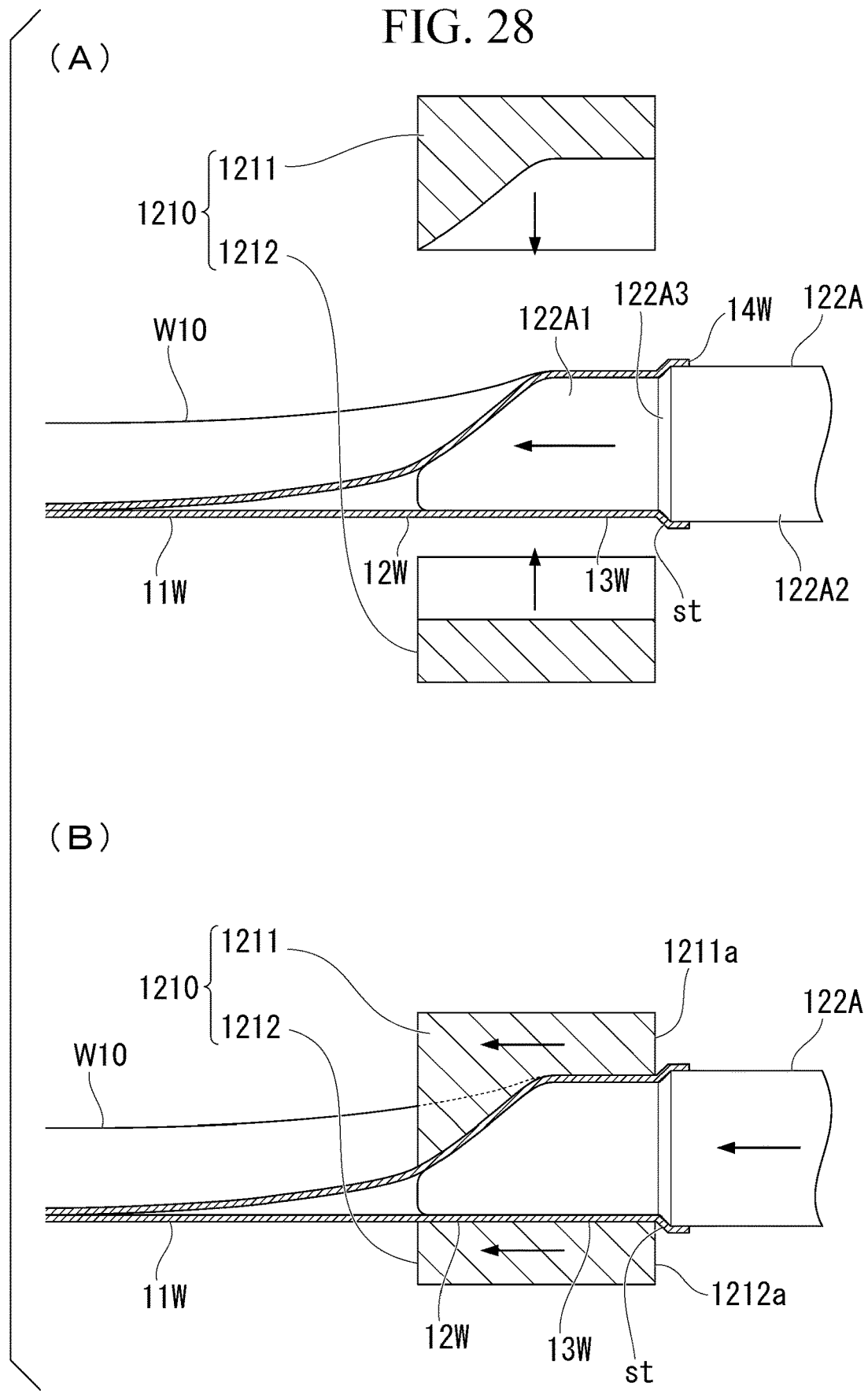
FIG. 28 is a view illustrating a case where the modification example according to the present invention is applied to the second embodiment and shows a part corresponding to a G portion in FIG. 10. (A) shows a step of forming and gripping a level difference portion at a pipe end and (B) shows a step of compressing the pipe end after gripping.

A case where this modification example is applied to the second embodiment will be described. First, as shown in FIG. 28(A), the shape changing portion support punch 122A (inner side support member) is pushed into the end portion of the torsion beam material W10. The shape changing portion support punch 122A has a distal end portion 122A1 having a relatively small outer diameter size, a base end portion 122A2 having a relatively large outer diameter size, and a level difference portion 122A3 formed between the distal end portion 122A1 and the base end portion 122A2. The outer diameter dimension of the distal end portion 122A1 is a dimension that can be inserted into the attachment closed cross-sectional portion 13, while the outer diameter dimension of the base end portion 122A2 is slightly larger than the inner diameter dimension of the attachment closed cross-sectional portion 13.

Since the shape changing portion support punch 122A has such a stepped shape, when pushed into the attachment closed cross-sectional portion 13W as described above, the attachment portion 14W that is a pipe end of the attachment closed cross-sectional portion 13W is expanded in diameter by the level difference portion 122A3 and the base end portion 122A2. As a result, as illustrated in FIG. 28(A), the outer diameter dimension of the attachment portion 14W portion of the attachment closed cross-sectional portion 13W becomes larger than that of the other portions, and a locking portion st is formed.

Subsequently, the attachment closed cross-sectional portion 13 is pinched from the upper and lower sides by the upper exterior shape holding portion 1211 and the lower exterior shape holding portion 1212. At that time, the upper exterior shape holding portion 1211 and the lower exterior shape holding portion 1212 are positioned in advance so as not to crush the locking portion st.

Subsequently, as illustrated in FIG. 28(B), the upper exterior shape holding portion 1211, the lower exterior shape holding portion 1212, and the shape changing portion support punch 122A are moved in synchronization with the direction approaching the central portion 11W. Then, since the locking portion st is locked to side end surfaces 1211a and 1212a of the upper exterior shape holding portion 1211 and the lower exterior shape holding portion 1212 via the attachment portion 14W, a compression force can be reliably applied to at least the connection portion 12A of the torsion beam material W10 by the shape changing portion support punch 122A.

Furthermore, in the second embodiment, when the torsion beam material W10 is compressed, the gripping force by the upper exterior shape holding portion 1211 and the lower exterior shape holding portion 1212 is set to be strong so as not to slip with respect to the torsion beam material W10. The shape changing portion support punch 122 is used together as a core so as to prevent excessive deform even when this holding force is applied. In contrast, in the present modification example, since the attachment closed cross-sectional portion 13W is compressed mainly by locking rather than friction, even when the gripping force by the upper exterior shape holding portion 1211 and the lower exterior shape holding portion 1212 is relatively weak, a compression force can be reliably applied. Therefore, the use of the upper exterior shape holding portion 1211 and the lower exterior shape holding portion 1212 can be omitted. The formation of the locking portion st may be performed on the torsion beam manufacturing apparatus, or may be performed in advance before mounting on the torsion beam manufacturing apparatus.

In the description above, a case where the present modification example is applied to the second embodiment has been described. However, it is natural that the present modification example can also be applied to other embodiments.

In the third embodiment, when the torsion beam material W10 is compressed by the compression treatment unit 120, the movable press forming die 131 is returned to the standby position (upward). However, in the shape changing portion 12W, the first wall portion S110C of the shape changing portion 12W and the movable press forming die 131 are not completely in close contact with each other. Therefore, the compression treatment of FIGS. 16(C) to 16(E) may be performed while the torsion beam material W10 is held by the movable press forming die 131.

Further, in the torsion beam manufacturing apparatus 100B of the third embodiment, the compression treatment unit 120A or 120B of the first embodiment or the fourth embodiment may be adopted instead of the compression treatment unit 120.

Essentials of the present invention based on each of the above-described embodiments will be summarized below.

(1) The torsion beam manufacturing method according to the aspect is a method for manufacturing a torsion beam 10 including a central portion 11 in which the cross-section orthogonal to the longitudinal direction is a substantially V-shape or U-shape closed cross-section at an any position in the longitudinal direction, and a shape changing portion 12 which has the connection portion 12A (connection region) leading to the central portion and including a closed cross-section having a shape different from the shape of the closed cross-section of the central portion 11. The method includes, for example as illustrated in FIGS. 9(A) to 9(E), a compression step to obtain the torsion beam 10 by applying a compression force to at least the connection portion 12A of the torsion beam material W10 in which the central portion 11 and the shape changing portion 12 are formed along the longitudinal direction. In the torsion beam manufacturing method according to the aspect, since a compression force is applied to at least the connection portion 12A during the compression, remaining residual stress can be reduced or removed.

As a result, the torsion beam 10 having excellent fatigue durability can be manufactured. In addition, since post-treatment such as heat treatment is not required, it is possible to manufacture a torsion beam efficiently.

(2) For example, as illustrated in FIGS. 12(A) to 12(D), in the compression step, in a state where an inner side of an outer portion in the longitudinal direction from the connection portion 12A is supported by a shape changing portion support punch (inner side support member) 122 and an outer side of the outer portion is pinched by an upper exterior shape holding portion (outer pinching member) 1211, the compression force may be applied by moving the shape changing portion support punch 122 and the upper exterior shape holding portion 1211 in a direction approaching the central portion 11W.

In this case, in the compression step, since the inner side of the outer portion of the torsion beam material W10 is supported by the shape changing portion support punch 122, and the outer side of the outer portion is pinched by the upper exterior shape holding portion 1211 to apply the compression force, the compression force can be easily applied while suppressing deformation of the outer portion.

(3) For example, as illustrated in FIGS. 12(A) to 12(D), in the compression step, the outer side of the connection portion 12A may be supported by a lower exterior shape holding portion 1212 (outer support member), and the lower exterior shape holding portion 1212 may be moved synchronously with movement of the shape changing portion support punch 122 and the upper exterior shape holding portion 1211 in the same direction.

In this case, since the lower exterior shape holding portion 1212 is moved in synchronization with the movement of the shape changing portion support punch 122 and the upper exterior shape holding portion 1211, the deformation of the torsion beam material W10 accompanying compression is not inhibited. Therefore, since the compression force can be reliably applied to the torsion beam material W10, the residual stress can be reliably reduced or removed.

(4) For example, as illustrated in FIGS. 9(A) to 9(E), in the compression step, the compression force may be applied over an entire length of the torsion beam material W10 by causing both ends of the torsion beam material W10 to approach each other along the longitudinal direction.

In this case, since the torsion beam material W10 is compressed inward in the longitudinal direction over the entire length thereof, residual stress can be reduced or removed without omission.

(5) As described in each of the embodiments, in the compression step, a strain amount equal to or greater than 0.5% and equal to or smaller than 2.0% may be applied to at least the connection portion 12A of the torsion beam material W10 in the longitudinal direction.

In this case, it is possible to apply a compression force sufficient to remove or reduce the residual stress of the torsion beam material W10 without causing buckling.

(6) For example, as illustrated in FIGS. 16(A) to 16(C), the torsion beam manufacturing method may further include pressing step of obtaining the torsion beam material W10 by pressing a metal material pipe W0 (raw pipe), before the compression step.

In this case, although residual stress is remaining in the torsion beam material W10 at the point of time after the pressing step, the residual stress can be removed in the successive compression step.

(7) For example, as illustrated in FIG. 14, the torsion beam manufacturing apparatus 100B according to one aspect of the present invention is an apparatus for manufacturing a torsion beam 10 including a central portion 11 in which the cross-section orthogonal to the longitudinal direction is a substantially V-shape or U-shape closed cross-section at an any position in the longitudinal direction, and a shape changing portion 12 which has a connection portion 12A (connection region) leading to the central portion 11 and including a closed cross-section having a shape different from the shape of the closed cross-section of the central portion. The torsion beam manufacturing apparatus includes, in a case of being seen in the longitudinal direction of the torsion beam material W10, a pair of compression treatment units 120 (holding mechanisms) that hold a portion on one side of the connection portion 12A (connection region) and a portion on the other side of the connection portion 12A in the torsion beam material W10 in which the central portion 11W and the shape changing portion 12W are formed, and a hydraulic cylinder 125 (first driving mechanism) for relatively approaching the compression treatment units 120.

In the torsion beam manufacturing apparatus 100B according to the aspect, since the pair of compression treatment units 120 and the hydraulic cylinder 125 apply a compression force in the longitudinal direction to at least the connection portion 12A (connection region) in the torsion beam material W10, residual stress remaining in the torsion beam material W10 can be reduced or removed.

As a result, the torsion beam 10 having excellent fatigue durability can be manufactured. In addition, since post-treatment such as heat treatment is not required, it is possible to manufacture a torsion beam efficiently.

(8) For example, as in the torsion beam manufacturing apparatus 100B illustrated in FIG. 14, the compression treatment units 120 may respectively hold both ends of the torsion beam material W10.

In this case, since both ends of the torsion beam material W10 are compressed by the pair of compression treatment units 120, a compression force can be applied over the entire length of the torsion beam material W10. Therefore, the residual stress can be reduced or removed without leakage over the entire length of the torsion beam material W10.

(9) For example, like the torsion beam manufacturing apparatus 100B illustrated in FIG. 14, the apparatus may further include a movable press forming die 131 (movable die) that has a shape corresponding to the central portion 11W and the shape changing portion 12W, and a hydraulic cylinder 135 (second driving mechanism) that pressurizes the movable press forming die 131 with respect to a metal material pipe W0 (raw pipe) before the central portion 11W and the shape changing portion 12W are formed in the torsion beam material W10.

In this case, since the hydraulic cylinder 135 pressurizes the movable press forming die 131 with respect to the metal material pipe W0, a torsion beam material W10 having the central portion 11W and the shape changing portion 12W can be obtained.

(10) For example, as in a torsion beam manufacturing apparatus 100C illustrated in FIG. 17, at least one of the compression treatment units 120 (holding mechanisms) may include a shape changing portion support punch 122 (inner side support member) which is inserted into an inner side of the shape changing portion 12W, and a second forming portion 132B (outer pinching member) which is pinched on an outer side of the shape changing portion 12W.

Therefore, in this case, since the inner side of the shape changing portion 12W of the torsion beam material W10 is supported by the shape changing portion support punch 122 and then while the outer side of the shape changing portion 12W is pinched by the second forming portion 132B, a compression force is applied, it is possible to easily apply a compression force while suppressing deformation of the shape changing portion 12W.

(11) For example, the torsion beam manufacturing apparatus 100C illustrated in FIG. 17 may employ the following configuration. A movable press forming die 132 (movable die) is provided with a first forming portion 132A (movable die main body portion) which has a shape corresponding to at least the central portion 11W, a second forming die 132B (movable die end portion) which has a shape corresponding to at least the shape changing portion 12W and is provided to be movable with respect to the first forming portion 132A, and a hydraulic cylinder 132C (third driving mechanism) which causes the second forming dies 132B to be approached to the first forming portion 132A. The second forming dies 132B also serves as the outer pinching member.

In this case, a shape corresponding to at least the central portion 11W is applied to the metal material pipe W0 (raw pipe) pressed by the movable press forming die 132 by the first forming portion 132A, and a shape corresponding to at least the shape changing portion 12W is applied by the second forming die 132B. In a state in which the shape changing portion support punch 122 is inserted into the shape changing portion 12W of the torsion beam material W10 and the outside of the shape changing portion 12W is pinched by the second forming die 132B, a compression force is applied to the torsion beam material W10. According to this structure, since the second forming die 132B also serves as the outer pinching member, a compression force can be continuously applied as it is, without transferring the torsion beam raw material W10 to another apparatus.

(12) As shown in for example the torsion beam manufacturing apparatus 100C of FIG. 17, the following configuration may be employed. The apparatus includes a fixed press forming die 110B (support die) that supports the torsion beam material W10. The fixed press forming die 110B is provided with a first support portion 111B (support die main body portion) which supports the torsion beam material W10 in a part including the central portion 11, and a second support portions 112B (support die end portion) which is provided to be movable with respect to the first support portion 111B and supports at least the shape changing portion 12W.

In this case, since the second support portion 112B is freely movable with respect to the first support portion 111B, when a compression force is applied to the torsion beam material W10, the deformation of the torsion beam material W10 accompanying compression is not inhibited. Therefore, since the compression force can be reliably applied to the torsion beam material W10, the residual stress can be reliably reduced or removed.

(13) Each of the embodiments may employ the following configuration. The apparatus further includes a control unit that controls the hydraulic cylinder 125. The control unit operates the hydraulic cylinder 125 and applies a strain amount equal to or greater than 0.5% and equal to or smaller than 2.0% to at least the connection portion 12A of the torsion beam material W10 in the longitudinal direction.

In this case, it is possible to apply a compression force sufficient to remove or reduce the residual stress of the torsion beam material W10 without causing buckling.

Examples

Examples of the torsion beam according to the present invention are shown below, but it is obvious that the present invention is not limited to these examples.

Figure 29:
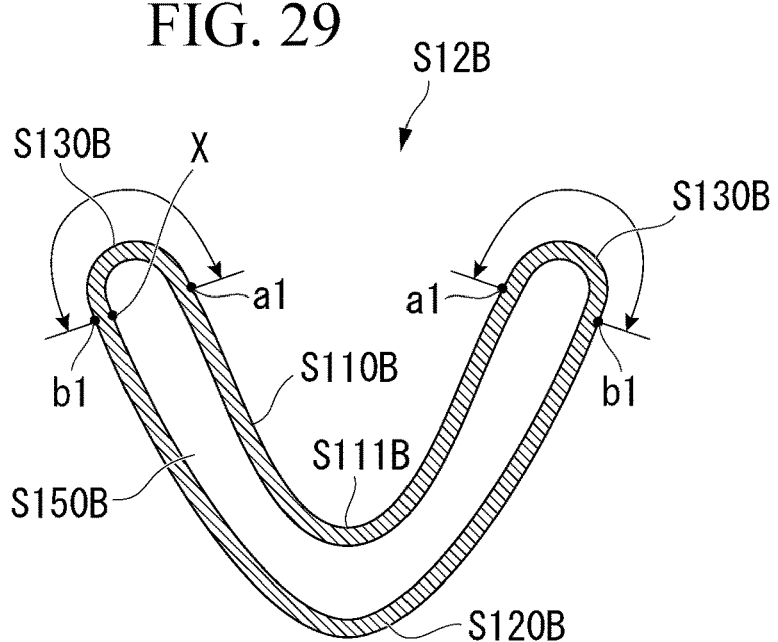
FIG. 29 is a view illustrating a portion in which stress is measured and is a longitudinal sectional view of the connection portion in Examples.

In the examples, the residual stress at point X in FIG. 29 was set to a subject of the measurement. FIG. 29 is a schematic view illustrating the cross-section of the connection portion 12A. The point X in FIG. 29 is a point at the opposite position on the rear surface (the surface on the hollow portion S150B side) of the outer circumferential surface where the second wall portion side folded point b1 is located.

At the point X in FIG. 29, a high residual stress is likely to occur, which tends to cause a reduction in fatigue durability. Therefore, the fatigue durability of the torsion beam can be evaluated by evaluating the residual stress at this site. In addition, the tensile residual stress arises in this site by springback after press forming.

Since the point X is present inside the torsion beam 10 and measurement is difficult, the residual stress is measured by a strain gauge attached to the outer circumferential surface of the torsion beam 10. Specifically, a strain gauge (not shown) is attached to the second wall portion side folded point b1 in FIG. 29. A measurement site including the second wall portion side folded point b1 and the X point is cut out from the torsion beam 10. As a result, since the restraint that the measurement site has received from its surroundings is released, a slight deformation is caused by the residual stress in the measurement site. The strain amount accompanying this minute deformation is measured by a strain gauge, and the residual stress is calculated from the strain amount. The measured residual stress is a numerical value on the outer circumferential surface of the torsion beam 10, but the residual stress at the point X can be estimated from the measured residual stress. The residual stress at the point X can also be calculated by FEM simulation simulating the deformation of the steel pipe.

Figure 30:
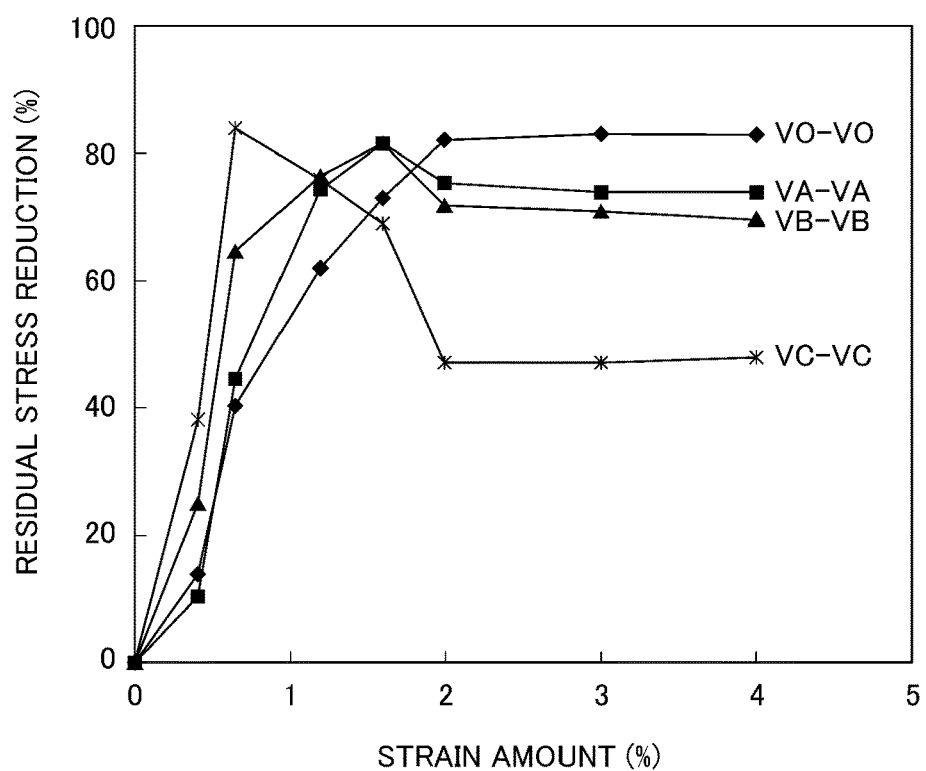
FIG. 30 is a view illustrating results in Examples and is graph illustrating the relationship between a strain amount (%) applied by axial compression with respect to the torsion beam material and a residual stress reduction (%) by this axial compression.

FIG. 30 is a view illustrating results of FEM simulation of steel pipes in which a residual stress reduction (%) is investigated in a case where a strain amount applied by axial compression with respect to the torsion beam material W10 is 0% to 4%. Note that the four lines in FIG. 30 indicate the results at the respective positions of VO-VO in FIG. 3, VA-VA, VB-VB, and VC-VC in FIG. 4. The residual stress reduction (%) was defined as a proportion of the difference in residual stress before and after axial compression to the residual stress before axial compression. For example, when the residual stress before axial compression is 500 MPa and the residual stress after axial compression is 150 MPa, the residual stress reduction is 70%.

According to the results of FIG. 30, a peak was observed when the strain amount was 0.5% to 2.0%. That is, when the strain amount is equal to or greater than 0.5%, the residual stress reduction is significantly increased, and when the strain amount exceeds 2.0%, the residual value is settled to a predetermined value. The reason that the strain amount decreases after reaching the peak is that excessive axial compression is performed and buckling occurs in the torsion beam material W10. From the above, it was found that by applying a strain amount (%) of equal to or greater than 0.5% or and equal to or smaller than 2.0% in the longitudinal direction with respect to at least the connection portion of the torsion beam material W10, the residual stress at the point X can be reduced without buckling.

INDUSTRIAL APPLICABILITY

In the torsion beam manufacturing method and the torsion beam manufacturing apparatus according to the present invention, a torsion beam having excellent fatigue durability can be more efficiently manufactured, so that industrial applicability thereof is significant.

BRIEF DESCRIPTION OF THE REFERENCE SYMBOLS

10 TORSION BEAM
11, 11W CENTRAL PORTION
12, 12W SHAPE CHANGING PORTION
12A CONNECTION PORTION (CONNECTION REGION)
100, 100A, 100B, 100C, 100D TORSION BEAM MANUFACTURING APPARATUS
110B FIXED PRESS FORMING DIE (SUPPORT DIE)
111B FIRST SUPPORT PORTION (SUPPORT DIE MAIN BODY PORTION)
112B SECOND SUPPORT PORTION (SUPPORT DIE END PORTION)
120, 120A, 120B, 120C COMPRESSION TREATMENT UNIT (HOLDING MECHANISM)
121B, 121C CLAMPING MEMBER (PINCHING PORTION)
122 SHAPE CHANGING PORTION SUPPORT PUNCH (INNER SIDE SUPPORT MEMBER)
125 HYDRAULIC CYLINDER (FIRST DRIVING MECHANISM)
131, 132, 133 MOVABLE PRESS FORMING DIE (MOVABLE DIE)
132A FIRST FORMING PORTION (MOVABLE DIE MAIN BODY PORTION)
132B SECOND FORMING PORTION (OUTER PINCHING MEMBER, MOVABLE DIE END PORTION)
133D SPRING
135 HYDRAULIC CYLINDER (SECOND DRIVING MECHANISM)
210, 310 FIRST DIE
211, 311 RECESSED PART
211c, 311c END WALL SURFACE (ELONGATION REGULATING SURFACE)
220, 320 SECOND DIE
1211 UPPER EXTERIOR SHAPE HOLDING PORTION (OUTER PINCHING MEMBER)
1212 LOWER EXTERIOR SHAPE HOLDING PORTION (OUTER SUPPORT MEMBER)
e1', e2' END EDGE
W0 METAL MATERIAL PIPE (RAW PIPE)
W10 TORSION BEAM MATERIAL
wa, wb OUTER SURFACE

The invention claimed is:

1. A torsion beam manufacturing method for manufacturing a torsion beam including a central portion of which a cross-section orthogonal to a longitudinal direction is a closed cross-section having a substantial V-shape or a substantial U-shape at any position in the longitudinal direction, and a shape changing portion which has a connection region leading to the central portion and including a closed cross-section having a shape different from the shape of the closed cross-section of the central portion, the method comprising:
   a preparation step of preparing a torsion beam material formed with the central portion and the shape changing portion; and
   a compression step of thickening at least the connection region through application of a compression force in the longitudinal direction to at least the connection region of the torsion beam material without applying a hydraulic pressure to an inside of the torsion beam material to obtain the torsion beam, after the preparation step.

2. The torsion beam manufacturing method according to claim 1,
   wherein, in the compression step, in a state where an inner side of an outer portion in the longitudinal direction from the connection region is supported by an inner side support member and an outer side of the outer portion is pinched by an outer pinching member, the compression force is applied by moving the inner side support member and the outer pinching member in a direction approaching the central portion.

3. The torsion beam manufacturing method according to claim 2,
   wherein, in the compression step,
   the outer side of the connection region is supported by an outer support member, and
   the outer support member is moved synchronously with movement of the inner side support member and the outer pinching member in the same direction.

4. The torsion beam manufacturing method according to claim 1,
   wherein, in the compression step, the compression force is applied over an entire length of the torsion beam material by causing both ends of the torsion beam material to approach each other along the longitudinal direction.

5. The torsion beam manufacturing method according to claim 1,
   wherein, in the compression step, a strain amount equal to or greater than 0.5% and equal to or smaller than 2.0% is applied to at least the connection region of the torsion beam material in the longitudinal direction by compressing the torsion beam material in an axial direction thereof, the strain amount being defined as a value obtained by dividing a difference between a total length of the torsion beam material before compression and a total length of the torsion beam after compression by the total length of the torsion beam material before compression and multiplying the result by 100.

6. The torsion beam manufacturing method according to claim 1, further comprising:
   a pressing step of obtaining the torsion beam material by pressing a raw pipe, before the compression step.

7. The torsion beam manufacturing method according to claim 1,
   wherein, in the preparation step, the torsion beam material having a warpage along the longitudinal direction in at least a part thereof in the longitudinal direction is prepared before the compression step, wherein, in the compression step, in a state where an elongation between both end edges of the torsion beam material is regulated, a pressing force for reducing the warpage is applied to the torsion beam material.

8. The torsion beam manufacturing method according to claim 7, wherein, in the preparation step, the torsion beam material having both end edges inclined with respect to the longitudinal direction is prepared.

9. The torsion beam manufacturing method according to claim 7, wherein, in the compression step, a strain amount equal to or greater than 0.5% and equal to or smaller than 2.0% is applied to at least the connection region of the torsion beam material in the longitudinal direction.

10. The torsion beam manufacturing method according to claim 1, wherein, when the compression force is applied in the compression step, at least the outer surface of the connection region is supported.

* * * * *